United States Patent
Lundquist et al.

(10) Patent No.: US 11,077,438 B2
(45) Date of Patent: Aug. 3, 2021

(54) APPARATUSES, SYSTEMS AND METHODS FOR IMAGING MICRO-OBJECTS

(71) Applicant: Berkeley Lights, Inc., Emeryville, CA (US)

(72) Inventors: Paul M. Lundquist, Oakland, CA (US); Paul M. Lebel, Redwood City, CA (US); Phillip Ronald Thomas Jess, San Francisco, CA (US)

(73) Assignee: BERKELEY LIGHTS, INC., Emeryville, CA (US)

( * ) Notice: Subject to any disclaimer, the term of this patent is extended or adjusted under 35 U.S.C. 154(b) by 157 days.

(21) Appl. No.: 16/415,894

(22) Filed: May 17, 2019

(65) Prior Publication Data

US 2019/0374944 A1    Dec. 12, 2019

Related U.S. Application Data

(63) Continuation of application No. PCT/US2017/064308, filed on Dec. 1, 2017.
(Continued)

(51) Int. Cl.
*B01L 3/00*    (2006.01)
*B01L 7/00*    (2006.01)
(Continued)

(52) U.S. Cl.
CPC ........... *B01L 3/502715* (2013.01); *B01L 7/00* (2013.01); *G01J 3/0208* (2013.01); *G01J 3/0229* (2013.01);
(Continued)

(58) Field of Classification Search
CPC .... B01L 3/502715; B01L 3/5027; B01L 7/00; B01L 2200/147; B01L 2300/046;
(Continued)

(56) References Cited

U.S. PATENT DOCUMENTS

| 3,663,093 A | 5/1972 | Iida |
| 6,174,675 B1 | 1/2001 | Chow et al. |

(Continued)

FOREIGN PATENT DOCUMENTS

| CN | 1323393 A | 11/2001 |
| CN | 1588088 A | 3/2007 |

(Continued)

OTHER PUBLICATIONS

Ritchie et al.; "Reconstitution of Membrane Proteins in Phospholipid Bilayer Nanodiscs"; Methods Enzymol; (464) pp. 211-231; 2009.

*Primary Examiner* — John R Lee
(74) *Attorney, Agent, or Firm* — Shay Glenn LLP

(57) ABSTRACT

The present disclosure relates to an optical apparatus for imaging and/or manipulating micro-objects in a microfluidic device, such as a light-actuated microfluidic (LAMF) device, and related systems and methods. The optical apparatus can comprise a structured light modulator, a first and a second tube lens, an objective lens, a dichroic beam splitter, and an image sensor. The structured light modulator can be configured to receive unstructured light beams and transmit structured light beams for illuminating micro-objects located within an enclosure of the microfluidic device and/or selectively activating one or more of a plurality of dielectrophoresis (DEP) electrodes of the microfluidic device. The first tube lens can be configured to capture the structured light beams transmitted by the structured light modulator. The second tube lens can be configured to transmit image light beams from the dichroic beam splitter to the image sensor. The image sensor can be configured to receive image light beams from the second tube lens. The image light beams received by the image sensor can be used (Continued)

to form an image of at least a portion of the microfluidic device.

29 Claims, 26 Drawing Sheets

Related U.S. Application Data

(60) Provisional application No. 62/429,066, filed on Dec. 1, 2016.

(51) Int. Cl.

| | |
|---|---|
| *G01J 3/02* | (2006.01) |
| *G01J 3/10* | (2006.01) |
| *G01J 3/44* | (2006.01) |
| *G01N 1/40* | (2006.01) |
| *G01N 21/31* | (2006.01) |
| *G01N 21/61* | (2006.01) |
| *G02B 21/06* | (2006.01) |
| *G02B 21/16* | (2006.01) |
| *G02B 21/36* | (2006.01) |
| *G01N 21/64* | (2006.01) |

(52) U.S. Cl.
CPC ............... *G01J 3/10* (2013.01); *G01J 3/4406* (2013.01); *G01N 1/40* (2013.01); *G01N 21/31* (2013.01); *G01N 21/6458* (2013.01); *G02B 21/06* (2013.01); *G02B 21/16* (2013.01); *G02B 21/361* (2013.01); *B01L 2200/147* (2013.01); *B01L 2300/046* (2013.01); *B01L 2300/0645* (2013.01); *B01L 2300/0654* (2013.01); *B01L 2300/0663* (2013.01); *B01L 2300/0883* (2013.01); *B01L 2300/1822* (2013.01); *B01L 2400/0424* (2013.01)

(58) Field of Classification Search
CPC ..... B01L 2300/0645; B01L 2300/0654; B01L 2300/0663; B01L 2300/0883; B01L 2300/1822; B01L 2400/0424; G01J 3/0208; G01J 3/0229; G01J 3/10; G01J 3/4406; G01N 1/40; G01N 21/31; G01N 21/6458; G02B 21/06; G02B 21/16; G02B 21/361

See application file for complete search history.

(56) References Cited

U.S. PATENT DOCUMENTS

| | | | |
|---|---|---|---|
| 6,958,132 B2 | 10/2005 | Chiou et al. | |
| 7,116,626 B1 | 10/2006 | Woods et al. | |
| 7,294,249 B2 | 11/2007 | Gawad et al. | |
| 7,612,355 B2 | 11/2009 | Wu et al. | |
| 7,956,339 B2 | 6/2011 | Ohta et al. | |
| 8,903,232 B1 | 12/2014 | Caldwell | |
| 9,134,513 B2 | 9/2015 | Chen et al. | |
| 9,235,038 B1 | 1/2016 | Seward | |
| 9,403,172 B2 | 8/2016 | Short et al. | |
| 9,815,056 B2 | 11/2017 | Wu et al. | |
| 10,245,588 B2* | 4/2019 | Khandros | B01L 3/502792 |
| 2002/0012313 A1 | 1/2002 | Kimura et al. | |
| 2005/0173313 A1 | 8/2005 | Tyvoll et al. | |
| 2005/0266571 A1 | 12/2005 | Stout et al. | |
| 2007/0095669 A1 | 5/2007 | Lau et al. | |
| 2007/0132998 A1 | 6/2007 | Tang et al. | |
| 2008/0006535 A1 | 1/2008 | Paik et al. | |
| 2009/0296205 A1 | 12/2009 | Ouchi | |
| 2010/0315706 A1 | 12/2010 | Wartmann et al. | |
| 2011/0262321 A1 | 10/2011 | Park et al. | |
| 2012/0024708 A1 | 2/2012 | Chiou et al. | |
| 2012/0118740 A1 | 5/2012 | Garcia et al. | |
| 2012/0281082 A1* | 11/2012 | Kawasaki | G02B 21/361 348/79 |
| 2012/0325665 A1 | 12/2012 | Chiou et al. | |
| 2013/0118901 A1 | 5/2013 | Pollack et al. | |
| 2013/0171685 A1 | 7/2013 | Schutze et al. | |
| 2014/0029003 A1 | 1/2014 | Shih | |
| 2014/0116881 A1 | 5/2014 | Chapman et al. | |
| 2014/0124370 A1 | 5/2014 | Short et al. | |
| 2015/0151298 A1 | 6/2015 | Hobbs et al. | |
| 2015/0165436 A1 | 6/2015 | Chapman et al. | |
| 2015/0182967 A1 | 7/2015 | Coursey et al. | |
| 2015/0306598 A1 | 10/2015 | Khandros et al. | |
| 2015/0306599 A1 | 10/2015 | Khandros et al. | |
| 2015/0331228 A1 | 11/2015 | Horstmeyer et al. | |
| 2016/0103308 A1* | 4/2016 | Furuya | G02B 21/361 359/368 |
| 2016/0116724 A1* | 4/2016 | Abe | G02B 21/33 359/656 |
| 2016/0160259 A1 | 6/2016 | Du | |
| 2016/0171686 A1 | 6/2016 | Du et al. | |
| 2016/0174351 A1 | 6/2016 | Zhang et al. | |
| 2016/0184821 A1 | 6/2016 | Hobbs et al. | |
| 2016/0193604 A1 | 7/2016 | Mcfarland et al. | |
| 2016/0199837 A1 | 7/2016 | Breinlinger et al. | |
| 2016/0301914 A1 | 10/2016 | Shechtman et al. | |
| 2016/0312165 A1 | 10/2016 | Lowe et al. | |
| 2017/0227751 A1* | 8/2017 | Furuya | G02B 21/36 |
| 2017/0322404 A1* | 11/2017 | Abe | G02B 21/33 |
| 2019/0374944 A1* | 12/2019 | Lundquist | G02B 21/16 |
| 2019/0384963 A1 | 12/2019 | Kim et al. | |
| 2020/0171501 A1* | 6/2020 | McEwen | C12Q 1/6848 |

FOREIGN PATENT DOCUMENTS

| | | |
|---|---|---|
| CN | 104502330 A | 4/2015 |
| CN | 205449795 U | 8/2016 |
| CN | 103364326 A | 5/2017 |
| WO | WO2014/074367 A1 | 5/2014 |
| WO | WO2016/094507 A9 | 6/2016 |
| WO | WO2018/102747 A1 | 6/2018 |
| WO | WO2019/232473 A2 | 12/2019 |

\* cited by examiner

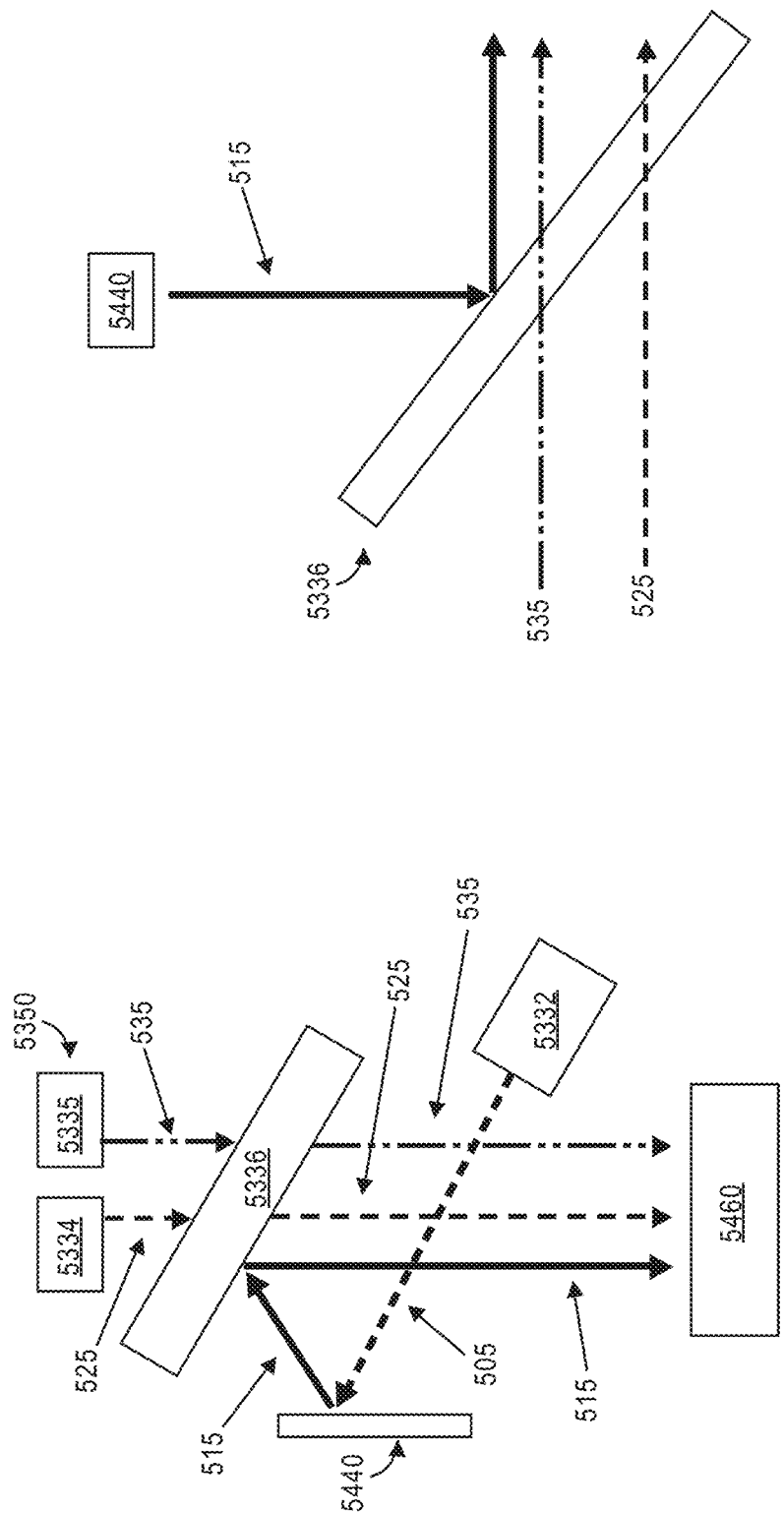

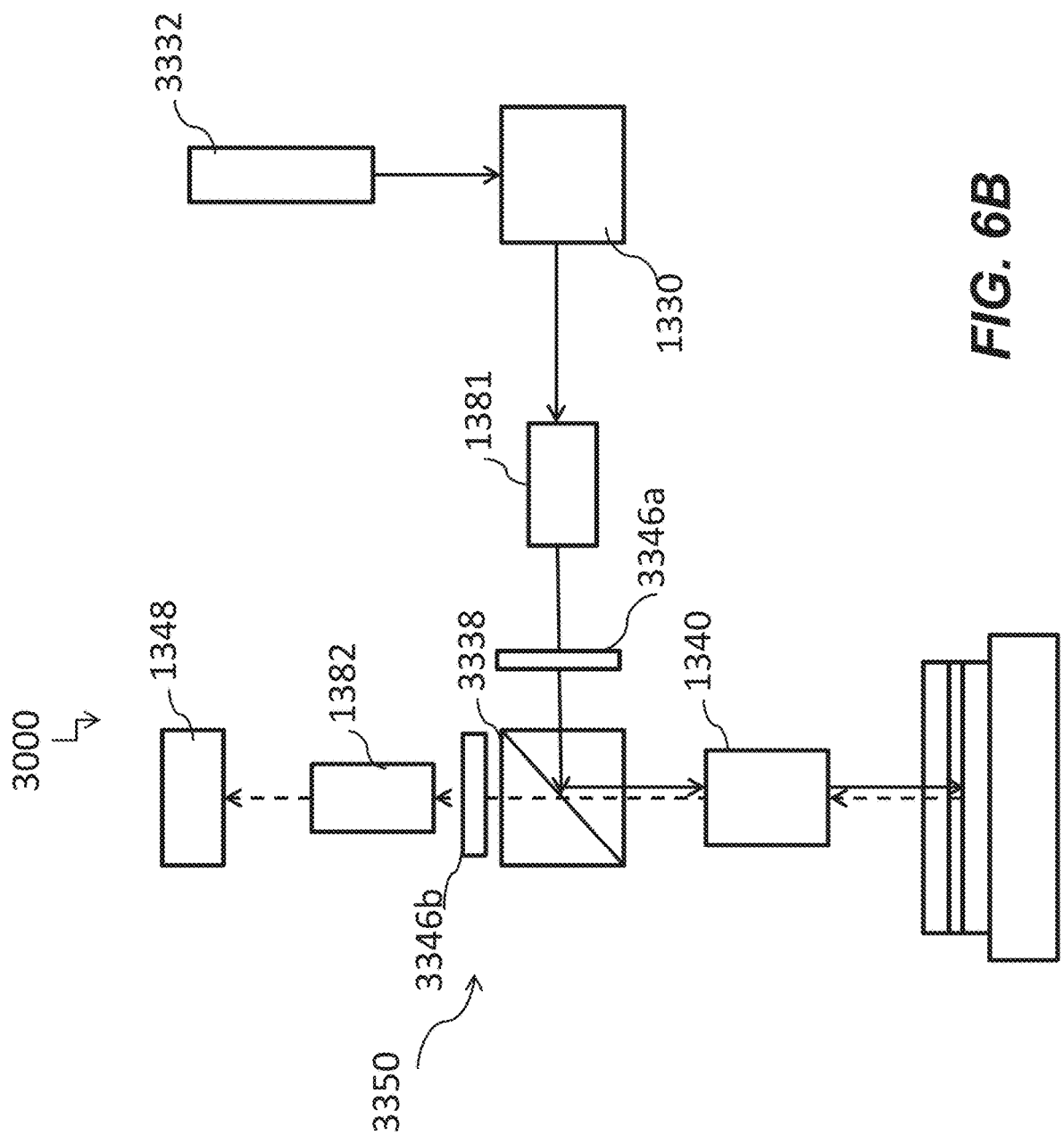

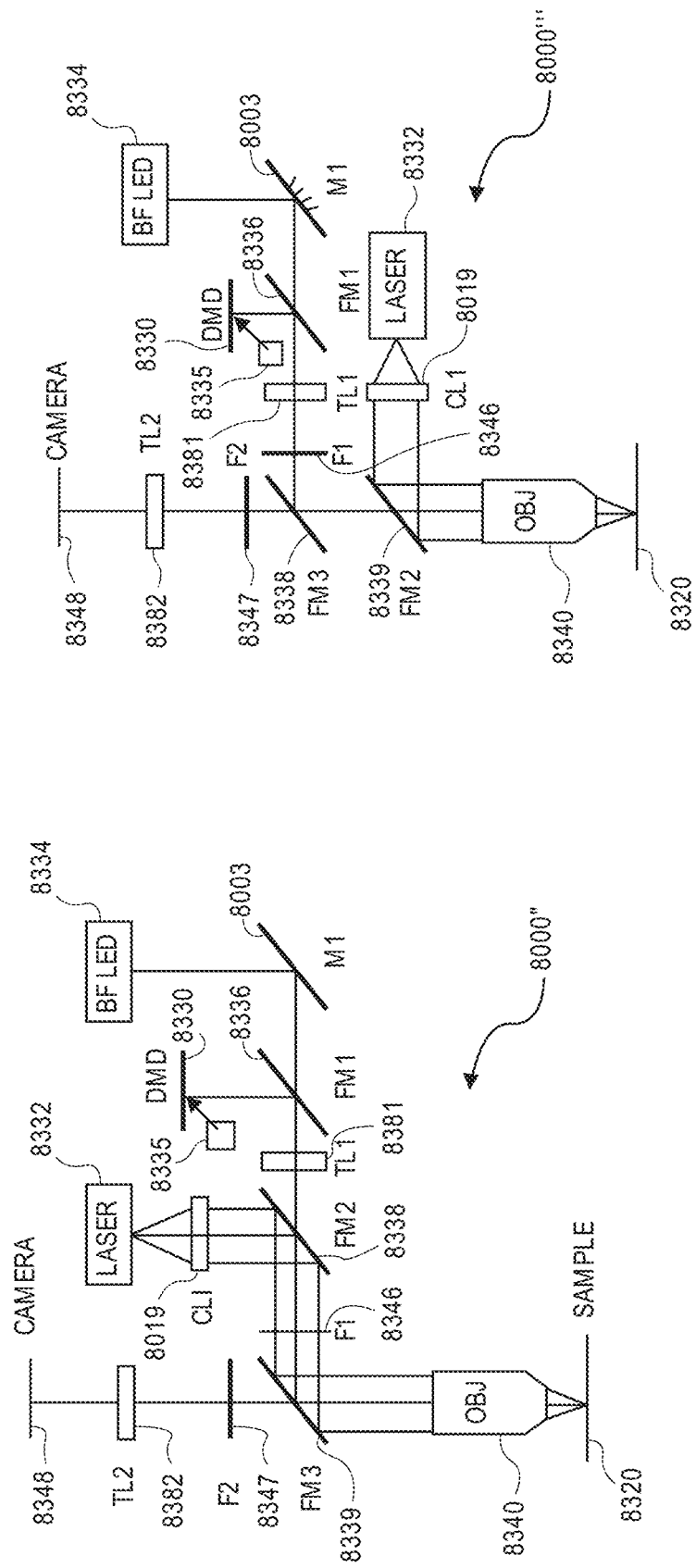

APPARATUSES, SYSTEMS AND METHODS FOR IMAGING MICRO-OBJECTS

PRIORITY CLAIM AND INCORPORATION BY REFERENCE

This application is continuation of International Patent Application No. PCT/US2017/064308, filed Dec. 1, 2017, claiming the benefit under 35 U.S.C. 119(e) of U.S. Provisional Application No. 62/429,066, filed on Dec. 1, 2016, each of which is herein incorporated by reference in its entirety.

All publications and patent applications mentioned in this specification are incorporated herein by reference in their entirety to the same extent as if each individual publication or patent application was specifically and individually indicated to be incorporated by reference.

BACKGROUND

As the field of microfluidics continues to progress, microfluidic devices have become convenient platforms for processing and manipulating micro-objects such as biological cells. For example, light-actuated microfluidic devices offer some desirable capabilities, including the ability to select and manipulate individual micro-objects. In general, light-actuated microfluidic devices (e.g., optoelectronic tweezers (OET) devices) utilize optically induced dielectrophoresis (DEP) to manipulate micro-objects. For example, micro-objects can be moved around and merged within the microfluidic devices. Simultaneous manipulation, analysis and selection of micro-objects such as single cells can be valuable in biologic discovery and development as well as single cell annotation and genomics.

However, conventional microscopes are not designed to view the micro-objects in microfluidic devices, particularly light actuated microfluidic devices. Thus, the images of the micro-objects obtained by using conventional microscopes may have large aberrations, which degrade the quality of the images. In addition, the optical apparatus design in a conventional microscope may have some amount of out-of-focus light in the images, which may result in high level of noise in the images and decrease the contrast and resolution of the images. Furthermore, there is often mechanical constraint for the optical apparatus because of the limited compact space available for the optical apparatus for the micro-fluidic devices. Therefore, there is a need to develop apparatuses, systems and related methods for imaging and manipulating micro-objects to overcome the problems and challenges discussed above.

SUMMARY OF THE DISCLOSURE

The present disclosure relates to optical apparatuses, systems and methods for imaging and manipulating micro-objects. In particular, the disclosure relates to an optical apparatus for imaging and manipulating micro-objects in a light-actuated microfluidic device and related systems and methods.

Disclosed herein is an optical apparatus for imaging and/or manipulating micro-objects in a microfluidic device, such as a light-actuated microfluidic (LAMF) device. The optical apparatus can comprise a first light source, a structured light modulator, a first tube lens, an objective lens, a dichroic beam splitter, a second tube lens and an image sensor. The structured light modulator can be configured to receive unstructured light beams from the first light source and transmit structured light beams to the first tube lens. The structured light beams can be suitable for selectively activating one or more of a plurality of dielectrophoresis (DEP) electrodes on a surface of a substrate of a LAMF device. The first tube lens can be configured to capture the structured light beams from the structured light modulator. The objective lens can be configured to image at least a portion of an enclosure of a microfluidic device within a field of view. The enclosure can include a flow region and/or a plurality of sequestration pens, each sequestration pen of the plurality is fluidically connected to the flow region. The dichroic beam splitter can be configured to reflect (or transmit) structured light beams from the first tube lens to the objective lens and to transmit (or reflect) image light beams received from the objective lens to the second tube lens. The second tube lens can be configured to receive the image light beams from the dichroic beam splitter and to transmit the light beams to an image sensor. The image sensor can be configured to receive the image light beams from the second tube lens and generate an image of the at least a portion of the enclosure of the microfluidic device therefrom. The optical apparatus can be configured to perform imaging, analysis and manipulation of one or more micro-objects within the enclosure of the microfluidic device.

In some embodiments, the first tube lens has a clear aperture larger than 45 mm and is configured to capture all light beams from the structured light modulator. In some embodiments, the structured light modulator comprises an active area of at least 15 mm (e.g., at least 15.5 mm, 16.0 mm, 16.5 mm, 17.0 mm, or greater). In some embodiments, the first tube lens has an effective focal length of about 162 mm or shorter (e.g., about 161 mm, about 160 mm, about 159 mm, about 158 mm, about 157 mm, about 156 mm, about 155 mm, or shorter). In some embodiments, the first tube lens has an effective focal length of about 155 mm.

In some embodiments, the optical apparatus can further comprise a second light source configured to provide unstructured bright field illumination. In some embodiments, the optical apparatus can further comprise a third light source. The second (or third) light source can be, for example, an LED or a laser light source. The laser light source can be configured to heat up a surface within the enclosure of the microfluidic device and/or fluidic medium located within the enclosure. Heating of the surface or medium can result in the production of gas (e.g., a bubble).

In some embodiments, the optical apparatus can further comprise a nest configured to secure the microfluidic device during imaging. The nest can be further configured to provide at least one electrical connection to the microfluidic device and/or fluidic connections.

In some embodiments, the structured light modulator transmits a plurality of illumination light beams. In some embodiments, the optical apparatus is configured to illuminate a plurality of sequestration pens with a plurality of illumination spots. For example, each sequestration pen of the plurality can be illuminated with a single illumination spot, and each illumination spot can be sized to illuminate all or a portion of the sequestration pen which it is illuminating. In some embodiments, each of the plurality of illumination spots has a size of about 60 microns×120 microns. In some embodiments, each of the plurality of illumination spots has an area of about 7000 to about 20000 square microns (e.g., about 7000 square microns to about 10,000 square microns, about 10,000 square microns to about 15,000 square microns, about 15,000 square microns to about 20,000 square microns, of any range defined by two of the foregoing endpoints).

In some embodiments, the optical apparatus is further configured such that the portion of the enclosure within the field of view is simultaneously in focus at the image sensor and at the structure light modulator. In some embodiments, the optical apparatus is further configured such that only a portion of the enclosure (e.g., an interior area of the flow region and/or each of the plurality of sequestration pens) is imaged onto the image sensor in order to reduce overall noise to achieve high image quality. In some embodiments, the structured light modulator is disposed at a conjugate plane of the image sensor. In some embodiments, the optical apparatus is further configured to perform confocal imaging. In other embodiments, the optical apparatus includes a slide lens which is slideably positioned between the structured light modulator and the first tube lens, wherein the slide lens is configured to support ptychographic microscopy.

In some embodiments, the objective lens is configured to minimize aberration in the image of at least the portion of the plurality of sequestration pens. In some embodiments, the second tube lens is configured to correct a residual aberration of the objective lens. In some embodiments, the optical apparatus can further comprise a correction lens configured to correct a residual aberration of the objective lens. The corrective lens can be located in front of the objective lens (i.e., between the objective lens and the microfluidic device) or behind the objective lens (i.e., between the objective lens and the dichroic beam splitter).

In some embodiments, the optical apparatus can further comprise a control unit configured to adjust an illumination pattern of the structured light modulator to selectively activate the one or more of the plurality of DEP electrodes and generate DEP forces to move the one or more micro-objects inside the plurality of sequestration pens. In some embodiments, the optical apparatus can further comprise a control unit configured to adjust an illumination pattern of the structured light modulator to illuminate select regions within the microfluidic apparatus (e.g., a portion of the flow region and/or a portion of one or more sequestration pens) and, optionally, one or more micro-objects located within the select regions.

Disclosed herein is a system for imaging and manipulating micro-objects. The system can comprise a microfluidic device, such as a light-actuated microfluidic (LAMF) device, an optical apparatus, and a nest. The microfluidic device can comprise an enclosure and a substrate comprising a surface and a plurality of dielectrophoresis (DEP) electrodes on the surface. In some embodiments, the enclosure of the microfluidic device comprises a flow region and, optionally, a plurality of sequestration pens, each sequestration pen of the plurality fluidically connected to the flow region. The flow region and the plurality of sequestration pens may be disposed on the substrate surface. The optical apparatus, which may be any of the optical apparatus described herein, can be configured to perform imaging, analysis, and/or manipulation of one or more micro-objects within the enclosure.

In some embodiments, the system further comprises a control unit configured to adjust an illumination pattern of the structured light modulator to selectively activate one or more of the plurality of DEP electrodes of the substrate of the microfluidic device, thereby generating DEP forces sufficient to move the one or more cells inside the enclosure. In some embodiments, the system further comprises a control unit configured to adjust an illumination pattern of the structured light modulator to illuminate select regions within the microfluidic apparatus (e.g., a portion of the flow region and/or a portion of one or more sequestration pens) and, optionally, one or more micro-objects located within the select regions.

In some embodiments, the system is configured to illuminate at least a portion of the enclosure, including any portion of a flow region and/or a plurality of sequestration pens located within the field of view, with a plurality of illumination spots. For example, each sequestration pen in the field of view can be illuminated with one or more illumination spots, and each illumination spot can be sized to illuminate all or a portion of the sequestration pen which it is illuminating. In some embodiments, each of the plurality of illumination spots has a size of about 60 microns×120 microns. In some embodiments, each of the plurality of illumination spots has an area of about 7000 to about 20000 square microns (e.g., about 7000 square microns to about 10,000 square microns, about 10,000 square microns to about 15,000 square microns, about 15,000 square microns to about 20,000 square microns, of any range defined by two of the foregoing endpoints).

Disclosed herein is a method of manipulating one or more micro-objects of a sample. The method can comprise a step of loading the sample containing the one or more micro-objects into a microfluidic device, such as a light-actuated microfluidic (LAMF) device. The microfluidic device can have an enclosure comprising a substrate having a surface and a plurality of dielectrophoresis (DEP) electrodes on the surface. The microfluidic device can further comprise a flow region and, optionally, a plurality of sequestration pens, each sequestration pen of the plurality fluidically connected to the flow region. The method can comprise a step of applying a voltage potential across the microfluidic device.

The method can further comprise a step of selectively activating a DEP force adjacent to at least one micro-object located within the microfluidic device by using an optical apparatus to project structured light onto a first position on the surface of the substrate of the microfluidic device, wherein the first position is located adjacent to a second position on the surface of the substrate, the second position located beneath the at least one micro-object. The optical apparatus can be any optical apparatus described herein.

The method can further comprise a step of shifting the location of the DEP force generated adjacent to at least one micro-object by using the optical apparatus to move the structured light from the first position on the surface of the substrate of the microfluidic device to a third position on the surface of the substrate.

In some embodiments, the method can further comprise a step of capturing the image of at least a portion of the enclosure of the microfluidic device with the image sensor. In some embodiments, the imaged portion of the enclosure of the microfluidic device comprises a flow region and/or at least one sequestration pen, and at least one micro-object.

In some embodiments, the structured light projected onto the first position on the substrate surface comprises a plurality of illumination spots. In some embodiments, the first position on the substrate surface is located in the flow region of the microfluidic device, and the third position on the substrate surface is located within one of the sequestration pens of the plurality of sequestration pens. In some embodiments, the structured light projected onto the first position on the substrate surface comprises a shape like a line segment or a caret symbol. In some embodiments, the structured light projected onto the first position on the substrate surface has a shape like the outline of a polygon (e.g., a square, rectangle, rhombus, pentagon, etc.), a circle, or the like.

In some embodiments, the method can further comprise a step of selectively activating DEP forces adjacent to a plurality of micro-objects located within the microfluidic device by using the optical apparatus to project structured light onto a plurality of first positions on the surface of the substrate of the microfluidic device, wherein each of the plurality of first positions is located adjacent to a corresponding second position on the surface of the substrate, the corresponding second positions located beneath corresponding micro-objects of the plurality.

In some embodiments, the method can further comprise a step of shifting the location of the DEP forces generated adjacent to the plurality of micro-objects by using the optical apparatus to move the imaged structured light from the plurality of first positions on the substrate surface to a plurality of corresponding third positions on the substrate surface.

In some embodiments, the method can further comprise a step of capturing an image of at least a portion of the enclosure comprises imaging only an interior area of the flow region and/or each sequestration pen located in the portion of the enclosure being imaged, thereby reducing overall noise to achieve high image quality. In some embodiments, the method can further comprise a step of analyzing the image to provide feedback and adjustment of the first position.

Disclosed herein is a method of imaging one or more micro-objects of a sample. The method can comprise loading the sample containing the one or more micro-objects into a microfluidic apparatus having an enclosure comprising a flow region, capturing a plurality of images of at least a portion of the enclosure containing the one or more micro-objects using a plurality of corresponding illumination patterns projected into the at least a portion of the enclosure, and combining the plurality of images to generate a single image of the one or more micro-objects located in the portion of the enclosure. In certain embodiments, each illumination pattern of the plurality is produced using structured light and is different from the other illumination patterns of the plurality. In certain embodiments, the plurality of images is captured using an optical system, which can be any of the optical systems disclosed herein. In certain embodiments, combining the plurality of images comprises processing each of the plurality of images to remove out-of-focus background light.

In some embodiments, an illumination pattern projected into the at least a portion of the enclosure and the corresponding image captured at the image sensor are simultaneously in focus. In some embodiments, the plurality of corresponding illumination patterns is configured to scan through the field of view (e.g., the entire field of view) within the enclosure.

Disclosed herein is a tube lens of an optical apparatus for a microfluidic device, such as a light-actuated microfluidic (LAMF) device. The tube lens can comprise a first surface having a convex shape and a first positive radius of curvature, a second surface having a second radius of curvature, a third surface having a concave shape and a third negative radius of curvature, a fourth surface having a concave shape and a fourth negative radius of curvature, and a clear aperture with a diameter lager than 45 mm, wherein a front focal point and a back focal point of the tube lens are not equally spaced from a midpoint and are not located symmetric.

In some embodiments, a Back Focal Length (BFL) is minimized. In some embodiments, the tube lens has an Effective Focal Length (EFL) of about 155 mm and a Back Focal Length (BFL) of about 135 mm. In some embodiments, the tube lens has an Effective Focal Length (EFL) of about 162 mm and a Back Focal Length (BFL) of about 146 mm. In some embodiments, the tube lens has an Effective Focal Length (EFL) of about 180 mm and a Back Focal Length (BFL) of about 164 mm.

In some embodiments, the tube lens has an Effective Focal Length (EFL) of about 155 mm, wherein the first positive radius of curvature is about 91 mm, the second radius of curvature is about 42 mm, the third negative radius of curvature is about −62 mm, and the fourth negative radius of curvature is about −116 mm.

In some embodiments, the tube lens has an Effective Focal Length (EFL) of about 162 mm, wherein the first positive radius of curvature is about 95 mm, the second radius of curvature is about 54 mm, the third negative radius of curvature is about −56 mm, and the fourth negative radius of curvature is about −105 mm.

In some embodiments, the tube lens has an Effective Focal Length (EFL) of about 180 mm, wherein the first positive radius of curvature is about 95 mm, the second radius of curvature is about 64 mm, the third negative radius of curvature is about −60 mm, and the fourth negative radius of curvature is about −126 mm.

In some embodiments, the tube lens has an Effective Focal Length (EFL) of about 200 mm, wherein the first positive radius of curvature is about 160 mm, the second radius of curvature is about −62 mm, the third negative radius of curvature is about −80 mm, and the fourth negative radius of curvature is about −109 mm.

BRIEF DESCRIPTION OF THE DRAWINGS

The novel features of the invention are set forth with particularity in the claims that follow. A better understanding of the features and advantages of the disclosure will be obtained by reference to the following detailed description that sets forth illustrative embodiments, in which the principles of the disclosure are utilized, and the accompanying drawings of which:

FIG. 5A is a schematic of a plurality of light sources for an optical apparatus and a microfluidic device according to some other embodiments of the disclosure.

FIG. 5B illustrates an example dichromic beam splitter for the plurality of light sources for the optical apparatus in FIG. 5A.

FIG. 6B is a schematic of a system including an optical apparatus where a beam splitter is configured to reflect light beams from a first light source according to some other embodiments of the disclosure.

FIGS. 8A-8D illustrate various embodiments of optical configurations that can be used by the optical system.

DETAILED DESCRIPTION

Figure 1A:
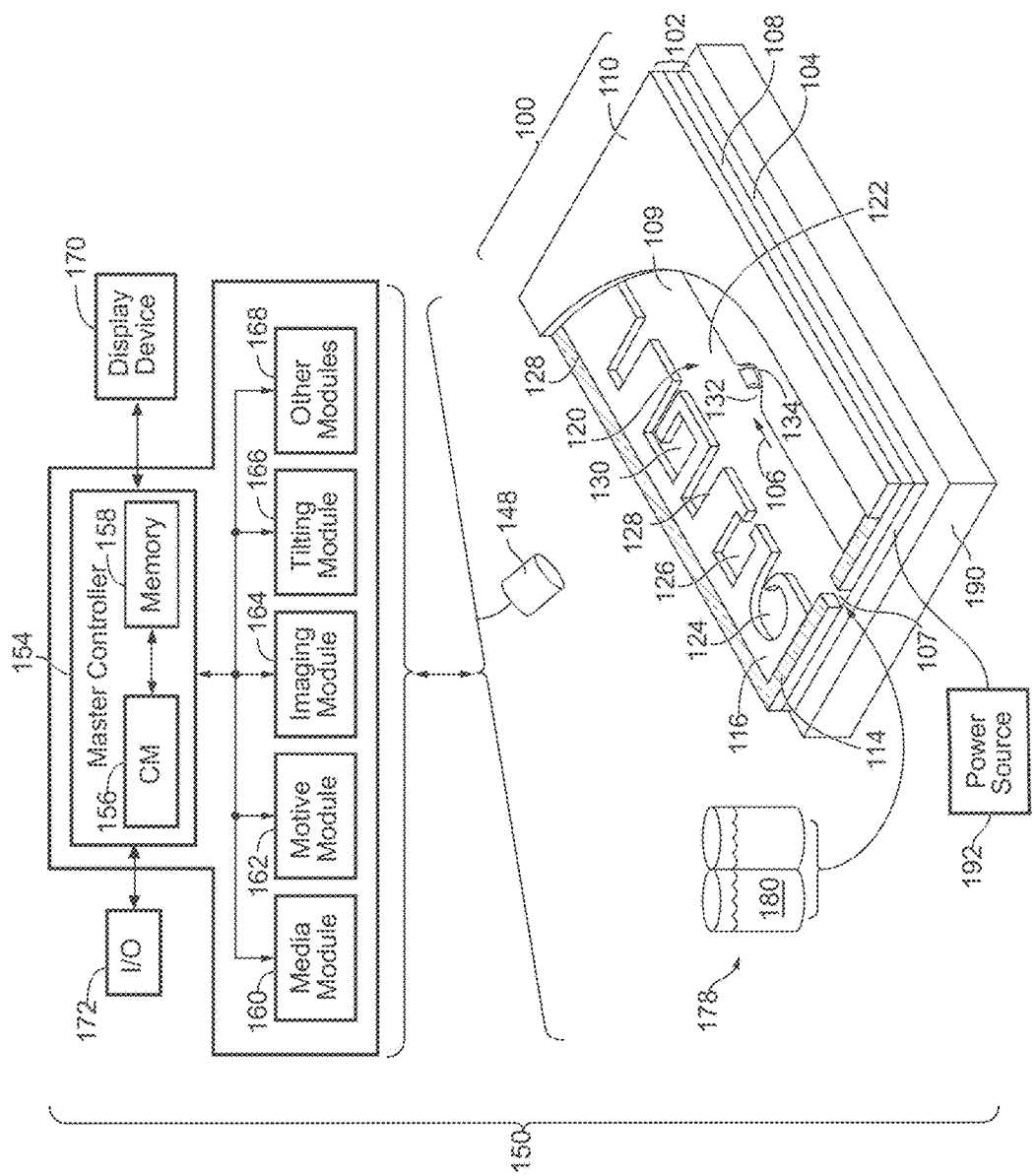
FIG. 1A illustrates an example of a microfluidic device and a system for use with the microfluidic device, including associated control equipment according to some embodiments of the disclosure.

This specification describes exemplary embodiments and applications of the invention. The invention, however, is not limited to these exemplary embodiments and applications or to the manner in which the exemplary embodiments and applications operate or are described herein. Moreover, the figures may show simplified or partial views, and the dimensions of elements in the figures may be exaggerated or otherwise not in proportion. In addition, as the terms "on," "attached to," "connected to," "coupled to," or similar words are used herein, one element (e.g., a material, a layer, a substrate, etc.) can be "on," "attached to," "connected to," or "coupled to" another element regardless of whether the one element is directly on, attached to, connected to, or coupled to the other element or there are one or more intervening elements between the one element and the other element. Also, unless the context dictates otherwise, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements. Section divisions in the specification are for ease of review only and do not limit any combination of elements discussed.

As used herein, "substantially" means sufficient to work for the intended purpose. The term "substantially" thus allows for minor, insignificant variations from an absolute or perfect state, dimension, measurement, result, or the like such as would be expected by a person of ordinary skill in the field but that do not appreciably affect overall performance. When used with respect to numerical values or parameters or characteristics that can be expressed as numerical values, "substantially" means within ten percent.

The term "ones" means more than one.

As used herein, the term "plurality" can be 2, 3, 4, 5, 6, 7, 8, 9, 10, or more.

As used herein, the term "disposed" encompasses within its meaning "located."

As used herein, a "microfluidic device" or "microfluidic apparatus" is a device that includes one or more discrete microfluidic circuits configured to hold a fluid, each microfluidic circuit comprised of fluidically interconnected circuit elements, including but not limited to region(s), flow path(s), channel(s), chamber(s), and/or pen(s), and at least one port configured to allow the fluid (and, optionally, micro-objects suspended in the fluid) to flow into and/or out of the microfluidic device. Typically, a microfluidic circuit of a microfluidic device will include a flow region, which may include a microfluidic channel, and at least one chamber, and will hold a volume of fluid of less than about 1 mL, e.g., less than about 750, 500, 250, 200, 150, 100, 75, 50, 25, 20, 15, 10, 9, 8, 7, 6, 5, 4, 3, or 2 µL. In certain embodiments, the microfluidic circuit holds about 1-2, 1-3, 1-4, 1-5, 2-5, 2-8, 2-10, 2-12, 2-15, 2-20, 5-20, 5-30, 5-40, 5-50, 10-50, 10-75, 10-100, 20-100, 20-150, 20-200, 50-200, 50-250, or 50-300 µL. The microfluidic circuit may be configured to have a first end fluidically connected with a first port (e.g., an inlet) in the microfluidic device and a second end fluidically connected with a second port (e.g., an outlet) in the microfluidic device.

As used herein, a "nanofluidic device" or "nanofluidic apparatus" is a type of microfluidic device having a microfluidic circuit that contains at least one circuit element configured to hold a volume of fluid of less than about 1 µL, e.g., less than about 750, 500, 250, 200, 150, 100, 75, 50, 25, 20, 15, 10, 9, 8, 7, 6, 5, 4, 3, 2, 1 nL or less. A nanofluidic device may comprise a plurality of circuit elements (e.g., at least 2, 3, 4, 5, 6, 7, 8, 9, 10, 15, 20, 25, 50, 75, 100, 150, 200, 250, 300, 400, 500, 600, 700, 800, 900, 1000, 1500, 2000, 2500, 3000, 3500, 4000, 4500, 5000, 6000, 7000, 8000, 9000, 10,000, or more). In certain embodiments, one or more (e.g., all) of the at least one circuit elements is configured to hold a volume of fluid of about 100 pL to 1 nL, 100 pL to 2 nL, 100 pL to 5 nL, 250 pL to 2 nL, 250 pL to 5 nL, 250 pL to 10 nL, 500 pL to 5 nL, 500 pL to 10 nL, 500 pL to 15 nL, 750 pL to 10 nL, 750 pL to 15 nL, 750 pL to 20 nL, 1 to 10 nL, 1 to 15 nL, 1 to 20 nL, 1 to 25 nL, or 1 to 50 nL. In other embodiments, one or more (e.g., all) of the at least one circuit elements is configured to hold a volume of fluid of about 20 nL to 200 nL, 100 to 200 nL, 100 to 300 nL, 100 to 400 nL, 100 to 500 nL, 200 to 300 nL, 200 to 400 nL, 200 to 500 nL, 200 to 600 nL, 200 to 700 nL, 250 to 400 nL, 250 to 500 nL, 250 to 600 nL, or 250 to 750 nL.

A "microfluidic channel" or "flow channel" as used herein refers to a flow region of a microfluidic device having a length that is significantly longer than both the horizontal and vertical dimensions. For example, the flow channel can be at least 5 times the length of either the horizontal or vertical dimension, e.g., at least 10 times the length, at least 25 times the length, at least 100 times the length, at least 200 times the length, at least 500 times the length, at least 1,000 times the length, at least 5,000 times the length, or longer. In some embodiments, the length of a flow channel is in the range of from about 50,000 microns to about 500,000 microns, including any range therebetween. In some embodiments, the horizontal dimension is in the range of from about 100 microns to about 1000 microns (e.g., about 150 to about 500 microns) and the vertical dimension is in the range of from about 25 microns to about 200 microns, e.g., from about 40 to about 150 microns. It is noted that a flow channel may have a variety of different spatial configurations in a microfluidic device, and thus is not restricted to a perfectly linear element. For example, a flow channel may include one or more sections having any of the following configurations: curve, bend, spiral, incline, decline, fork (e.g., multiple different flow paths), and any combination thereof. In addition, a flow channel may have different cross-sectional areas along its path, widening and constricting to provide a desired fluid flow therein.

As used herein, the term "obstruction" refers generally to a bump or similar type of structure that is sufficiently large so as to partially (but not completely) impede movement of target micro-objects between two different regions or circuit elements in a microfluidic device. The two different regions/circuit elements can be, for example, a microfluidic sequestration pen and a microfluidic channel, or a connection region and an isolation region of a microfluidic sequestration pen.

As used herein, the term "constriction" refers generally to a narrowing of a width of a circuit element (or an interface between two circuit elements) in a microfluidic device. The constriction can be located, for example, at the interface between a microfluidic sequestration pen and a microfluidic channel, or at the interface between an isolation region and a connection region of a microfluidic sequestration pen.

As used herein, the term "transparent" refers to a material which allows visible light to pass through without substantially altering the light as is passes through.

As used herein, the term "micro-object" refers generally to any microscopic object that may be isolated and/or manipulated in accordance with the present invention. Non-limiting examples of micro-objects include: inanimate micro-objects such as microparticles; microbeads (e.g., polystyrene beads, Luminex™ beads, or the like); magnetic beads; microrods; microwires; quantum dots, and the like; biological micro-objects such as cells; biological organelles; vesicles, or complexes; synthetic vesicles; liposomes (e.g., synthetic or derived from membrane preparations); lipid nanorafts, and the like; or a combination of inanimate micro-objects and biological micro-objects (e.g., microbeads attached to cells, liposome-coated micro-beads, liposome-coated magnetic beads, or the like). Beads may include moieties/molecules covalently or non-covalently attached, such as fluorescent labels, proteins, carbohydrates, antigens, small molecule signaling moieties, or other chemical/biological species capable of use in an assay. Lipid nanorafts have been described, for example, in Ritchie et al. (2009) "Reconstitution of Membrane Proteins in Phospholipid Bilayer Nanodiscs," Methods Enzymol., 464:211-231.

As used herein, the term "cell" is used interchangeably with the term "biological cell." Non-limiting examples of biological cells include eukaryotic cells, plant cells, animal cells, such as mammalian cells, reptilian cells, avian cells, fish cells, or the like, prokaryotic cells, bacterial cells, fungal cells, protozoan cells, or the like, cells dissociated from a tissue, such as muscle, cartilage, fat, skin, liver, lung, neural tissue, and the like, immunological cells, such as T cells, B cells, natural killer cells, macrophages, and the like, embryos (e.g., zygotes), oocytes, ova, sperm cells, hybridomas, cultured cells, cells from a cell line, cancer cells, infected cells, transfected and/or transformed cells, reporter cells, and the like. A mammalian cell can be, for example, from a human, a mouse, a rat, a horse, a goat, a sheep, a cow, a primate, or the like.

A colony of biological cells is "clonal" if all of the living cells in the colony that are capable of reproducing are daughter cells derived from a single parent cell. In certain embodiments, all the daughter cells in a colonal colony are derived from the single parent cell by no more than 10 divisions. In other embodiments, all the daughter cells in a colonal colony are derived from the single parent cell by no more than 14 divisions. In other embodiments, all the daughter cells in a colonal colony are derived from the single parent cell by no more than 17 divisions. In other embodiments, all the daughter cells in a colonal colony are derived from the single parent cell by no more than 20 divisions. The term "clonal cells" refers to cells of the same clonal colony.

As used herein, a "colony" of biological cells refers to 2 or more cells (e.g. about 2 to about 20, about 4 to about 40, about 6 to about 60, about 8 to about 80, about 10 to about 100, about 20 about 200, about 40 about 400, about 60 about 600, about 80 about 800, about 100 about 1000, or greater than 1000 cells).

As used herein, the term "maintaining (a) cell(s)" refers to providing an environment comprising both fluidic and gaseous components and, optionally a surface, that provides the conditions necessary to keep the cells viable and/or expanding.

A "component" of a fluidic medium is any chemical or biochemical molecule present in the medium, including solvent molecules, ions, small molecules, antibiotics, nucleotides and nucleosides, nucleic acids, amino acids, peptides, proteins, sugars, carbohydrates, lipids, fatty acids, cholesterol, metabolites, or the like.

As used herein in reference to a fluidic medium, "diffuse" and "diffusion" refer to thermodynamic movement of a component of the fluidic medium down a concentration gradient.

The phrase "flow of a medium" means bulk movement of a fluidic medium primarily due to any mechanism other than diffusion. For example, flow of a medium can involve movement of the fluidic medium from one point to another point due to a pressure differential between the points. Such flow can include a continuous, pulsed, periodic, random, intermittent, or reciprocating flow of the liquid, or any combination thereof. When one fluidic medium flows into another fluidic medium, turbulence and mixing of the media can result.

The phrase "substantially no flow" refers to a rate of flow of a fluidic medium that, averaged over time, is less than the rate of diffusion of components of a material (e.g., an analyte of interest) into or within the fluidic medium. The rate of diffusion of components of such a material can depend on, for example, temperature, the size of the components, and the strength of interactions between the components and the fluidic medium.

As used herein in reference to different regions within a microfluidic device, the phrase "fluidically connected" means that, when the different regions are substantially filled with fluid, such as fluidic media, the fluid in each of the regions is connected so as to form a single body of fluid. This does not mean that the fluids (or fluidic media) in the different regions are necessarily identical in composition. Rather, the fluids in different fluidically connected regions of a microfluidic device can have different compositions (e.g., different concentrations of solutes, such as proteins, carbohydrates, ions, or other molecules) which are in flux as solutes move down their respective concentration gradients and/or fluids flow through the device.

A microfluidic (or nanofluidic) device can comprise "swept" regions and "unswept" regions. As used herein, a "swept" region is comprised of one or more fluidically interconnected circuit elements of a microfluidic circuit, each of which experiences a flow of medium when fluid is flowing through the microfluidic circuit. The circuit elements of a swept region can include, for example, regions, channels, and all or parts of chambers. As used herein, an "unswept" region is comprised of one or more fluidically interconnected circuit element of a microfluidic circuit, each of which experiences substantially no flux of fluid when fluid is flowing through the microfluidic circuit. An unswept region can be fluidically connected to a swept region, provided the fluidic connections are structured to enable diffusion but substantially no flow of media between the swept region and the unswept region. The microfluidic device can thus be structured to substantially isolate an unswept region from a flow of medium in a swept region, while enabling substantially only diffusive fluidic communication between the swept region and the unswept region. For example, a flow channel of a microfluidic device is an example of a swept region while an isolation region (described in further detail below) of a microfluidic device is an example of an unswept region.

As used herein, a "flow path" refers to one or more fluidically connected circuit elements (e.g. channel(s), region(s), chamber(s) and the like) that define, and are subject to, the trajectory of a flow of medium. A flow path is thus an example of a swept region of a microfluidic device. Other circuit elements (e.g., unswept regions) may be fluidically connected with the circuit elements that comprise the flow path without being subject to the flow of medium in the flow path.

As used herein, the "clear aperture" of a lens (or lens assembly) is the diameter or size of the portion of the lens (or lens assembly) that can be used for its intended purpose. Due to manufacturing constraints, it is virtually impossible to produce a clear aperture equal to the actual physical diameter of the lens (or lens assembly).

As used herein, the term "active area" refers to the portion of an image sensor or structured light modulator that can be used, respectively, to image or provide structured light to a field of view in a particular optical apparatus. The active area is subject to constraints of the optical apparatus, such as the aperture stop of the light path within the optical apparatus. Although the active area corresponds to a two-dimensional surface, the measurement of active area typically corresponds to the length of a diagonal line through opposing corners of a square having the same area.

As used herein, an "image light beam" is an electromagnetic wave that is reflected or emitted from a device surface, a micro-object, or a fluidic medium that is being viewed by an optical apparatus. The device can be a microfluidic device, such as a light-actuated microfluidic (LAMF) device. The micro-object and the fluidic medium can be located within such a microfluidic device.

As used herein: µm means micrometer, $µm^3$ means cubic micrometer, pL means picoliter, nL means nanoliter, and µL (or uL) means microliter.

Methods of loading. Loading of biological micro-objects or micro-objects such as, but not limited to, beads, can involve the use of fluid flow, gravity, a dielectrophoresis (DEP) force, electrowetting, a magnetic force, or any combination thereof as described herein. The DEP force can be optically actuated, such as by an optoelectronic tweezers (OET) configuration and/or electrically actuated, such as by activation of electrodes/electrode regions in a temporal/spatial pattern. Similarly, electrowetting force may be optically actuated, such as by an opto-electro wetting (OEW) configuration and/or electrically actuated, such as by activation of electrodes/electrode regions in a temporal spatial pattern.

The present disclosure relates to optical apparatuses, systems and methods for viewing and manipulating micro-objects. In particular, the disclosure relates to an optical apparatus for viewing and manipulating micro-objects in a microfluidic device, such as a light-actuated microfluidic device, and related systems and methods.

Disclosed herein is an optical apparatus for viewing and/or manipulating micro-objects in a microfluidic device. The optical apparatus is configured to perform imaging, analysis and manipulation of one or more micro-objects within an enclosure of the microfluidic device. The optical apparatus can comprise a first light source, a structured light modulator, a first tube lens, an objective lens, a dichroic beam splitter, a second tube lens, and an image sensor. The structured light modulator is configured to receive unstructured light beams from the first light source and transmit structured light beams for imaging and/or selectively activating one or more of a plurality of dielectrophoresis (DEP) electrodes on a surface of a substrate of the microfluidic device, including any of the light-actuated microfluidic devices discussed herein. The first tube lens is configured to capture the structured light beams from the structured light modulator. The objective lens is configured to image a field of view comprising at least a portion of the enclosure of the microfluidic device. The dichroic beam splitter is configured to reflect (or transmit) light beams from the first tube lens to the objective lens and to transmit (or reflect) image light beams received from the objective lens to the second tube lens. The second tube lens is configured to receive the image light beams from the dichroic beam splitter and to transmit the image light beams to an image sensor. The image sensor is configured to receive the image light beams from the second tube lens and generate therefrom an image of the field of view.

Disclosed herein is a system for observing and manipulating micro-objects. The system can comprise a microfluidic device and an optical apparatus for imaging and/or manipulating micro-objects in the microfluidic device. The microfluidic device can comprise an enclosure having a substrate. The microfluidic device can further comprise a flow region and a plurality of sequestration pens, each of which are fluidically connected to the flow region. The substrate can comprise a surface and a plurality of dielectrophoresis (DEP) electrodes on or comprised by the surface. The microfluidic device can further comprise a cover, which may comprises a ground electrode that is transparent to visible light. The details of such microfluidic apparatus are described elsewhere herein and in the art. See, e.g., International Patent Application Publication No. WO 2016/

094507, filed Dec. 9, 2015; U.S. Pat. No. 9,403,172, filed Oct. 10, 2013; and International Patent Application Publication No. WO 2014/074367, filed Oct. 30, 2013. The optical apparatus can be configured to perform imaging, analysis and manipulation of one or more micro-objects within the enclosure. The optical apparatus can comprise a first light source, a structured light modulator, a first tube lens and a second tube lens, an objective lens, a dichroic beam splitter and an image sensor. The structured light modulator can be configured to receive light from the first light source and transmit structured light beams to selectively image and/or activate one or more of the plurality of DEP electrodes on the surface of the substrate of the microfluidic device. The first tube lens can be configured to capture light from the structured light modulator. The objective lens can be configured to image a field of view comprising at least a portion of the flow region and/or a portion of the plurality of sequestration pens within the microfluidic device. The dichroic beam splitter can be configured to reflect or transmit structured light beams from the first tube lens to the objective lens and to transmit or reflect image light beams received from the objective lens to a second tube lens. The second tube lens is configured to receive the image light beams from the dichroic beam splitter and to transmit the image light beams to an image sensor. The image sensor is configured to receive the image light beams and generate therefrom an image of the field of view.

Disclosed herein are microfluidic devices and systems for operating and observing such devices. FIG. 1A illustrates an example of a microfluidic device 100 and a system 150 which can be used for the screening and detection of antibody-producing cells that secrete antibodies that bind (e.g., specifically bind) to an antigen of interest. A perspective view of the microfluidic device 100 is shown having a partial cut-away of its cover 110 to provide a partial view into the microfluidic device 100. The microfluidic device 100 generally comprises a microfluidic circuit 120 comprising a flow path 106 through which a fluidic medium 180 can flow, optionally carrying one or more micro-objects (not shown) into and/or through the microfluidic circuit 120. Although a single microfluidic circuit 120 is illustrated in FIG. 1A, suitable microfluidic devices can include a plurality (e.g., 2 or 3) of such microfluidic circuits. Regardless, the microfluidic device 100 can be configured to be a nanofluidic device. In the embodiment illustrated in FIG. 1A, the microfluidic circuit 120 comprises a plurality of microfluidic sequestration pens 124, 126, 128, and 130, each having an opening (e.g., a single opening) in fluidic communication with flow path 106. As discussed further below, the microfluidic sequestration pens comprise various features and structures that have been optimized for retaining micro-objects in the microfluidic device, such as microfluidic device 100, even when a medium 180 is flowing through the flow path 106. Before turning to the foregoing, however, a brief description of microfluidic device 100 and system 150 is provided.

As generally illustrated in FIG. 1A, the microfluidic circuit 120 is defined by an enclosure 102. Although the enclosure 102 can be physically structured in different configurations, in the example shown in FIG. 1A the enclosure 102 is depicted as comprising a support structure 104 (e.g., a base), a microfluidic circuit structure 108, and a cover 110. The support structure 104, microfluidic circuit structure 108, and cover 110 can be attached to each other. For example, the microfluidic circuit structure 108 can be disposed on an inner surface 109 of the support structure 104, and the cover 110 can be disposed over the microfluidic circuit structure 108. Together with the support structure 104 and cover 110, the microfluidic circuit structure 108 can define the elements of the microfluidic circuit 120.

The support structure 104 can be at the bottom and the cover 110 at the top of the microfluidic circuit 120 as illustrated in FIG. 1A. Alternatively, the support structure 104 and the cover 110 can be configured in other orientations. For example, the support structure 104 can be at the top and the cover 110 at the bottom of the microfluidic circuit 120. Regardless, there can be one or more ports 107 each comprising a passage into or out of the enclosure 102. Examples of a passage include a valve, a gate, a pass-through hole, or the like. As illustrated, port 107 is a pass-through hole created by a gap in the microfluidic circuit structure 108. However, the port 107 can be situated in other components of the enclosure 102, such as the cover 110. Only one port 107 is illustrated in FIG. 1A but the microfluidic circuit 120 can have two or more ports 107. For example, there can be a first port 107 that functions as an inlet for fluid entering the microfluidic circuit 120, and there can be a second port 107 that functions as an outlet for fluid exiting the microfluidic circuit 120. Whether a port 107 function as an inlet or an outlet can depend upon the direction that fluid flows through flow path 106.

The support structure 104 can comprise one or more electrodes (not shown) and a substrate or a plurality of interconnected substrates. For example, the support structure 104 can comprise one or more semiconductor substrates, each of which is electrically connected to an electrode (e.g., all or a subset of the semiconductor substrates can be electrically connected to a single electrode). The support structure 104 can further comprise a printed circuit board assembly ("PCBA"). For example, the semiconductor substrate(s) can be mounted on a PCBA.

The microfluidic circuit structure 108 can define circuit elements of the microfluidic circuit 120. Such circuit elements can comprise spaces or regions that can be fluidly interconnected when microfluidic circuit 120 is filled with fluid, such as flow regions (which may include or be one or more flow channels), chambers, pens, traps, and the like. In the microfluidic circuit 120 illustrated in FIG. 1A, the microfluidic circuit structure 108 comprises a frame 114 and a microfluidic circuit material 116. The frame 114 can partially or completely enclose the microfluidic circuit material 116. The frame 114 can be, for example, a relatively rigid structure substantially surrounding the microfluidic circuit material 116. For example, the frame 114 can comprise a metal material.

The microfluidic circuit material 116 can be patterned with cavities or the like to define circuit elements and interconnections of the microfluidic circuit 120. The microfluidic circuit material 116 can comprise a flexible material, such as a flexible polymer (e.g. rubber, plastic, elastomer, silicone, polydimethylsiloxane ("PDMS"), or the like), which can be gas permeable. Other examples of materials that can compose microfluidic circuit material 116 include molded glass, an etchable material such as silicone (e.g. photo-patternable silicone or "PPS"), photo-resist (e.g., SU8), or the like. In some embodiments, such materials—and thus the microfluidic circuit material 116—can be rigid and/or substantially impermeable to gas. Regardless, microfluidic circuit material 116 can be disposed on the support structure 104 and inside the frame 114.

The cover 110 can be an integral part of the frame 114 and/or the microfluidic circuit material 116. Alternatively, the cover 110 can be a structurally distinct element, as illustrated in FIG. 1A. The cover 110 can comprise the same or different materials than the frame 114 and/or the microfluidic circuit material 116. Similarly, the support structure 104 can be a separate structure from the frame 114 or microfluidic circuit material 116 as illustrated, or an integral part of the frame 114 or microfluidic circuit material 116. Likewise, the frame 114 and microfluidic circuit material 116 can be separate structures as shown in FIG. 1A or integral portions of the same structure.

In some embodiments, the cover 110 can comprise a rigid material. The rigid material may be glass or a material with similar properties. In some embodiments, the cover 110 can comprise a deformable material. The deformable material can be a polymer, such as PDMS. In some embodiments, the cover 110 can comprise both rigid and deformable materials. For example, one or more portions of cover 110 (e.g., one or more portions positioned over sequestration pens 124, 126, 128, 130) can comprise a deformable material that interfaces with rigid materials of the cover 110. In some embodiments, the cover 110 can further include one or more electrodes. The one or more electrodes can comprise a conductive oxide, such as indium-tin-oxide (ITO), which may be coated on glass or a similarly insulating material. Alternatively, the one or more electrodes can be flexible electrodes, such as single-walled nanotubes, multi-walled nanotubes, nanowires, clusters of electrically conductive nanoparticles, or combinations thereof, embedded in a deformable material, such as a polymer (e.g., PDMS). Flexible electrodes that can be used in microfluidic devices have been described, for example, in U.S. 2012/0325665 (Chiou et al.), the contents of which are incorporated herein by reference. In some embodiments, the cover 110 can be modified (e.g., by conditioning all or part of a surface that faces inward toward the microfluidic circuit 120) to support cell adhesion, viability and/or growth. The modification may include a coating of a synthetic or natural polymer. In some embodiments, the cover 110 and/or the support structure 104 can be transparent to light. The cover 110 may also include at least one material that is gas permeable (e.g., PDMS or PPS).

FIG. 1A also shows a system 150 for operating and controlling microfluidic devices, such as microfluidic device 100. System 150 includes an electrical power source 192, an imaging device 194 (incorporated within imaging module 164, where device 194 is not illustrated in FIG. 1A, per se), and a tilting device 190 (incorporated within tilting module 166, where device 190 is not illustrated in FIG. 1).

The electrical power source 192 can provide electric power to the microfluidic device 100 and/or tilting device 190, providing biasing voltages or currents as needed. The electrical power source 192 can, for example, comprise one or more alternating current (AC) and/or direct current (DC) voltage or current sources. The imaging device 194 (part of imaging module 164, discussed below) can comprise a device, such as a digital camera, for capturing images inside microfluidic circuit 120. In some instances, the imaging device 194 further comprises a detector having a fast frame rate and/or high sensitivity (e.g. for low light applications). The imaging device 194 can also include a mechanism for directing stimulating radiation and/or light beams into the microfluidic circuit 120 and collecting radiation and/or light beams reflected or emitted from the microfluidic circuit 120 (or micro-objects contained therein). The emitted light beams may be in the visible spectrum and may, e.g., include fluorescent emissions. The reflected light beams may include reflected emissions originating from an LED or a wide spectrum lamp, such as a mercury lamp (e.g. a high pressure mercury lamp) or a Xenon arc lamp. As discussed with respect to FIG. 3B, the imaging device 194 may further include a microscope (or an optical apparatus), which may or may not include an eyepiece.

System 150 further comprises a tilting device 190 (part of tilting module 166, discussed below) configured to rotate a microfluidic device 100 about one or more axes of rotation. In some embodiments, the tilting device 190 is configured to support and/or hold the enclosure 102 comprising the microfluidic circuit 120 about at least one axis such that the microfluidic device 100 (and thus the microfluidic circuit 120) can be held in a level orientation (i.e. at 0° relative to x- and y-axes), a vertical orientation (i.e. at 90° relative to the x-axis and/or the y-axis), or any orientation therebetween. The orientation of the microfluidic device 100 (and the microfluidic circuit 120) relative to an axis is referred to herein as the "tilt" of the microfluidic device 100 (and the microfluidic circuit 120). For example, the tilting device 190 can tilt the microfluidic device 100 at 0.1°, 0.2°, 0.3°, 0.4°, 0.5°, 0.6°, 0.7°, 0.8°, 0.9°, 1°, 2°, 3°, 4°, 5°, 10°, 15°, 20°, 25°, 30°, 35°, 40°, 45°, 50°, 55°, 60°, 65°, 70°, 75°, 80°, 90° relative to the x-axis or any degree therebetween. The level orientation (and thus the x- and y-axes) is defined as normal to a vertical axis defined by the force of gravity. The tilting device can also tilt the microfluidic device 100 (and the microfluidic circuit 120) to any degree greater than 90° relative to the x-axis and/or y-axis, or tilt the microfluidic device 100 (and the microfluidic circuit 120) 180° relative to the x-axis or the y-axis in order to fully invert the microfluidic device 100 (and the microfluidic circuit 120). Similarly, in some embodiments, the tilting device 190 tilts the microfluidic device 100 (and the microfluidic circuit 120) about an axis of rotation defined by flow path 106 or some other portion of microfluidic circuit 120.

In some instances, the microfluidic device 100 is tilted into a vertical orientation such that the flow path 106 is positioned above or below one or more sequestration pens. The term "above" as used herein denotes that the flow path 106 is positioned higher than the one or more sequestration pens on a vertical axis defined by the force of gravity (i.e. an object in a sequestration pen above a flow path 106 would have a higher gravitational potential energy than an object in the flow path). The term "below" as used herein denotes that the flow path 106 is positioned lower than the one or more sequestration pens on a vertical axis defined by the force of gravity (i.e. an object in a sequestration pen below a flow path 106 would have a lower gravitational potential energy than an object in the flow path).

In some instances, the tilting device 190 tilts the microfluidic device 100 about an axis that is parallel to the flow path 106. Moreover, the microfluidic device 100 can be tilted to an angle of less than 90° such that the flow path 106 is located above or below one or more sequestration pens without being located directly above or below the sequestration pens. In other instances, the tilting device 190 tilts the microfluidic device 100 about an axis perpendicular to the flow path 106. In still other instances, the tilting device 190 tilts the microfluidic device 100 about an axis that is neither parallel nor perpendicular to the flow path 106.

System 150 can further include a media source 178. The media source 178 (e.g., a container, reservoir, or the like) can comprise multiple sections or containers, each for holding a different fluidic medium 180. Thus, the media source 178 can be a device that is outside of and separate from the microfluidic device 100, as illustrated in FIG. 1A. Alternatively, the media source 178 can be located in whole or in part inside the enclosure 102 of the microfluidic device 100. For example, the media source 178 can comprise reservoirs that are part of the microfluidic device 100.

FIG. 1A also illustrates simplified block diagram depictions of examples of control and monitoring equipment 152 that constitute part of system 150 and can be utilized in conjunction with a microfluidic device 100. As shown, examples of such control and monitoring equipment 152 include a master controller 154, which can control other control and monitoring equipment, such as a media module 160 for controlling the media source 178, a motive module 162 for controlling movement and/or selection of micro-objects (not shown) and/or medium (e.g., droplets of medium) in the microfluidic circuit 120, an imaging module 164 for controlling an imaging device 194 (e.g., a camera, microscope, light source or any combination thereof) for capturing images (e.g., digital images), and a tilting module 166 for controlling a tilting device 190. The control equipment 152 can also include other modules 168 for controlling, monitoring, or performing other functions with respect to the microfluidic device 100. As shown, the equipment 152 can further include a display device 170 and an input/output device 172.

The master controller 154 can comprise a control module 156 and a digital memory 158. The control module 156 can comprise, for example, a digital processor configured to operate in accordance with machine executable instructions (e.g., software, firmware, source code, or the like) stored as non-transitory data or signals in the memory 158. Alternatively, or in addition, the control module 156 can comprise hardwired digital circuitry and/or analog circuitry. The media module 160, motive module 162, imaging module 164, tilting module 166, and/or other modules 168 can be similarly configured. Thus, functions, processes acts, actions, or steps of a process discussed herein as being performed with respect to the microfluidic device 100 or any other microfluidic apparatus can be performed by any one or more of the master controller 154, media module 160, motive module 162, imaging module 164, tilting module 166, and/or other modules 168 configured as discussed above. Similarly, the master controller 154, media module 160, motive module 162, imaging module 164, tilting module 166, and/or other modules 168 may be communicatively coupled to transmit and receive data used in any function, process, act, action or step discussed herein.

The media module 160 controls the media source 178. For example, the media module 160 can control the media source 178 to input a selected fluidic medium 180 into the enclosure 102 (e.g., through an inlet port 107). The media module 160 can also control removal of media from the enclosure 102 (e.g., through an outlet port (not shown)). One or more media can thus be selectively input into and removed from the microfluidic circuit 120. The media module 160 can also control the flow of fluidic medium 180 in the flow path 106 inside the microfluidic circuit 120. For example, in some embodiments media module 160 stops the flow of media 180 in the flow path 106 and through the enclosure 102 prior to the tilting module 166 causing the tilting device 190 to tilt the microfluidic device 100 to a desired angle of incline.

The motive module 162 can be configured to control selection, trapping, and movement of micro-objects (not shown) in the microfluidic circuit 120. As discussed below with respect to FIGS. 1B and 1C, the enclosure 102 can comprise a dielectrophoresis (DEP), optoelectronic tweezers (OET), and/or opto-electrowetting (OEW) configuration (not shown in FIG. 1A), and the motive module 162 can control the activation of electrodes and/or transistors (e.g., phototransistors) to select and move micro-objects (not shown) and/or droplets of medium (not shown) in the flow path 106 and/or sequestration pens 124, 126, 128, 130.

The imaging module 164 can control the imaging device 194. For example, the imaging module 164 can receive and process image data from the imaging device 194. Image data from the imaging device 194 can comprise any type of information captured by the imaging device 194 (e.g., the presence or absence of micro-objects, droplets of medium, accumulation of label, such as fluorescent label, etc.). Using the information captured by the imaging device 194, the imaging module 164 can further calculate the position of objects (e.g., micro-objects, droplets of medium) and/or the rate of motion of such objects within the microfluidic device 100.

The tilting module 166 can control the tilting motions of tilting device 190. Alternatively, or in addition, the tilting module 166 can control the tilting rate and timing to optimize transfer of micro-objects to the one or more sequestration pens via gravitational forces. The tilting module 166 is communicatively coupled with the imaging module 164 to receive data describing the motion of micro-objects and/or droplets of medium in the microfluidic circuit 120. Using this data, the tilting module 166 may adjust the tilt of the microfluidic circuit 120 in order to adjust the rate at which micro-objects and/or droplets of medium move in the microfluidic circuit 120. The tilting module 166 may also use this data to iteratively adjust the position of a micro-object and/or droplet of medium in the microfluidic circuit 120.

In the example shown in FIG. 1A, the microfluidic circuit 120 is illustrated as comprising a microfluidic channel 122 and sequestration pens 124, 126, 128, 130. Each pen comprises a single opening to channel 122, but otherwise is enclosed such that the pens can substantially isolate micro-objects inside the pen from fluidic medium 180 and/or micro-objects in the flow path 106 of channel 122 or in other pens. The walls of the sequestration pen extend from the inner surface 109 of the base to the inside surface of the cover 110 to provide enclosure. The opening of the pen to the channel 122 is oriented at an angle to the flow 106 of fluidic medium 180 such that flow 106 is not directed into the pens. The flow may be tangential or orthogonal to the plane of the opening of the pen. In some instances, pens 124, 126, 128, 130 are configured to physically corral one or more micro-objects within the microfluidic circuit 120. Sequestration pens in accordance with the present invention can comprise various shapes, surfaces and features that are optimized for use with DEP, OET, fluid flow, and/or gravitational forces, as will be discussed and shown in detail below.

The microfluidic circuit 120 may comprise any number of microfluidic sequestration pens. Although five sequestration pens are shown, microfluidic circuit 120 may have fewer or more sequestration pens. As shown, microfluidic sequestration pens 124, 126, 128, and 130 of microfluidic circuit 120 each comprise differing features and shapes which may provide one or more benefits useful in screening antibody-producing cells, such as isolating one antibody-producing cell from another antibody-producing cell. Microfluidic sequestration pens 124, 126, 128, and 130 may provide other benefits, such as facilitating single-cell loading and/or growth of colonies (e.g., clonal colonies) of antibody-producing cells. In some embodiments, the microfluidic circuit 120 comprises a plurality of identical microfluidic sequestration pens.

In some embodiments, the microfluidic circuit 120 comprises a plurality of microfluidic sequestration pens, wherein two or more of the sequestration pens comprise differing structures and/or features which provide differing benefits for screening antibody-producing cells. Microfluidic devices useful for screening antibody-producing cells may include any of the sequestration pens 124, 126, 128, and 130 or variations thereof, and/or may include pens configured like those shown in FIGS. 2B, 2C, 2D, 2E and 2F, as discussed below.

In the embodiment illustrated in FIG. 1A, a single channel 122 and flow path 106 is shown. However, other embodiments may contain multiple channels 122, each configured to comprise a flow path 106. The microfluidic circuit 120 further comprises an inlet valve or port 107 in fluid communication with the flow path 106 and fluidic medium 180, whereby fluidic medium 180 can access channel 122 via the inlet port 107. In some instances, the flow path 106 comprises a single path. In some instances, the single path is arranged in a zigzag pattern whereby the flow path 106 travels across the microfluidic device 100 two or more times in alternating directions.

In some instances, microfluidic circuit 120 comprises a plurality of parallel channels 122 and flow paths 106, wherein the fluidic medium 180 within each flow path 106 flows in the same direction. In some instances, the fluidic medium within each flow path 106 flows in at least one of a forward or reverse direction. In some instances, a plurality of sequestration pens is configured (e.g., relative to a channel 122) such that the sequestration pens can be loaded with target micro-objects in parallel.

In some embodiments, microfluidic circuit 120 further comprises one or more micro-object traps 132. The traps 132 are generally formed in a wall forming the boundary of a channel 122, and may be positioned opposite an opening of one or more of the microfluidic sequestration pens 124, 126, 128, 130. In some embodiments, the traps 132 are configured to receive or capture a single micro-object from the flow path 106. In some embodiments, the traps 132 are configured to receive or capture a plurality of micro-objects from the flow path 106. In some instances, the traps 132 comprise a volume approximately equal to the volume of a single target micro-object.

The traps 132 may further comprise an opening which is configured to assist the flow of targeted micro-objects into the traps 132. In some instances, the traps 132 comprise an opening having a height and width that is approximately equal to the dimensions of a single target micro-object, whereby larger micro-objects are prevented from entering into the micro-object trap. The traps 132 may further comprise other features configured to assist in retention of targeted micro-objects within the trap 132. In some instances, the trap 132 is aligned with and situated on the opposite side of a channel 122 relative to the opening of a microfluidic sequestration pen, such that upon tilting the microfluidic device 100 about an axis parallel to the channel 122, the trapped micro-object exits the trap 132 at a trajectory that causes the micro-object to fall into the opening of the sequestration pen. In some instances, the trap 132 comprises a side passage 134 that is smaller than the target micro-object in order to facilitate flow through the trap 132 and thereby increase the likelihood of capturing a micro-object in the trap 132.

In some embodiments, dielectrophoretic (DEP) forces are applied across the fluidic medium 180 (e.g., in the flow path and/or in the sequestration pens) via one or more electrodes (not shown) to manipulate, transport, separate and sort micro-objects located therein. For example, in some embodiments, DEP forces are applied to one or more portions of microfluidic circuit 120 in order to transfer a single micro-object from the flow path 106 into a desired microfluidic sequestration pen. In some embodiments, DEP forces are used to prevent a micro-object within a sequestration pen (e.g., sequestration pen 124, 126, 128, or 130) from being displaced therefrom. Further, in some embodiments, DEP forces are used to selectively remove a micro-object from a sequestration pen that was previously collected in accordance with the teachings of the instant invention. In some embodiments, the DEP forces comprise optoelectronic tweezer (OET) forces.

In other embodiments, optoelectrowetting (OEW) forces are applied to one or more positions in the support structure 104 (and/or the cover 110) of the microfluidic device 100 (e.g., positions helping to define the flow path and/or the sequestration pens) via one or more electrodes (not shown) to manipulate, transport, separate and sort droplets located in the microfluidic circuit 120. For example, in some embodiments, OEW forces are applied to one or more positions in the support structure 104 (and/or the cover 110) in order to transfer a single droplet from the flow path 106 into a desired microfluidic sequestration pen. In some embodiments, OEW forces are used to prevent a droplet within a sequestration pen (e.g., sequestration pen 124, 126, 128, or 130) from being displaced therefrom. Further, in some embodiments, OEW forces are used to selectively remove a droplet from a sequestration pen that was previously collected in accordance with the teachings of the instant invention.

In some embodiments, DEP and/or OEW forces are combined with other forces, such as flow and/or gravitational force, so as to manipulate, transport, separate and sort micro-objects and/or droplets within the microfluidic circuit 120. For example, the enclosure 102 can be tilted (e.g., by tilting device 190) to position the flow path 106 and micro-objects located therein above the microfluidic sequestration pens, and the force of gravity can transport the micro-objects and/or droplets into the pens. In some embodiments, the DEP and/or OEW forces can be applied prior to the other forces. In other embodiments, the DEP and/or OEW forces can be applied after the other forces. In still other instances, the DEP and/or OEW forces can be applied at the same time as the other forces or in an alternating manner with the other forces.

Figure 1B:
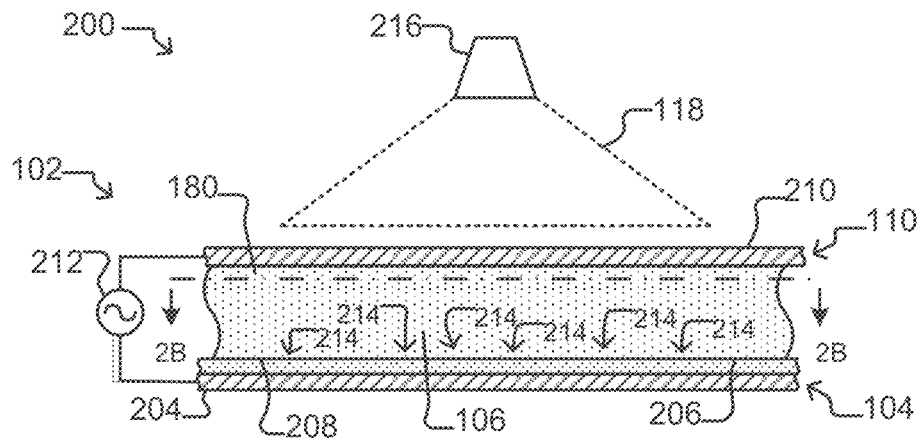
FIGS. 1B and 1C illustrate vertical and horizontal cross-sectional views, respectively, of a microfluidic device according to some embodiments of the disclosure.

FIGS. 1B, 1C, and 2A-2H illustrates various embodiments of microfluidic devices that can be used in the practice of the present invention. FIG. 1B depicts an embodiment in which the microfluidic device 200 is configured as an optically-actuated electrokinetic device. A variety of optically-actuated electrokinetic devices are known in the art, including devices having an optoelectronic tweezer (OET) configuration and devices having an opto-electrowetting (OEW) configuration. Examples of suitable OET configurations are illustrated in the following U.S. patent documents, each of which is incorporated herein by reference in its entirety: U.S. Pat. No. RE 44,711 (Wu et al.) (originally issued as U.S. Pat. No. 7,612,355); U.S. Pat. No. 7,956,339 (Ohta et al.); U.S. Pat. No. 9,403,172 (Wu et al.); and U.S. Patent Application Publication No. 20160184821 (Hobbs et al.). Examples of OEW configurations are illustrated in U.S. Pat. No. 6,958,132 (Chiou et al.); U.S. Patent Application Publication No. 2012/0024708 (Chiou et al.); and U.S. Pat. No. 9,815,056 (Wu et al.), each of which is incorporated by reference herein in its entirety. Yet another example of an optically-actuated electrokinetic device includes a combined OET/OEW configuration, examples of which are shown in U.S. Patent Publication Nos. 20150306598 (Khandros et al.) and 20150306599 (Khandros et al.) and their corresponding PCT Publications WO2015/164846 and WO2015/164847, all of which are incorporated herein by reference in their entirety.

Examples of microfluidic devices having pens in which antibody-producing cells can be placed, cultured, monitored, and/or screened have been described, for example, in U.S. Patent Application Publication Nos. 20140116881 (Chapman et al.), 20150151298 (Hobbs et al.), and 20150165436 (Chapman et al.), each of which is incorporated herein by reference in its entirety. Each of the foregoing applications further describes microfluidic devices configured to produce dielectrophoretic (DEP) forces, such as optoelectronic tweezers (OET) or configured to provide opto-electro wetting (OEW). For example, the optoelectronic tweezers device illustrated in FIG. 2 of U.S. Patent Application Publication Nos. 20140116881 (Chapman et al.) is an example of a device that can be utilized in embodiments of the present invention to select and move an individual biological micro-object or a group of biological micro-objects.

Microfluidic device motive configurations. As described above, the control and monitoring equipment of the system can comprise a motive module for selecting and moving objects, such as micro-objects or droplets, in the microfluidic circuit of a microfluidic device. The microfluidic device can have a variety of motive configurations, depending upon the type of object being moved and other considerations. For example, a dielectrophoresis (DEP) configuration can be utilized to select and move micro-objects in the microfluidic circuit. Thus, the support structure 104 and/or cover 110 of the microfluidic device 100 can comprise a DEP configuration for selectively inducing DEP forces on micro-objects in a fluidic medium 180 in the microfluidic circuit 120 and thereby select, capture, and/or move individual micro-objects or groups of micro-objects. Alternatively, the support structure 104 and/or cover 110 of the microfluidic device 100 can comprise an electrowetting (EW) configuration for selectively inducing EW forces on droplets in a fluidic medium 180 in the microfluidic circuit 120 and thereby select, capture, and/or move individual droplets or groups of droplets.

Figure 1C:
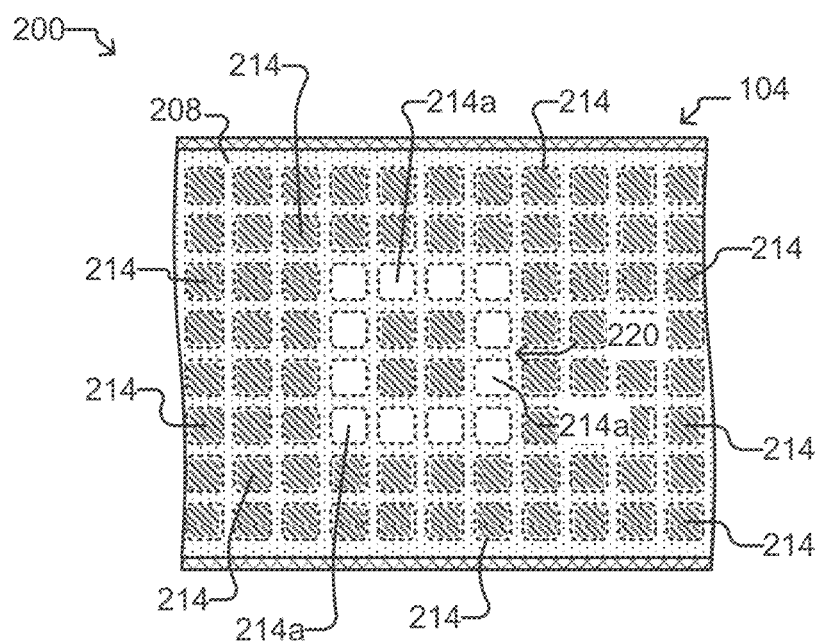

One example of a microfluidic device 200 comprising a DEP configuration is illustrated in FIGS. 1B and 1C. While for purposes of simplicity FIGS. 1B and 1C show a side cross-sectional view and a top cross-sectional view, respectively, of a portion of an enclosure 102 of the microfluidic device 200 having an open region/chamber 202, it should be understood that the region/chamber 202 may be part of a fluidic circuit element having a more detailed structure, such as a growth chamber, a sequestration pen, a flow region, or a flow channel. Furthermore, the microfluidic device 200 may include other fluidic circuit elements. For example, the microfluidic device 200 can include a plurality of growth chambers or sequestration pens and/or one or more flow regions or flow channels, such as those described herein with respect to microfluidic device 100. A DEP configuration may be incorporated into any such fluidic circuit elements of the microfluidic device 200, or select portions thereof. It should be further appreciated that any of the above or below described microfluidic device components and system components may be incorporated in and/or used in combination with the microfluidic device 200. For example, system 150 including control and monitoring equipment 152, described above, may be used with microfluidic device 200, including one or more of the media module 160, motive module 162, imaging module 164, tilting module 166, and other modules 168.

As seen in FIG. 1B, the microfluidic device 200 includes a support structure 104 having a bottom electrode 204 and an electrode activation substrate 206 overlying the bottom electrode 204, and a cover 110 having a top electrode 210, with the top electrode 210 spaced apart from the bottom electrode 204. The top electrode 210 and the electrode activation substrate 206 define opposing surfaces of the region/chamber 202. A medium 180 contained in the region/chamber 202 thus provides a resistive connection between the top electrode 210 and the electrode activation substrate 206. A power source 212 configured to be connected to the bottom electrode 204 and the top electrode 210 and create a biasing voltage between the electrodes, as required for the generation of DEP forces in the region/chamber 202, is also shown. The power source 212 can be, for example, an alternating current (AC) power source.

In certain embodiments, the microfluidic device 200 illustrated in FIGS. 1B and 1C can have an optically-actuated DEP configuration. Accordingly, changing patterns of light 218 from the light source 216, which may be controlled by the motive module 162, can selectively activate and deactivate changing patterns of DEP electrodes at regions 214 of the inner surface 208 of the electrode activation substrate 206. (Hereinafter the regions 214 of a microfluidic device having a DEP configuration are referred to as "DEP electrode regions.") As illustrated in FIG. 1C, a light pattern 218 directed onto the inner surface 208 of the electrode activation substrate 206 can illuminate select DEP electrode regions 214a (shown in white) in a pattern, such as a square. The non-illuminated DEP electrode regions 214 (cross-hatched) are hereinafter referred to as "dark" DEP electrode regions 214. The relative electrical impedance through the DEP electrode activation substrate 206 (i.e., from the bottom electrode 204 up to the inner surface 208 of the electrode activation substrate 206 which interfaces with the medium 180 in the flow region 106) is greater than the relative electrical impedance through the medium 180 in the region/chamber 202 (i.e., from the inner surface 208 of the electrode activation substrate 206 to the top electrode 210 of the cover 110) at each dark DEP electrode region 214. An illuminated DEP electrode region 214a, however, exhibits a reduced relative impedance through the electrode activation substrate 206 that is less than the relative impedance through the medium 180 in the region/chamber 202 at each illuminated DEP electrode region 214a.

With the power source 212 activated, the foregoing DEP configuration creates an electric field gradient in the fluidic medium 180 between illuminated DEP electrode regions 214a and adjacent dark DEP electrode regions 214, which in turn creates local DEP forces that attract or repel nearby micro-objects (not shown) in the fluidic medium 180. DEP electrodes that attract or repel micro-objects in the fluidic medium 180 can thus be selectively activated and deactivated at many different such DEP electrode regions 214 at the inner surface 208 of the region/chamber 202 by changing light patterns 218 projected from a light source 216 into the microfluidic device 200. Whether the DEP forces attract or repel nearby micro-objects can depend on such parameters as the frequency of the power source 212 and the dielectric properties of the medium 180 and/or micro-objects (not shown).

The square pattern 220 of illuminated DEP electrode regions 214a illustrated in FIG. 1C is an example only. Any pattern of the DEP electrode regions 214 can be illuminated (and thereby activated) by the pattern of light 218 projected into the device 200, and the pattern of illuminated/activated DEP electrode regions 214 can be repeatedly changed by changing or moving the light pattern 218.

In some embodiments, the electrode activation substrate 206 can comprise or consist of a photoconductive material. In such embodiments, the inner surface 208 of the electrode activation substrate 206 can be featureless. For example, the electrode activation substrate 206 can comprise or consist of a layer of hydrogenated amorphous silicon (a-Si:H). The a-Si:H can comprise, for example, about 8% to 40% hydrogen (calculated as 100*the number of hydrogen atoms/the total number of hydrogen and silicon atoms). The layer of a-Si:H can have a thickness of about 500 nm to about 2.0 microns. In such embodiments, the DEP electrode regions 214 can be created anywhere and in any pattern on the inner surface 208 of the electrode activation substrate 206, in accordance with the light pattern 218. The number and pattern of the DEP electrode regions 214 thus need not be fixed, but can correspond to the light pattern 218. Examples of microfluidic devices having a DEP configuration comprising a photoconductive layer such as discussed above have been described, for example, in U.S. Pat. No. RE 44,711 (Wu et al.) (originally issued as U.S. Pat. No. 7,612,355).

In other embodiments, the electrode activation substrate 206 can comprise a substrate comprising a plurality of doped layers, electrically insulating layers (or regions), and electrically conductive layers that form semiconductor integrated circuits, such as is known in semiconductor fields. For example, the electrode activation substrate 206 can comprise a plurality of phototransistors, including, for example, lateral bipolar phototransistors, each phototransistor corresponding to a DEP electrode region 214. Alternatively, the electrode activation substrate 206 can comprise electrodes (e.g., conductive metal electrodes) controlled by phototransistor switches, with each such electrode corresponding to a DEP electrode region 214. The electrode activation substrate 206 can include a pattern of such phototransistors or phototransistor-controlled electrodes. The pattern, for example, can be an array of substantially square phototransistors or phototransistor-controlled electrodes arranged in rows and columns, such as shown in FIG. 2B. Alternatively, the pattern can be an array of substantially hexagonal phototransistors or phototransistor-controlled electrodes that form a hexagonal lattice. Regardless of the pattern, electric circuit elements can form electrical connections between the DEP electrode regions 214 at the inner surface 208 of the electrode activation substrate 206 and the bottom electrode 210, and those electrical connections (i.e., phototransistors or electrodes) can be selectively activated and deactivated by the light pattern 218. When not activated, each electrical connection can have high impedance such that the relative impedance through the electrode activation substrate 206 (i.e., from the bottom electrode 204 to the inner surface 208 of the electrode activation substrate 206 which interfaces with the medium 180 in the region/chamber 202) is greater than the relative impedance through the medium 180 (i.e., from the inner surface 208 of the electrode activation substrate 206 to the top electrode 210 of the cover 110) at the corresponding DEP electrode region 214. When activated by light in the light pattern 218, however, the relative impedance through the electrode activation substrate 206 is less than the relative impedance through the medium 180 at each illuminated DEP electrode region 214, thereby activating the DEP electrode at the corresponding DEP electrode region 214 as discussed above. DEP electrodes that attract or repel micro-objects (not shown) in the medium 180 can thus be selectively activated and deactivated at many different DEP electrode regions 214 at the inner surface 208 of the electrode activation substrate 206 in the region/chamber 202 in a manner determined by the light pattern 218.

Examples of microfluidic devices having electrode activation substrates that comprise phototransistors have been described, for example, in U.S. Pat. No. 7,956,339 (Ohta et al.) (see, e.g., device 300 illustrated in FIGS. 21 and 22, and descriptions thereof), the entire contents of which are incorporated herein by reference. Examples of microfluidic devices having electrode activation substrates that comprise electrodes controlled by phototransistor switches have been described, for example, in U.S. Pat. No. 9,403,172 (Short et al.) (see, e.g., devices 200, 400, 500, 600, and 900 illustrated throughout the drawings, and descriptions thereof).

In some embodiments of a DEP configured microfluidic device, the top electrode 210 is part of a first wall (or cover 110) of the enclosure 102, and the electrode activation substrate 206 and bottom electrode 204 are part of a second wall (or support structure 104) of the enclosure 102. The region/chamber 202 can be between the first wall and the second wall. In other embodiments, the electrode 210 is part of the second wall (or support structure 104) and one or both of the electrode activation substrate 206 and/or the electrode 210 are part of the first wall (or cover 110). Moreover, the light source 216 can alternatively be used to illuminate the enclosure 102 from below.

With the microfluidic device 200 of FIGS. 1B-1C having a DEP configuration, the motive module 162 can select a micro-object (not shown) in the medium 180 in the region/chamber 202 by projecting a light pattern 218 into the device 200 to activate a first set of one or more DEP electrodes at DEP electrode regions 214a of the inner surface 208 of the electrode activation substrate 206 in a pattern (e.g., square pattern 220) that surrounds and captures the micro-object. The motive module 162 can then move the captured micro-object by moving the light pattern 218 relative to the device 200 to activate a second set of one or more DEP electrodes at DEP electrode regions 214. Alternatively, the device 200 can be moved relative to the light pattern 218.

Regardless of the configuration of the microfluidic device 200, a power source 212 can be used to provide a potential (e.g., an AC voltage potential) that powers the electrical circuits of the microfluidic device 200. The power source 212 can be the same as, or a component of, the power source 192 referenced in FIG. 1. Power source 212 can be configured to provide an AC voltage and/or current to the top electrode 210 and the bottom electrode 204. For an AC voltage, the power source 212 can provide a frequency range and an average or peak power (e.g., voltage or current) range sufficient to generate net DEP forces (or electrowetting forces) strong enough to trap and move individual micro-objects (not shown) in the region/chamber 202, as discussed above, and/or to change the wetting properties of the inner surface 208 of the support structure 104 (i.e., the dielectric layer and/or the hydrophobic coating on the dielectric layer) in the region/chamber 202, as also discussed above. Such frequency ranges and average or peak power rangers are known in the art. See, e.g., U.S. Pat. No. 6,958,132 (Chiou et al.), U.S. Pat. No. RE44,711 (Wu et al.) (originally issued as U.S. Pat. No. 7,612,355), and US Patent Application Publication Nos. US2014/0124370 (Short et al.), US2016/0184821 (Hobbs et al.), US2015/0306598 (Khandros et al.), and US2015/0306599 (Khandros et al.).

Sequestration pens. Non-limiting examples of generic sequestration pens 224, 226, and 228 are shown within the microfluidic device 230 depicted in FIGS. 2A-2C. Each sequestration pen 224, 226, and 228 can comprise an isolation structure 232 defining an isolation region 240 and a connection region 236 fluidically connecting the isolation region 240 to a channel 122. The connection region 236 can comprise a proximal opening 234 to the channel 122 and a distal opening 238 to the isolation region 240. The connection region 236 can be configured so that the maximum penetration depth of a flow of a fluidic medium (not shown) flowing from the channel 122 into the sequestration pen 224, 226, 228 does not extend into the isolation region 240. Thus, due to the connection region 236, a micro-object (not shown) or other material (not shown) disposed in an isolation region 240 of a sequestration pen 224, 226, 228 can thus be isolated from, and not substantially affected by, a flow of medium 180 in the channel 122.

Figure 2A:
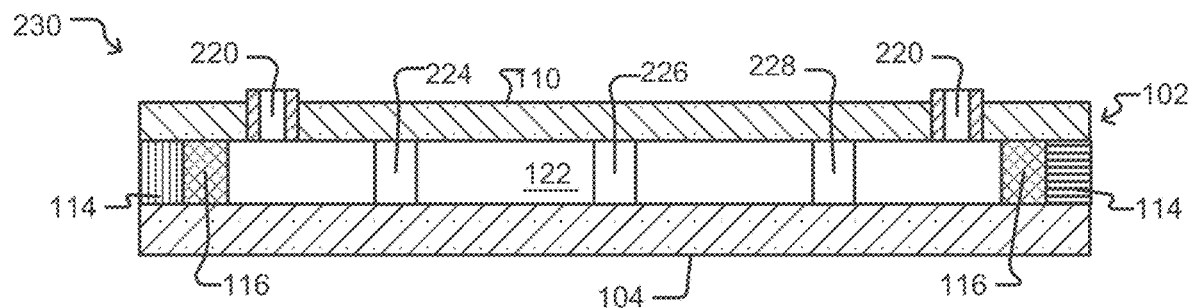
FIGS. 2A and 2B illustrate vertical and horizontal cross-sectional views, respectively, of a microfluidic device having isolation pens according to some embodiments of the disclosure.
Figure 2B:
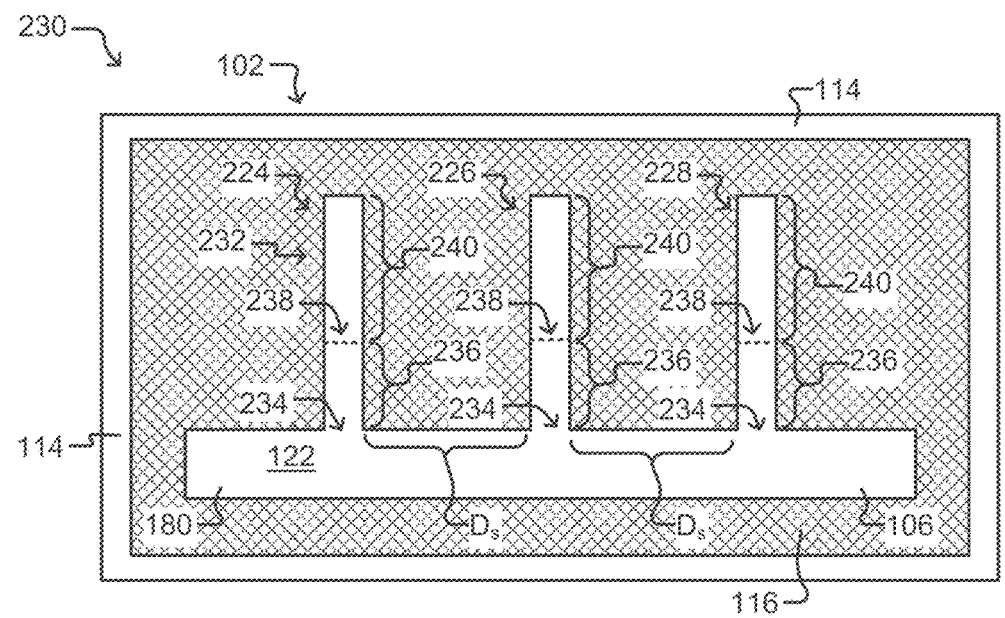
Figure 2C:
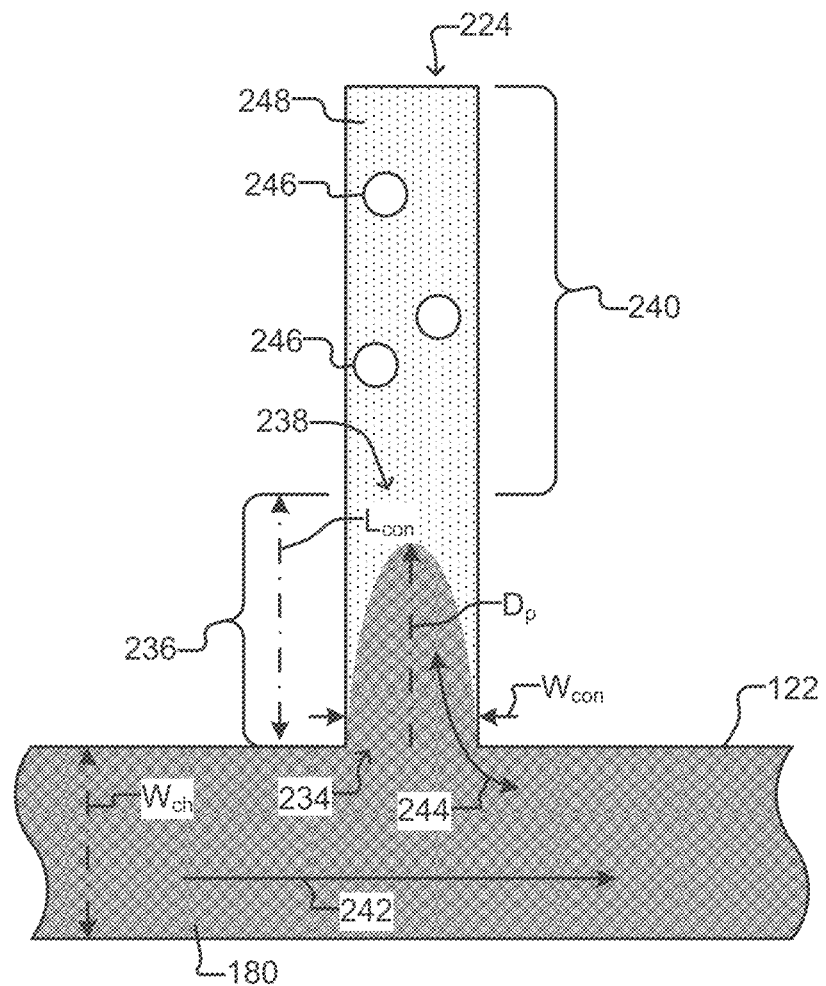
FIG. 2C illustrates a detailed horizontal cross-sectional view of a sequestration pen according to some embodiments of the disclosure.

The sequestration pens 224, 226, and 228 of FIGS. 2A-2C each have a single opening which opens directly to the channel 122. The opening of the sequestration pen opens laterally from the channel 122. The electrode activation substrate 206 underlays both the channel 122 and the sequestration pens 224, 226, and 228. The upper surface of the electrode activation substrate 206 within the enclosure of a sequestration pen, forming the floor of the sequestration pen, is disposed at the same level or substantially the same level of the upper surface the of electrode activation substrate 206 within the channel 122 (or flow region if a channel is not present), forming the floor of the flow channel (or flow region, respectively) of the microfluidic device. The electrode activation substrate 206 may be featureless or may have an irregular or patterned surface that varies from its highest elevation to its lowest depression by less than about 3 microns, 2.5 microns, 2 microns, 1.5 microns, 1 micron, 0.9 microns, 0.8 microns, 0.7 microns, 0.6 microns, 0.5 microns, 0.4 microns, 0.3 microns, 0.2 microns, 0.1 microns, or less. The variation of elevation in the upper surface of the substrate across both the channel 122 (or flow region) and sequestration pens may be less than about 3%, 2%, 1%. 0.9%, 0.8%, 0.5%, 0.3% or 0.1% of the height of the walls of the sequestration pen or walls of the microfluidic device. While described in detail for the microfluidic device 200, this also applies to any of the microfluidic devices 100, 230, 250, 280, 290 described herein.

The channel 122 can thus be an example of a swept region, and the isolation regions 240 of the sequestration pens 224, 226, 228 can be examples of unswept regions. As noted, the channel 122 and sequestration pens 224, 226, 228 can be configured to contain one or more fluidic media 180. In the example shown in FIGS. 2A-2B, the ports 222 are connected to the channel 122 and allow a fluidic medium 180 to be introduced into or removed from the microfluidic device 230. Prior to introduction of the fluidic medium 180, the microfluidic device may be primed with a gas such as carbon dioxide gas. Once the microfluidic device 230 contains the fluidic medium 180, the flow 242 of fluidic medium 180 in the channel 122 can be selectively generated and stopped. For example, as shown, the ports 222 can be disposed at different locations (e.g., opposite ends) of the channel 122, and a flow 242 of medium can be created from one port 222 functioning as an inlet to another port 222 functioning as an outlet.

FIG. 2C illustrates a detailed view of an example of a sequestration pen 224 according to the present invention. Examples of micro-objects 246 are also shown.

As is known, a flow 242 of fluidic medium 180 in a microfluidic channel 122 past a proximal opening 234 of sequestration pen 224 can cause a secondary flow 244 of the medium 180 into and/or out of the sequestration pen 224. To isolate micro-objects 246 in the isolation region 240 of a sequestration pen 224 from the secondary flow 244, the length Lcon of the connection region 236 of the sequestration pen 224 (i.e., from the proximal opening 234 to the distal opening 238) should be greater than the penetration depth Dp of the secondary flow 244 into the connection region 236. The penetration depth Dp of the secondary flow 244 depends upon the velocity of the fluidic medium 180 flowing in the channel 122 and various parameters relating to the configuration of the channel 122 and the proximal opening 234 of the connection region 236 to the channel 122. For a given microfluidic device, the configurations of the channel 122 and the opening 234 will be fixed, whereas the rate of flow 242 of fluidic medium 180 in the channel 122 will be variable. Accordingly, for each sequestration pen 224, a maximal velocity Vmax for the flow 242 of fluidic medium 180 in channel 122 can be identified that ensures that the penetration depth Dp of the secondary flow 244 does not exceed the length Lcon of the connection region 236. As long as the rate of the flow 242 of fluidic medium 180 in the channel 122 does not exceed the maximum velocity Vmax, the resulting secondary flow 244 can be limited to the channel 122 and the connection region 236 and kept out of the isolation region 240. The flow 242 of medium 180 in the channel 122 will thus not draw micro-objects 246 out of the isolation region 240. Rather, micro-objects 246 located in the isolation region 240 will stay in the isolation region 240 regardless of the flow 242 of fluidic medium 180 in the channel 122.

Moreover, as long as the rate of flow 242 of medium 180 in the channel 122 does not exceed Vmax, the flow 242 of fluidic medium 180 in the channel 122 will not move miscellaneous particles (e.g., microparticles and/or nanoparticles) from the channel 122 into the isolation region 240 of a sequestration pen 224. Having the length Lcon of the connection region 236 be greater than the maximum penetration depth Dp of the secondary flow 244 can thus prevent contamination of one sequestration pen 224 with miscellaneous particles from the channel 122 or another sequestration pen (e.g., sequestration pens 226, 228 in FIG. 2D).

Because the channel 122 and the connection regions 236 of the sequestration pens 224, 226, 228 can be affected by the flow 242 of medium 180 in the channel 122, the channel 122 and connection regions 236 can be deemed swept (or flow) regions of the microfluidic device 230. The isolation regions 240 of the sequestration pens 224, 226, 228, on the other hand, can be deemed unswept (or non-flow) regions. For example, components (not shown) in a first fluidic medium 180 in the channel 122 can mix with a second fluidic medium 248 in the isolation region 240 substantially only by diffusion of components of the first medium 180 from the channel 122 through the connection region 236 and into the second fluidic medium 248 in the isolation region 240. Similarly, components (not shown) of the second medium 248 in the isolation region 240 can mix with the first medium 180 in the channel 122 substantially only by diffusion of components of the second medium 248 from the isolation region 240 through the connection region 236 and into the first medium 180 in the channel 122. In some embodiments, the extent of fluidic medium exchange between the isolation region of a sequestration pen and the flow region by diffusion is about 90%, 91%, 92%, 93%, 94% 95%, 96%, 97%, 98%, 99%, or greater than the amount of total fluidic exchange. The first medium 180 can be the same medium or a different medium than the second medium 248. Moreover, the first medium 180 and the second medium 248 can start out being the same, then become different (e.g., through conditioning of the second medium 248 by one or more cells in the isolation region 240, or by changing the medium 180 flowing through the channel 122).

The maximum penetration depth Dp of the secondary flow 244 caused by the flow 242 of fluidic medium 180 in the channel 122 can depend on a number of parameters, as mentioned above. Examples of such parameters include: the shape of the channel 122 (e.g., the channel can direct medium into the connection region 236, divert medium away from the connection region 236, or direct medium in a direction substantially perpendicular to the proximal opening 234 of the connection region 236 to the channel 122); a width Wch (or cross-sectional area) of the channel 122 at the proximal opening 234; and a width Wcon (or cross-sectional area) of the connection region 236 at the proximal opening 234; the velocity V of the flow 242 of fluidic medium 180 in the channel 122; the viscosity of the first medium 180 and/or the second medium 248, or the like.

In some embodiments, the dimensions of the channel 122 and sequestration pens 224, 226, 228 can be oriented as follows with respect to the vector of the flow 242 of fluidic medium 180 in the channel 122: the channel width Wch (or cross-sectional area of the channel 122) can be substantially perpendicular to the flow 242 of medium 180; the width Wcon (or cross-sectional area) of the connection region 236 at opening 234 can be substantially parallel to the flow 242 of medium 180 in the channel 122; and/or the length Lcon of the connection region can be substantially perpendicular to the flow 242 of medium 180 in the channel 122. The foregoing are examples only, and the relative position of the channel 122 and sequestration pens 224, 226, 228 can be in other orientations with respect to each other.

As illustrated in FIG. 2C, the width Wcon of the connection region 236 can be uniform from the proximal opening 234 to the distal opening 238. The width Wcon of the connection region 236 at the distal opening 238 can thus be in any of the ranges identified herein for the width Wcon of the connection region 236 at the proximal opening 234. Alternatively, the width Wcon of the connection region 236 at the distal opening 238 can be larger than the width Wcon of the connection region 236 at the proximal opening 234.

As illustrated in FIG. 2C, the width Wiso of the isolation region 240 at the distal opening 238 can be substantially the same as the width Wcon of the connection region 236 at the proximal opening 234. The width Wiso of the isolation region 240 at the distal opening 238 can thus be in any of the ranges identified herein for the width Wcon of the connection region 236 at the proximal opening 234. Alternatively, the width Wiso of the isolation region 240 at the distal opening 238 can be larger or smaller than the width Wcon of the connection region 236 at the proximal opening 234. Moreover, the distal opening 238 may be smaller than the proximal opening 234 and the width Wcon of the connection region 236 may be narrowed between the proximal opening 234 and distal opening 238. For example, the connection region 236 may be narrowed between the proximal opening and the distal opening, using a variety of different geometries (e.g. chamfering the connection region, beveling the connection region). Further, any part or subpart of the connection region 236 may be narrowed (e.g. a portion of the connection region adjacent to the proximal opening 234).

Figure 2D:
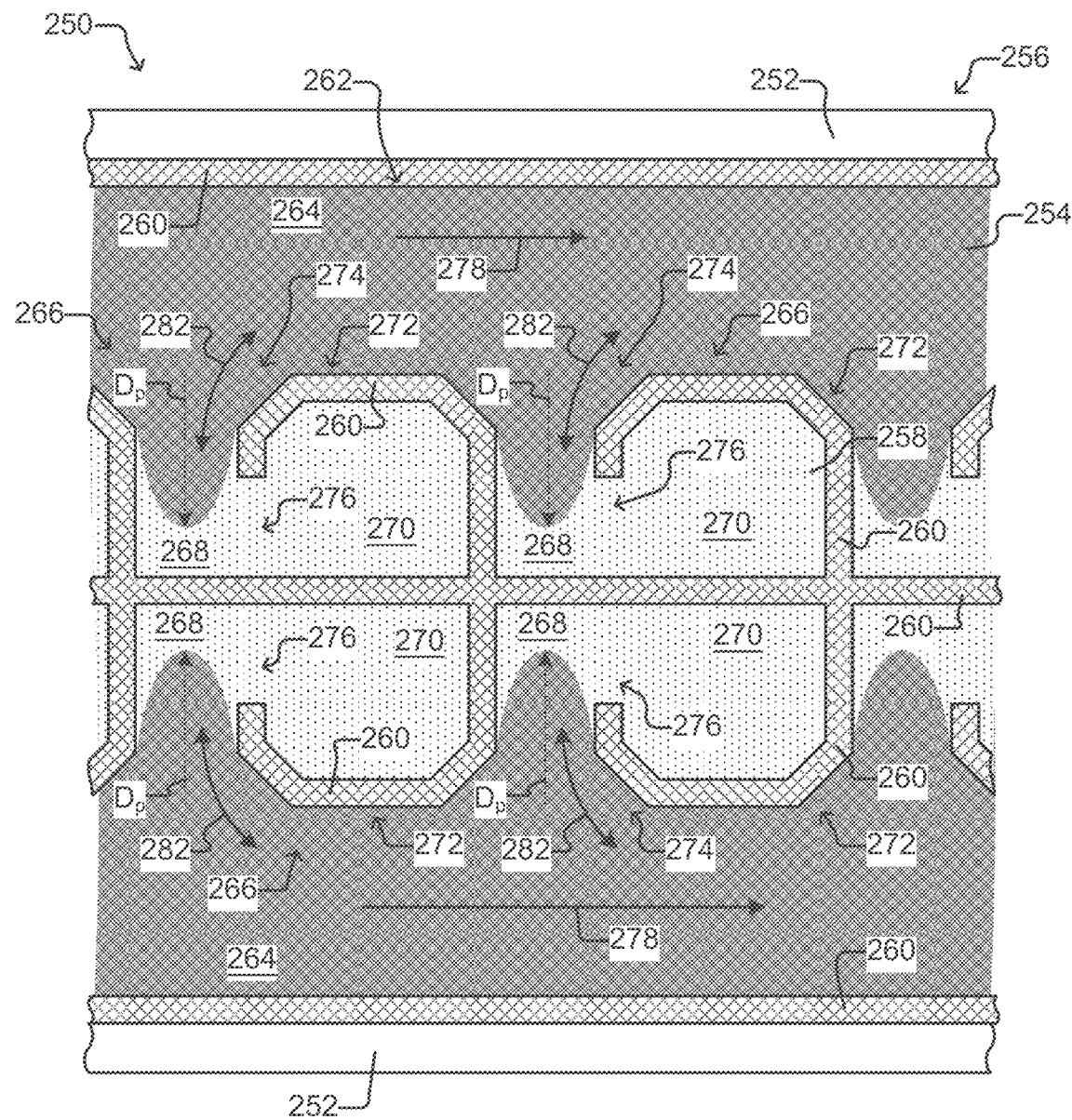
FIG. 2D illustrates a partial horizontal cross-sectional view of a microfluidic device having isolation pens according to some embodiments of the disclosure.
Figure 2E:
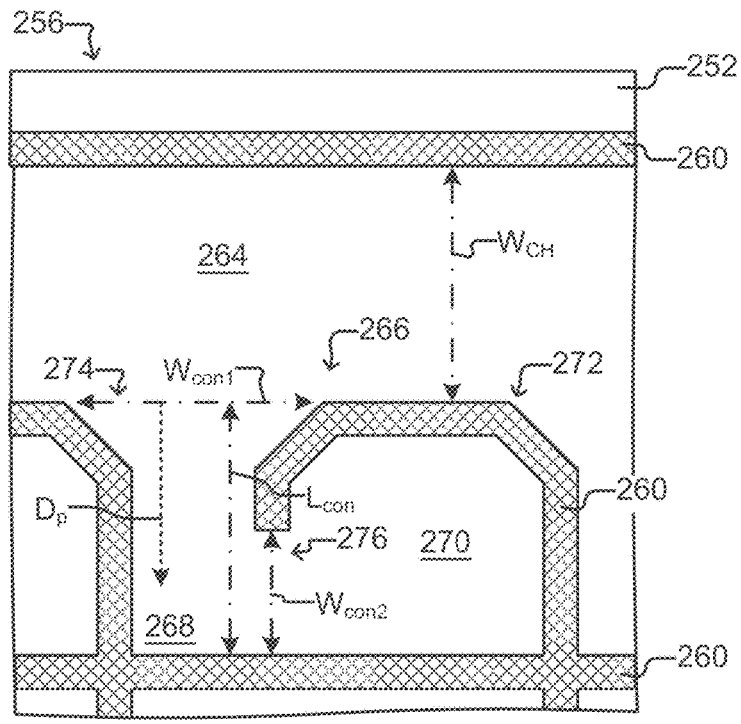
FIGS. 2E and 2F illustrate detailed horizontal cross-sectional views of sequestration pens according to some embodiments of the disclosure.
Figure 2F:
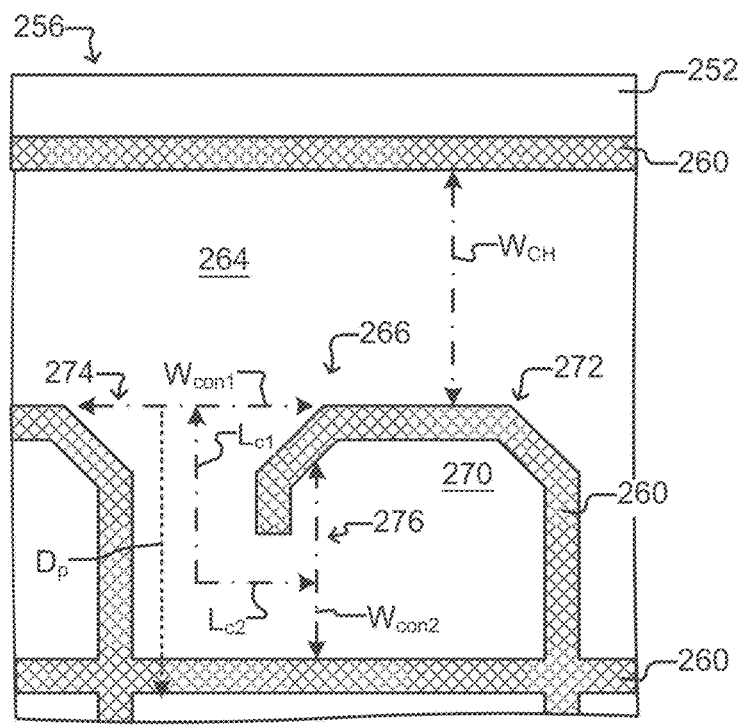
Figure 2G:
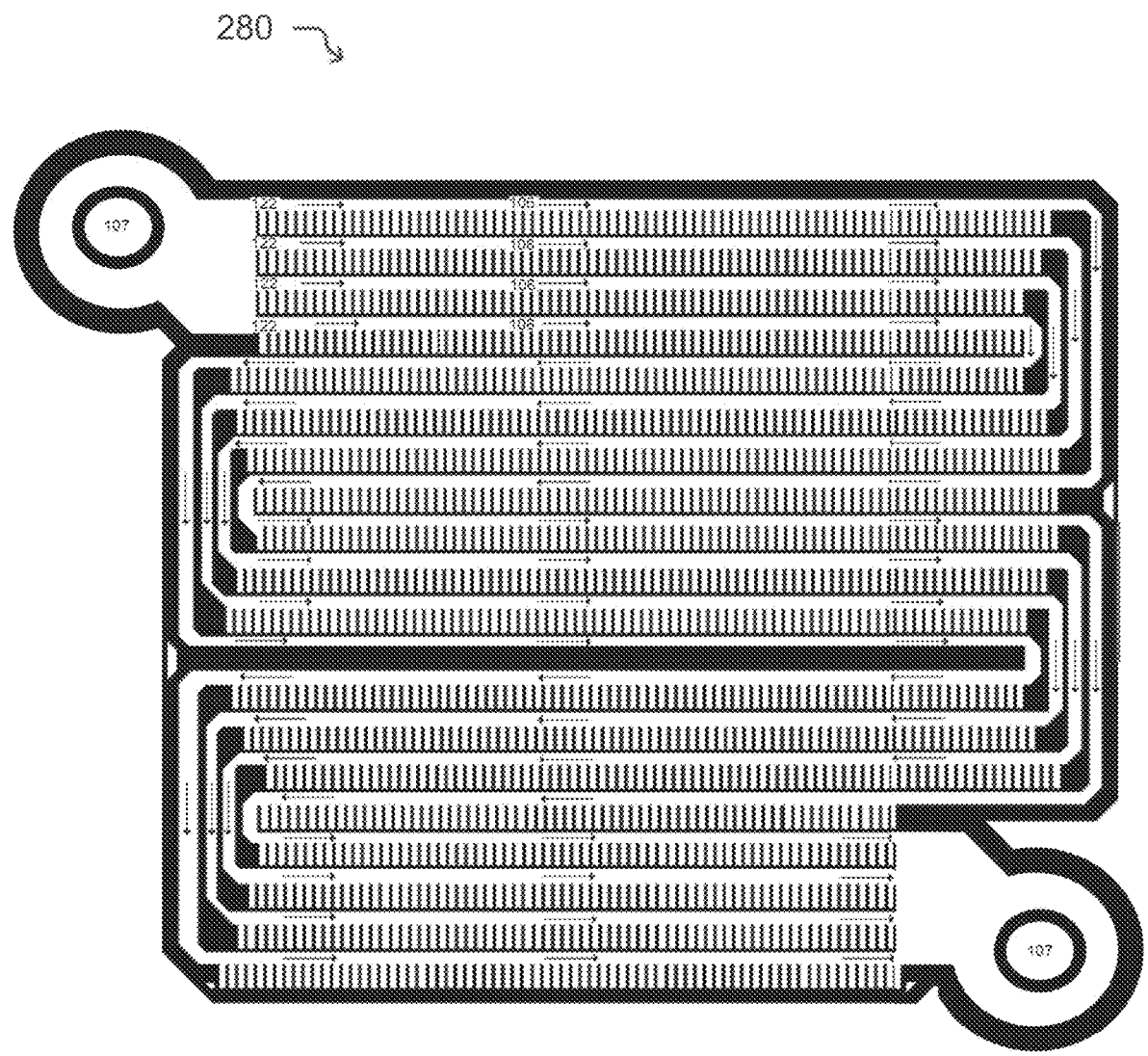
FIG. 2G illustrates a microfluidic device having isolation pens according to some embodiments of the disclosure.
Figure 2H:
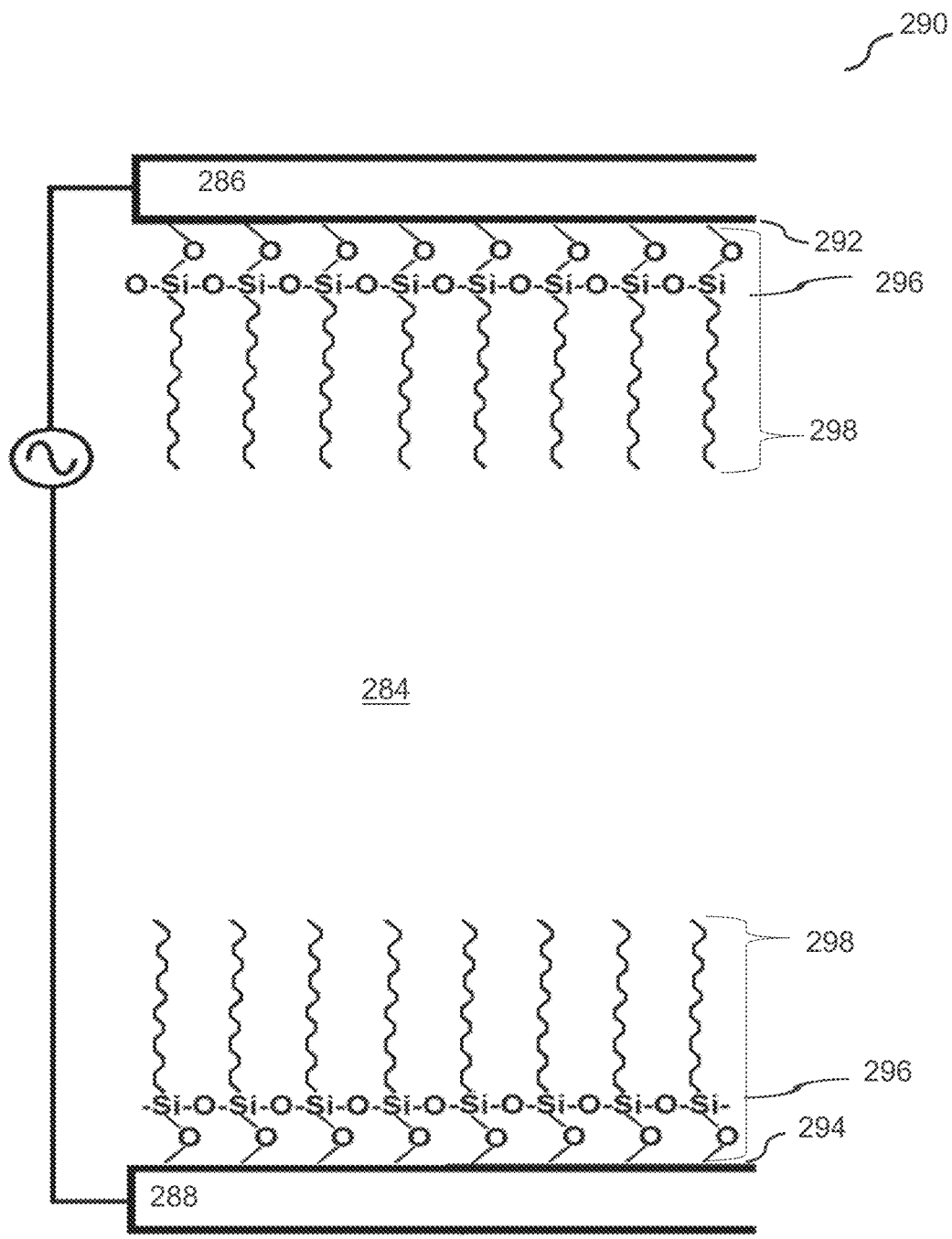
FIG. 2H illustrates a microfluidic device according to some embodiments of the disclosure.

FIGS. 2D-2F depict another exemplary embodiment of a microfluidic device 250 containing a microfluidic circuit 262 and flow channels 264, which are variations of the respective microfluidic device 100, circuit 132 and channel 134 of FIG. 1. The microfluidic device 250 also has a plurality of sequestration pens 266 that are additional variations of the above-described sequestration pens 124, 126, 128, 130, 224, 226 or 228. In particular, it should be appreciated that the sequestration pens 266 of device 250 shown in FIGS. 2D-2F can replace any of the above-described sequestration pens 124, 126, 128, 130, 224, 226 or 228 in devices 100, 200, 230, 280, 290, or 320. Likewise, the microfluidic device 250 is another variant of the microfluidic device 100, and may also have the same or a different DEP configuration as the above-described microfluidic device 100, 200, 230, 280, 290, 320 as well as any of the other microfluidic system components described herein.

The microfluidic device 250 of FIGS. 2D-2F comprises a support structure (not visible in FIGS. 2D-2F, but can be the same or generally similar to the support structure 104 of device 100 depicted in FIG. 1A), a microfluidic circuit structure 256, and a cover (not visible in FIGS. 2D-2F, but can be the same or generally similar to the cover 122 of device 100 depicted in FIG. 1A). The microfluidic circuit structure 256 includes a frame 252 and microfluidic circuit material 260, which can be the same as or generally similar to the frame 114 and microfluidic circuit material 116 of device 100 shown in FIG. 1A. As shown in FIG. 2D, the microfluidic circuit 262 defined by the microfluidic circuit material 260 can comprise multiple channels 264 (two are shown but there can be more) to which multiple sequestration pens 266 are fluidically connected.

Each sequestration pen 266 can comprise an isolation structure 272, an isolation region 270 within the isolation structure 272, and a connection region 268. From a proximal opening 274 at the channel 264 to a distal opening 276 at the isolation structure 272, the connection region 268 fluidically connects the channel 264 to the isolation region 270. Generally, in accordance with the above discussion of FIGS. 2B and 2C, a flow 278 of a first fluidic medium 254 in a channel 264 can create secondary flows 282 of the first medium 254 from the channel 264 into and/or out of the respective connection regions 268 of the sequestration pens 266.

As illustrated in FIG. 2E, the connection region 268 of each sequestration pen 266 generally includes the area extending between the proximal opening 274 to a channel 264 and the distal opening 276 to an isolation structure 272. The length Lcon of the connection region 268 can be greater than the maximum penetration depth Dp of secondary flow 282, in which case the secondary flow 282 will extend into the connection region 268 without being redirected toward the isolation region 270 (as shown in FIG. 2D). Alternatively, at illustrated in FIG. 2F, the connection region 268 can have a length Lcon that is less than the maximum penetration depth Dp, in which case the secondary flow 282 will extend through the connection region 268 and be redirected toward the isolation region 270. In this latter situation, the sum of lengths Lc1 and Lc2 of connection region 268 is greater than the maximum penetration depth Dp, so that secondary flow 282 will not extend into isolation region 270. Whether length Lcon of connection region 268 is greater than the penetration depth Dp, or the sum of lengths Lc1 and Lc2 of connection region 268 is greater than the penetration depth Dp, a flow 278 of a first medium 254 in channel 264 that does not exceed a maximum velocity Vmax will produce a secondary flow having a penetration depth Dp, and micro-objects (not shown but can be the same or generally similar to the micro-objects 246 shown in FIG. 2C) in the isolation region 270 of a sequestration pen 266 will not be drawn out of the isolation region 270 by a flow 278 of first medium 254 in channel 264. Nor will the flow 278 in channel 264 draw miscellaneous materials (not shown) from channel 264 into the isolation region 270 of a sequestration pen 266. As such, diffusion is the only mechanism by which components in a first medium 254 in the channel 264 can move from the channel 264 into a second medium 258 in an isolation region 270 of a sequestration pen 266. Likewise, diffusion is the only mechanism by which components in a second medium 258 in an isolation region 270 of a sequestration pen 266 can move from the isolation region 270 to a first medium 254 in the channel 264. The first medium 254 can be the same medium as the second medium 258, or the first medium 254 can be a different medium than the second medium 258. Alternatively, the first medium 254 and the second medium 258 can start out being the same, then become different, e.g., through conditioning of the second medium by one or more cells in the isolation region 270, or by changing the medium flowing through the channel 264.

As illustrated in FIG. 2E, the width Wch of the channels 264 (i.e., taken transverse to the direction of a fluid medium flow through the channel indicated by arrows 278 in FIG. 2D) in the channel 264 can be substantially perpendicular to a width $W_{con1}$ of the proximal opening 274 and thus substantially parallel to a width $W_{con2}$ of the distal opening 276. The width $W_{con1}$ of the proximal opening 274 and the width $W_{con2}$ of the distal opening 276, however, need not be substantially perpendicular to each other. For example, an angle between an axis (not shown) on which the width $W_{con1}$ of the proximal opening 274 is oriented and another axis on which the width $W_{con2}$ of the distal opening 276 is oriented can be other than perpendicular and thus other than 90°. Examples of alternatively oriented angles include angles in any of the following ranges: from about 30° to about 90°, from about 45° to about 90°, from about 60° to about 90°, or the like.

In various embodiments of sequestration pens (e.g. 124, 126, 128, 130, 224, 226, 228, or 266), the isolation region (e.g. 240 or 270) is configured to contain a plurality of micro-objects. In other embodiments, the isolation region can be configured to contain only one, two, three, four, five, or a similar relatively small number of micro-objects. Accordingly, the volume of an isolation region can be, for example, at least 5×105, 8×105, 1×106, 2×106, 4×106, 6×106 cubic microns, or more.

In various embodiments of sequestration pens, the width $W_{ch}$ of the channel (e.g., 122) at a proximal opening (e.g. 234) can be within any of the following ranges: about 50-1000 microns, 50-500 microns, 50-400 microns, 50-300 microns, 50-250 microns, 50-200 microns, 50-150 microns, 50-100 microns, 70-500 microns, 70-400 microns, 70-300 microns, 70-250 microns, 70-200 microns, 70-150 microns, 90-400 microns, 90-300 microns, 90-250 microns, 90-200 microns, 90-150 microns, 100-300 microns, 100-250 microns, 100-200 microns, 100-150 microns, and 100-120 microns. In some other embodiments, the width $W_{ch}$ of the channel (e.g., 122) at a proximal opening (e.g. 234) can be in a range of about 200-800 microns, 200-700 microns, or 200-600 microns. The foregoing are examples only, and the width $W_{ch}$ of the channel 122 can be in other ranges (e.g., a range defined by any of the endpoints listed above). Moreover, the $W_{ch}$ of the channel 122 can be selected to be in any of these ranges in regions of the channel other than at a proximal opening of a sequestration pen.

In some embodiments, a sequestration pen has a height of about 30 to about 200 microns, or about 50 to about 150 microns. In some embodiments, the sequestration pen has a cross-sectional area of about $1\times10^4$ to about $3\times10^6$ square microns, about $2\times10^4$ to about $2\times10^6$ square microns, about $4\times10^4$ to about $1\times10^6$ square microns, about $2\times10^4$ to about $5\times10^5$ square microns, about $2\times10^4$ to about $1\times10^5$ square microns, or about $2\times10^5$ to about $2\times10^6$ square microns. In some embodiments, the connection region has a cross-sectional width of about 20 to about 100 microns, about 30 to about 80 microns or about 40 to about 60 microns.

In various embodiments of sequestration pens, the height $H_{ch}$ of the channel (e.g., 122) at a proximal opening (e.g., 234) can be within any of the following ranges: 20-100 microns, 20-90 microns, 20-80 microns, 20-70 microns, 20-60 microns, 20-50 microns, 30-100 microns, 30-90 microns, 30-80 microns, 30-70 microns, 30-60 microns, 30-50 microns, 40-100 microns, 40-90 microns, 40-80 microns, 40-70 microns, 40-60 microns, or 40-50 microns. The foregoing are examples only, and the height $H_{ch}$ of the channel (e.g., 122) can be in other ranges (e.g., a range defined by any of the endpoints listed above). The height $H_{ch}$ of the channel 122 can be selected to be in any of these ranges in regions of the channel other than at a proximal opening of a sequestration pen.

In various embodiments of sequestration pens a cross-sectional area of the channel (e.g., 122) at a proximal opening (e.g., 234) can be within any of the following ranges: 500-50,000 square microns, 500-40,000 square microns, 500-30,000 square microns, 500-25,000 square microns, 500-20,000 square microns, 500-15,000 square microns, 500-10,000 square microns, 500-7,500 square microns, 500-5,000 square microns, 1,000-25,000 square microns, 1,000-20,000 square microns, 1,000-15,000 square microns, 1,000-10,000 square microns, 1,000-7,500 square microns, 1,000-5,000 square microns, 2,000-20,000 square microns, 2,000-15,000 square microns, 2,000-10,000 square microns, 2,000-7,500 square microns, 2,000-6,000 square microns, 3,000-20,000 square microns, 3,000-15,000 square microns, 3,000-10,000 square microns, 3,000-7,500 square microns, or 3,000 to 6,000 square microns. The foregoing are examples only, and the cross-sectional area of the channel (e.g., 122) at a proximal opening (e.g., 234) can be in other ranges (e.g., a range defined by any of the endpoints listed above).

In various embodiments of sequestration pens, the length $L_{con}$ of the connection region (e.g., 236) can be in any of the following ranges: about 20 to about 300 microns, about 40 to about 250 microns, about 60 to about 200 microns, about 80 to about 150 microns, about 20 to about 500 microns, about 40 to about 400 microns, about 60 to about 300 microns, about 80 to about 200 microns, or about 100 to about 150 microns. The foregoing are examples only, and length Lcon of a connection region (e.g., 236) can be in a different range than the foregoing examples (e.g., a range defined by any of the endpoints listed above).

In various embodiments of sequestration pens the width $W_{con}$ of a connection region (e.g., 236) at a proximal opening (e.g., 234) can be in any of the following ranges: about 20 to about 150 microns, about 20 to about 100 microns, about 20 to about 80 microns, about 20 to about 60 microns, about 30 to about 150 microns, about 30 to about 100 microns, about 30 to about 80 microns, about 30 to about 60 microns, about 40 to about 150 microns, about 40 to about 100 microns, about 40 to about 80 microns, about 40 to about 60 microns, about 50 to about 150 microns, about 50 to about 100 microns, about 50 to about 80 microns, about 60 to about 150 microns, about 60 to about 100 microns, about 60 to about 80 microns, about 70 to about 150 microns, about 70 to about 100 microns, about 80 to about 150 microns, and about 80 to about 100 microns. The foregoing are examples only, and the width $W_{con}$ of a connection region (e.g., 236) at a proximal opening (e.g., 234) can be different than the foregoing examples (e.g., a range defined by any of the endpoints listed above).

In various embodiments of sequestration pens, the width $W_{con}$ of a connection region (e.g., 236) at a proximal opening (e.g., 234) can be at least as large as the largest dimension of a micro-object (e.g., a biological cell, which may be a immunological cell, such as B cell or a T cell, or a hybridoma cell, or the like) that the sequestration pen is intended for. For example, the width $W_{con}$ of a connection region 236 at a proximal opening 234 of a sequestration pen that an immunological cell (e.g., B cell) will be placed into can be any of the following: about 20 microns, about 25 microns, about 30 microns, about 35 microns, about 40 microns, about 45 microns, about 50 microns, about 55 microns, about 60 microns, about 65 microns, about 70 microns, about 75 microns, or about 80 microns. The foregoing are examples only, and the width $W_{con}$ of a connection region (e.g., 236) at a proximal opening (e.g., 234) can be different than the foregoing examples (e.g., a range defined by any of the endpoints listed above).

In various embodiments of sequestration pens, a ratio of the length $L_{con}$ of a connection region (e.g., 236) to a width $W_{con}$ of the connection region (e.g., 236) at the proximal opening 234 can be greater than or equal to any of the following ratios: 0.5, 1.0, 1.5, 2.0, 2.5, 3.0, 3.5, 4.0, 4.5, 5.0, 6.0, 7.0, 8.0, 9.0, 10.0, or more. The foregoing are examples only, and the ratio of the length $L_{con}$ of a connection region 236 to a width $W_{con}$ of the connection region 236 at the proximal opening 234 can be different than the foregoing examples.

In various embodiments of microfluidic devices 100, 200, 230, 250, 280, 290, 320 $V_{max}$ can be set around 0.2, 0.3, 0.4, 0.5, 0.6, 0.7, 0.8, 0.9, 1.0, 1.1, 1.2, 1.3, 1.4, 1.5, 2.0, 2.5, 3.0, 3.5, 4.0, 4.5, or 5.0 microliters/sec.

In various embodiments of microfluidic devices having sequestration pens, the volume of an isolation region (e.g., 240) of a sequestration pen can be, for example, at least $5 \times 10^5$, $8 \times 10^5$, $1 \times 10^6$, $2 \times 10^6$, $4 \times 10^6$, $6 \times 10^6$, $8 \times 10^6$, $1 \times 10^7$ cubic microns, or more. In various embodiments of microfluidic devices having sequestration pens, the volume of a sequestration pen may be about $5 \times 10^5$, $6 \times 10^5$, $8 \times 10^5$, $1 \times 10^6$, $2 \times 10^6$, $4 \times 10^6$, $8 \times 10^6$, $1 \times 10^7$ cubic microns, or more. In some other embodiments, the volume of a sequestration pen may be about 0.5 nanoliter to about 10 nanoliters, about 1.0 nanoliters to about 5.0 nanoliters, about 1.5 nanoliters to about 4.0 nanoliters, about 2.0 nanoliters to about 3.0 nanoliters, about 2.5 nanoliters, or any range defined by two of the foregoing endpoints.

In various embodiment, the microfluidic device has sequestration pens configured as in any of the embodiments discussed herein where the microfluidic device has about 5 to about 10 sequestration pens, about 10 to about 50 sequestration pens, about 100 to about 500 sequestration pens; about 200 to about 1000 sequestration pens, about 500 to about 1500 sequestration pens, about 1000 to about 2000 sequestration pens, or about 1000 to about 3500 sequestration pens. The sequestration pens need not all be the same size and may include a variety of configurations (e.g., different widths, different features within the sequestration pen.

In some other embodiments, the microfluidic device has sequestration pens configured as in any of the embodiments discussed herein where the microfluidic device has about 1500 to about 3000 sequestration pens, about 2000 to about 3500 sequestration pens, about 2500 to about 4000 sequestration pens about 3000 to about 4500 sequestration pens, about 3500 to about 5000 sequestration pens, about 4000 to about 5500 sequestration pens, about 4500 to about 6000 sequestration pens, about 5000 to about 6500 sequestration pens, about 5500 to about 7000 sequestration pens, about 6000 to about 7500 sequestration pens, about 6500 to about 8000 sequestration pens, about 7000 to about 8500 sequestration pens, about 7500 to about 9000 sequestration pens, about 8000 to about 9500 sequestration pens, about 8500 to about 10,000 sequestration pens, about 9000 to about 10,500 sequestration pens, about 9500 to about 11,000 sequestration pens, about 10,000 to about 11,500 sequestration pens, about 10,500 to about 12,000 sequestration pens, about 11,000 to about 12,500 sequestration pens, about 11,500 to about 13,000 sequestration pens, about 12,000 to about 13,500 sequestration pens, about 12,500 to about 14,000 sequestration pens, about 13,000 to about 14,500 sequestration pens, about 13,500 to about 15,000 sequestration pens, about 14,000 to about 15,500 sequestration pens, about 14,500 to about 16,000 sequestration pens, about 15,000 to about 16,500 sequestration pens, about 15,500 to about 17,000 sequestration pens, about 16,000 to about 17,500 sequestration pens, about 16,500 to about 18,000 sequestration pens, about 17,000 to about 18,500 sequestration pens, about 17,500 to about 19,000 sequestration pens, about 18,000 to about 19,500 sequestration pens, about 18,500 to about 20,000 sequestration pens, about 19,000 to about 20,500 sequestration pens, about 19,500 to about 21,000 sequestration pens, or about 20,000 to about 21,500 sequestration pens.

Figure 3A:
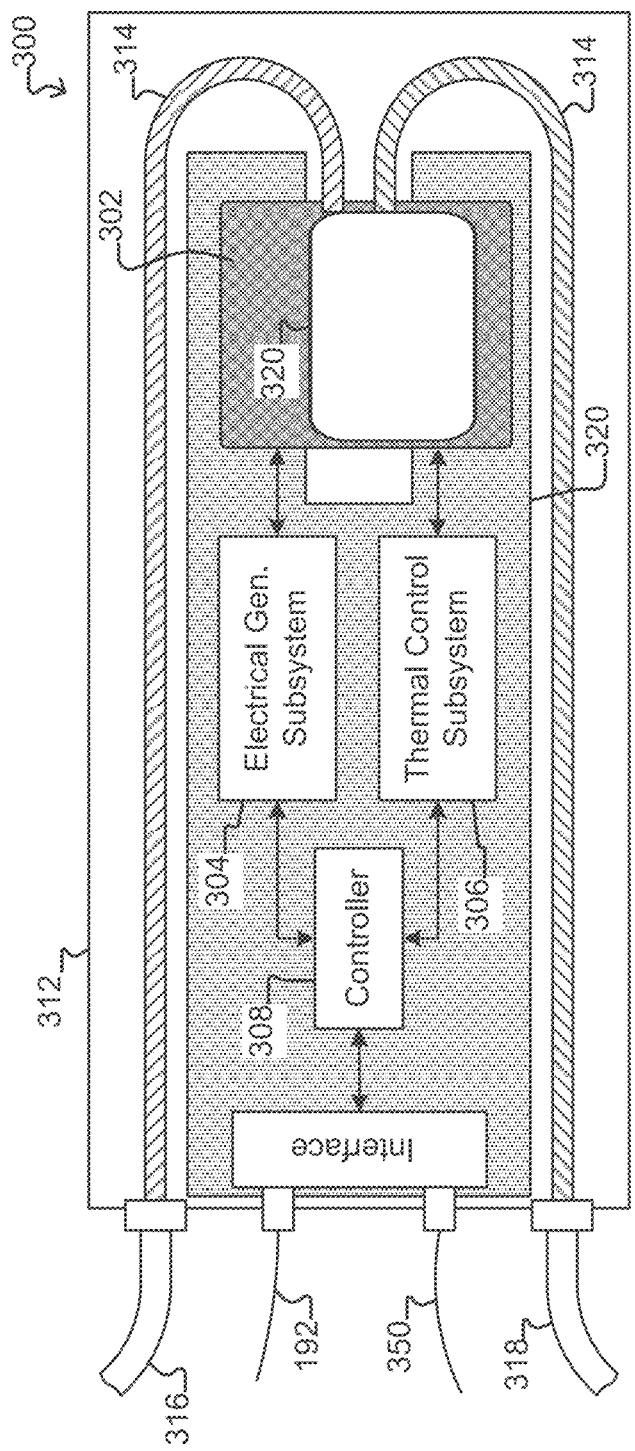
FIG. 3A illustrates a system which can be used to operate and observe a microfluidic device according to some embodiments of the disclosure.
Figure 3B:
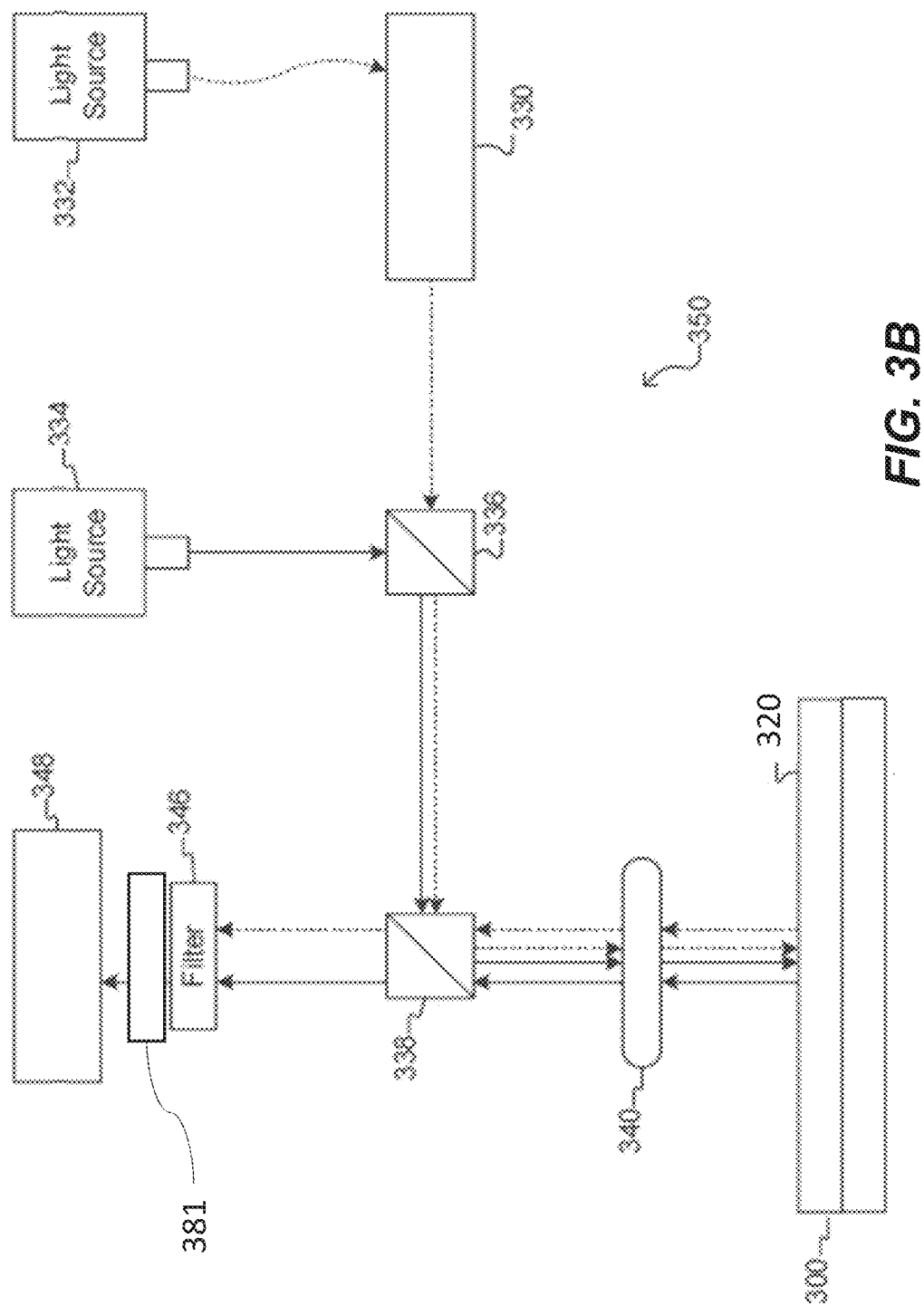
FIG. 3B illustrates an optical apparatus for a microfluidic device according to some embodiments of the disclosure.

Control System Elements. FIGS. 3A through 3B shows various embodiments of system 150 which can be used to operate and observe microfluidic devices (e.g. 100, 200, 230, 280, 250, 290, 320) according to the present invention. As illustrated in FIG. 3A, the system 150 can include a structure ("nest") 300 configured to hold a microfluidic device 320, or any other microfluidic device described herein. The nest 300 can include a socket 302 capable of interfacing with the microfluidic device 320 (e.g., an optically-actuated electrokinetic device 100) and providing electrical connections from power source 192 to the microfluidic device 320. The nest 300 can further include an integrated electrical signal generation subsystem 304. The electrical signal generation subsystem 304 can be configured to supply a biasing voltage to socket 302 such that the biasing voltage is applied across a pair of electrodes in the microfluidic device 320 when it is being held by socket 302. Thus, the electrical signal generation subsystem 304 can be part of power source 192. The ability to apply a biasing voltage to microfluidic device 320 does not mean that a biasing voltage will be applied at all times when the microfluidic device 320 is held by the socket 302. Rather, in most cases, the biasing voltage will be applied intermittently, e.g., only as needed to facilitate the generation of electrokinetic forces, such as dielectrophoresis or electro-wetting, in the microfluidic device 320.

As illustrated in FIG. 3A, the nest 300 can include a printed circuit board assembly (PCBA) 322. The electrical signal generation subsystem 304 can be mounted on and electrically integrated into the PCBA 322. The exemplary support includes socket 302 mounted on PCBA 322, as well.

Typically, the electrical signal generation subsystem 304 will include a waveform generator (not shown). The electrical signal generation subsystem 304 can further include an oscilloscope (not shown) and/or a waveform amplification circuit (not shown) configured to amplify a waveform received from the waveform generator. The oscilloscope, if present, can be configured to measure the waveform supplied to the microfluidic device 320 held by the socket 302. In certain embodiments, the oscilloscope measures the waveform at a location proximal to the microfluidic device 320 (and distal to the waveform generator), thus ensuring greater accuracy in measuring the waveform actually applied to the device. Data obtained from the oscilloscope measurement can be, for example, provided as feedback to the waveform generator, and the waveform generator can be configured to adjust its output based on such feedback. An example of a suitable combined waveform generator and oscilloscope is the Red Pitaya™.

In certain embodiments, the nest 300 further comprises a controller 308, such as a microprocessor used to sense and/or control the electrical signal generation subsystem 304. Examples of suitable microprocessors include the Arduino™ microprocessors, such as the Arduino Nano™. The controller 308 may be used to perform functions and analysis or may communicate with an external master controller 154 (shown in FIG. 1A) to perform functions and analysis. In the embodiment illustrated in FIG. 3A the controller 308 communicates with a master controller 154 through an interface 310 (e.g., a plug or connector).

In some embodiments, the nest 300 can comprise an electrical signal generation subsystem 304 comprising a Red Pitaya™ waveform generator/oscilloscope unit ("Red Pitaya unit") and a waveform amplification circuit that amplifies the waveform generated by the Red Pitaya unit and passes the amplified voltage to the microfluidic device 100. In some embodiments, the Red Pitaya unit is configured to measure the amplified voltage at the microfluidic device 320 and then adjust its own output voltage as needed such that the measured voltage at the microfluidic device 320 is the desired value. In some embodiments, the waveform amplification circuit can have a +6.5V to −6.5V power supply generated by a pair of DC-DC converters mounted on the PCBA 322, resulting in a signal of up to 13 Vpp at the microfluidic device 100.

As illustrated in FIG. 3A, the support structure 300 can further include a thermal control subsystem 306. The thermal control subsystem 306 can be configured to regulate the temperature of microfluidic device 320 held by the support structure 300. For example, the thermal control subsystem 306 can include a Peltier thermoelectric device (not shown) and a cooling unit (not shown). The Peltier thermoelectric device can have a first surface configured to interface with at least one surface of the microfluidic device 320. The cooling unit can be, for example, a cooling block (not shown), such as a liquid-cooled aluminum block. A second surface of the Peltier thermoelectric device (e.g., a surface opposite the first surface) can be configured to interface with a surface of such a cooling block. The cooling block can be connected to a fluidic path 314 configured to circulate cooled fluid through the cooling block. In the embodiment illustrated in FIG. 3A, the support structure 300 comprises an inlet 316 and an outlet 318 to receive cooled fluid from an external reservoir (not shown), introduce the cooled fluid into the fluidic path 314 and through the cooling block, and then return the cooled fluid to the external reservoir. In some embodiments, the Peltier thermoelectric device, the cooling unit, and/or the fluidic path 314 can be mounted on a casing 312 of the support structure 300. In some embodiments, the thermal control subsystem 306 is configured to regulate the temperature of the Peltier thermoelectric device so as to achieve a target temperature for the microfluidic device 320. Temperature regulation of the Peltier thermoelectric device can be achieved, for example, by a thermoelectric power supply, such as a Pololu™ thermoelectric power supply (Pololu Robotics and Electronics Corp.). The thermal control subsystem 306 can include a feedback circuit, such as a temperature value provided by an analog circuit. Alternatively, the feedback circuit can be provided by a digital circuit.

In some embodiments, the nest 300 can include a thermal control subsystem 306 with a feedback circuit that is an analog voltage divider circuit (not shown) which includes a resistor (e.g., with resistance 1 kOhm+/−0.1%, temperature coefficient+/−0.02 ppm/C0) and a NTC thermistor (e.g., with nominal resistance 1 kOhm+/−0.01%). In some instances, the thermal control subsystem 306 measures the voltage from the feedback circuit and then uses the calculated temperature value as input to an on-board PID control loop algorithm. Output from the PID control loop algorithm can drive, for example, both a directional and a pulse-width-modulated signal pin on a Pololu™ motor drive (not shown) to actuate the thermoelectric power supply, thereby controlling the Peltier thermoelectric device.

The nest 300 can include a serial port 324 which allows the microprocessor of the controller 308 to communicate with an external master controller 154 via the interface 310 (not shown). In addition, the microprocessor of the controller 308 can communicate (e.g., via a Plink tool (not shown)) with the electrical signal generation subsystem 304 and thermal control subsystem 306. Thus, via the combination of the controller 308, the interface 310, and the serial port 324, the electrical signal generation subsystem 304 and the thermal control subsystem 306 can communicate with the external master controller 154. In this manner, the master controller 154 can, among other things, assist the electrical signal generation subsystem 304 by performing scaling calculations for output voltage adjustments. A Graphical User Interface (GUI) (not shown) provided via a display device 170 coupled to the external master controller 154, can be configured to plot temperature and waveform data obtained from the thermal control subsystem 306 and the electrical signal generation subsystem 304, respectively. Alternatively, or in addition, the GUI can allow for updates to the controller 308, the thermal control subsystem 306, and the electrical signal generation subsystem 304.

FIG. 3B is an optical schematic of an optical apparatus 350 of the system 150 for a microfluidic device. In some embodiments, the optical apparatus 350 can comprise a structured light modulator 330. The structured light modulator 330 can include a digital mirror device (DMD) or a microshutter array system (MSA), either of which can be configured to receive light from a light source 332 and transmits a subset of the received light into the optical apparatus 350. Alternatively, the structured light modulator 330 can include a device that produces its own light (and thus dispenses with the need for a light source 332), such as an organic light emitting diode display (OLED), a liquid crystal on silicon (LCOS) device, a ferroelectric liquid crystal on silicon device (FLCOS), or a transmissive liquid crystal display (LCD). The structured light modulator 330 can be, for example, a projector. Thus, the structured light modulator 330 can be capable of emitting both structured and unstructured light. In certain embodiments, an imaging module and/or motive module of the system can control the structured light modulator 330.

In some embodiments, the optical apparatus 350 can have a microscope configuration. In such embodiments, the nest 300 and the structured light modulator 330 can be individually configured to be integrated into the microscope configuration of the optical apparatus 350. In some embodiments, the optical apparatus 350 can further include one or more image sensors or detectors 348. In some embodiments, the image sensor 348 is controlled by an imaging module. The image senor 348 can include an eye piece, a charge-coupled device (CCD), a camera (e.g., a digital camera), or any combination thereof. If at least two image sensors 348 are present, one image senor can be, for example, a fast-frame-rate camera while the other detector can be a high sensitivity camera. Furthermore, the optical apparatus 350 can be configured to receive reflected and/or emitted light from a microfluidic device 320 and focus at least a portion of the reflected and/or emitted light on the one or image sensors 348.

In some embodiments, the optical apparatus 350 is configured to use at least two light sources. For example, a first light source 332 can be used to produce structured light (e.g., via the light modulating subsystem 330) and a second light source 334 can be used to provide unstructured light. The first light source 332 can produce structured light for optically-actuated electrokinesis and/or fluorescent excitation, and the second light source 334 can be used to provide bright field illumination. In these embodiments, the motive module 164 can be used to control the first light source 332 and the imaging module 164 can be used to control the second light source 334. The optical apparatus 350 can be configured to receive structured light from the structured light modulator 330 and project the structured light on at least a first region in a microfluidic device, such as an optically-actuated electrokinetic device, when the device is being held by the nest 300, and receive reflected and/or emitted light from the microfluidic device and image at least a portion of such reflected and/or emitted light onto the image senor 348. The optical apparatus 350 can be further configured to receive unstructured light from a second light source and project the unstructured light on at least a second region of the microfluidic device, when the device is held by the nest 300. In certain embodiments, the first and second regions of the microfluidic device 320 can be overlapping regions. For example, the first region can be a subset of the second region.

In FIG. 3B, the first light source 332 is shown supplying light to a structured light modulator light 330, which provides structured light to the microfluidic device 320. The second light source 334 is shown providing unstructured light via a beam splitter 336. Structured light from the light modulator 330 and unstructured light from the second light source 334 travel from the beam splitter 336 together to reach a second beam splitter (or dichroic filter 338, depending on the light provided by the light modulator 330), where the light gets reflected down through the objective 340 to the microfluidic device 320. Reflected and/or emitted light from the microfluidic device 320 then travels back up through the objective 340, through the beam splitter and/or dichroic filter 338, and to a dichroic filter 346. Only a fraction of the light reaching dichroic filter 346 passes through and reaches the detector 348.

In some embodiments, the second light source 334 emits blue light. With an appropriate dichroic filter 346, blue light reflected from the microfluidic device 320 is able to pass through dichroic filter 346 and reach the detector 348. In contrast, structured light coming from the light modulator 330 gets reflected from the microfluidic device 320, but does not pass through the dichroic filter 346. In this example, the dichroic filter 346 is filtering out visible light having a wavelength longer than 495 nm. Such filtering out of the light from the light modulator 330 would only be complete (as shown) if the light emitted from the light modulator did not include any wavelengths shorter than 495 nm. In practice, if the light coming from the light modulator 330 includes wavelengths shorter than 495 nm (e.g., blue wavelengths), then some of the light from the light modulator would pass through filter 346 to reach the image senor 348. In such an embodiment, the filter 346 acts to change the balance between the amount of light that reaches the image senor 348 from the first light source 332 and the second light source 334. This can be beneficial if the first light source 332 is significantly stronger than the second light source 334. In other embodiments, the second light source 334 can emit red light, and the dichroic filter 346 can filter out visible light other than red light (e.g., visible light having a wavelength shorter than 650 nm).

In certain embodiments, the first light source 332 can emit a broad spectrum of wavelengths (e.g., "white" light). The first light source 332 can emit, for example, at least one wavelength suitable for excitation of a fluorophore. The first light source 332 can be sufficiently powerful such that structured light emitted by the light modulator 330 is capable of activating light actuated electrophoresis in a light-actuated actuated microfluidic device 320. In certain embodiments, the first light source 332 can include a high intensity discharge arc lamp, such as those Including metal halides, ceramic discharge, sodium, mercury, and/or xenon. In other embodiments, the first light source 332 can include one or more LEDs (e.g., an army of LEDs, such as a 2×2 array of 4 LEDs or a 3×3 array of 9 LEDs). The LED(s) can include a broad-spectrum "white" light LED (e.g., the UHP-T-LED-White by PRIZMATIX), or various narrowband wavelength LEDs (e.g., emitting a wavelength of about 380 nm, 480 nm, or 560 nm). In still other embodiments, the first light source 332 can incorporate a laser configured to emit light at selectable wavelengths (e.g., for OET and/or fluorescence).

In certain embodiments, the second light source 334 is suitable for bright field illumination. Thus, the second light source 334 can include one or more LEDs (e.g., an array of LEDs, such as a 2×2 array of 4 LEDs or a 3×3 array of 9 LEDs). The LED(s) can be configured to emit white (i.e., wide spectrum) light, blue light, red light, etc. In some embodiments, the second light source 334 can emit light having a wavelength of 495 nm or shorter. For example, the second light source 622 can emit light having a wavelength of substantially 480 nm, substantially 450 nm, or substantially 380 nm. In other embodiments, the second light source 334 can emit light having a wavelength of 650 nm or longer. For example, the second light source 334 can emit light having a wavelength of substantially 750 nm. In still other embodiments, the second light source 334 can emit light having a wavelength of substantially 560 nm.

In certain embodiments, the optical apparatus 350 include a dichroic filter 346 that filters out, at least partially, visible light having a wavelength longer than 495 nm. In other embodiments, the optical apparatus 350 include a dichroic filter 346 that filters out, at least partially, visible light having a wavelength shorter than 650 nm (or shorter than 620 nm). More generally, the optical apparatus 350 can also include a dichroic filter 346 configured to reduce or substantially prevent structured light from a first light source 332 from reaching a detector 348. Such a filter 346 can be located proximal to the detector 346 (along the optical apparatus). Alternatively, the optical apparatus 350 can include one or more dichroic filters 346 that is/are configured to balance the amount of structure light (e.g., visible structured light) from the light modulator 330 and the amount of unstructured light (e.g., visible unstructured light) from the second light source 334 that reaches said detector 348. Such balance can be used to ensure that the structured light does not overwhelm the unstructured light at the detector 348 (or in images obtained by the detector 348).

In some embodiments, the optical apparatus 350 can further include at least one tube lens 381 located between the objective lens 340 and the image sensor 348 in an imaging path of the apparatus 350. The objective lens 340 no longer projects an intermediate image directly into an intermediate image plane. Instead, the objective lens 340 is configured so that light emerging from a rear aperture of the objective lens 340 is focused to infinity, and the tube lens 381 is configured to form an image at a focal plane of the tube lens 381. Light beams exiting the infinity-focused objective lens 340 are collimated, such that the beam-splitter 338, the filter 346 polarizers, and other components requiring a parallel beam can be easily introduced into the imaging path. After passing through these auxiliary optical devices, the parallel light beams can be configured to converge and form an image of the microfluidic device 320 by the tube lens 381. Without the tube lens 381, insertion of the beam-splitter and other components in the imaging path can introduce spherical aberration and possibly "ghost images" effect as a result of converging light beams passing through the beam-splitter. The objective lens 340 and the tube lens 381 together can produce an image at the image senor 348. The region between the objective lens 340 and the tube lens 381 (infinity space) provides a path of parallel light beams into which complex optical components can be placed without the introduction of spherical aberration or modification of the objective lens 340 working distance.

Figure 4A:
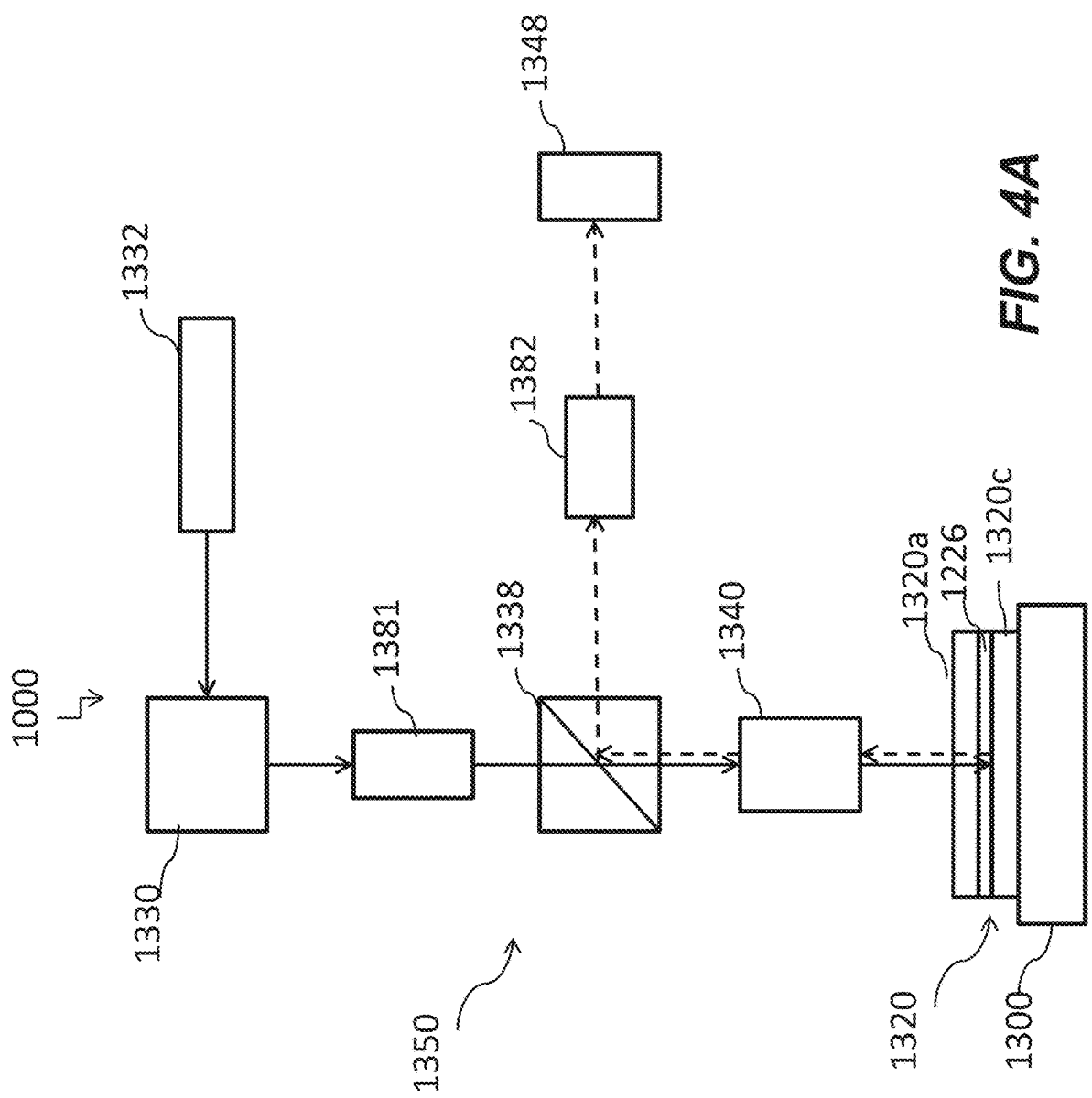
FIG. 4A is a schematic of a system including an optical apparatus and a microfluidic device according to some embodiments of the disclosure.
Figure 4B:
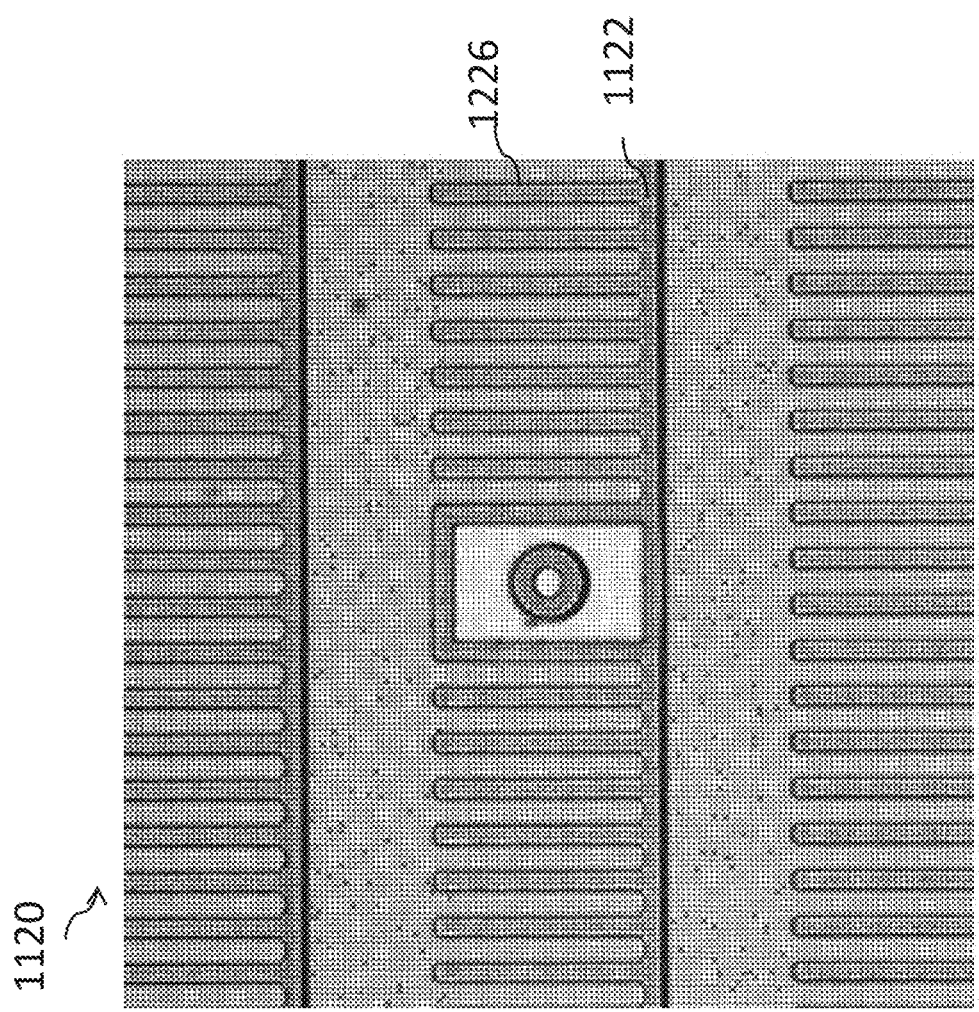
FIG. 4B illustrates an example of a plurality of sequestration pens in the microfluidic device of FIG. 4A.

FIG. 4A is an optical schematic of a system 1000 for imaging and manipulating micro-objects. The system 1000 can comprise a microfluidic device 1320, such as a light-actuated microfluidic (or "LAMF") device, and an optical apparatus 1350. The microfluidic device 1320 can be any microfluidic device described herein or otherwise known in the art. For example, the microfluidic device can comprise an enclosure configured to hold one or more micro-objects in a fluidic medium, and a substrate 1320c. FIG. 4B provides an image of portion (or a field of view) or an exemplary a microfluidic device 1320. The substrate 1320c of the LAMF device can comprise a surface 1120 and a plurality of dielectrophoresis (DEP) electrodes on (or comprised by or integrated with) the surface. The microfluidic device 1320 can further comprise a flow region 1122 and one or more (e.g., a plurality of) sequestration pens 1226. As illustrated in FIG. 4B, each sequestration pen 1226 can be fluidically connected to the flow region 1122. The flow region 1122 and the plurality of sequestration pens 1226 can be disposed on the surface 1120 of the substrate of the microfluidic device 1320. The microfluidic device 1320 can further comprise a cover 1320a. The cover 1320a can comprise a ground electrode. As illustrated in FIG. 4B, the cover 1320a can be transparent to visible light.

The optical apparatus 1350 can be configured to perform imaging, analysis and manipulation of one or more micro-objects within the enclosure of the microfluidic device 1320. As shown in FIG. 4A, the optical apparatus 1350 can comprise a structured light modulator 1330, a first tube lens 1381, an objective lens 1340, a dichroic beam splitter 1338, a second tube lens 1382, and an image sensor 1348. The optical apparatus 1350 can further comprise a first light source 1332.

In general, the structured light modulator 1330 can be configured to receive unstructured light beams from the first light source 1332 and transmit structured light beams to the first tube lens 1381. As discussed in greater detail above, the structured light beams can be used to selectively activate one or more of the plurality of dielectrophoresis (DEP) electrodes on the surface 1120. The first tube lens 1381 is configured to capture the structured light beams from the structured light modulator 1330. The objective lens 1340 is configured to image at least a portion of the plurality of sequestration pens 1226 of the microfluidic device 1320 within a field of view. The field of view, for example, can be larger than 10 mm×10 mm, 11 mm×11 mm, 12 mm×12 mm, 13 mm×13 mm, 14 mm×14 mm, 15 mm×15 mm, etc.

The dichroic beam splitter 1338 is configured to reflect or transmit light beams from the first tube lens 1381 to the objective lens 1340, and to transmit or reflect light beams received from the objective lens 1340 to the second tube lens 1382. The second tube lens 1382 is configured to receive the light beams from the dichroic beam splitter 1338 and to transmit the light beams to an image sensor 1348. The image sensor 1348 is configured to receive light beams from the second tube lens and generate therefrom an image of at least a portion of the plurality of sequestration pens 1226 within the field of view.

In some embodiments, the structured light modulator 1330 can include a digital mirror device (DMD) or a microshutter array system (MSA), either of which can be configured to receive light from a light source 332 and selectively transmits a subset of the received light. One exemplary DMD that is suitable for the any of the optical apparatus disclosed herein, including optical apparatus 1350, is the DLP-9000 (Texas Instruments). Alternatively, the structured light modulator 1330 can include a device that produces its own light (and thus dispenses with the need for a light source 1332), such as an organic light emitting diode display (OLED), a liquid crystal on silicon (LCOS) device, a ferroelectric liquid crystal on silicon device (FLCOS), or a transmissive liquid crystal display (LCD). The structured light modulator 1330 can be, for example, a projector. Thus, the structured light modulator 1330 can be capable of emitting both structured and unstructured light.

In some embodiments, the structured light modulator 1330 can be configured to modulate light beams received from the first light source 1332 and transmits a plurality of illumination light beams, which are structured light beams. The structured light beams can comprise the plurality of illumination light beams. The plurality of illumination light beams can be selectively activated to generate a plurality of illuminations patterns. In some embodiments, the structured light modulator 1330 can be configured to generate an illumination pattern, which can be moved and adjusted. The optical apparatus 1350 can further comprise a control unit (not shown) which is configured to adjust the illumination pattern to selectively activate the one or more of the plurality of DEP electrodes and generate DEP forces to move the one or more micro-objects inside the plurality of sequestration pens 1226.

For example, the plurality of illuminations patterns can be adjusted over time in a controlled manner to manipulate the micro-objects in the microfluidic device 1320. For example, each of the plurality of illumination patterns can be shifted to shift the location of the DEP force generated and to move the structured light for one position to another in order to move the micro-objects within the enclosure of the microfluidic apparatus 1320.

Referring to FIG. 4A, in some embodiments, the optical apparatus 1350 is configured such that each of the plurality of sequestration pens 1226 within the field of view is simultaneously in focus at the image sensor 1348 and at the structured light modulator 1330. For example, the optical apparatus 1350 can have a confocal configuration or confocal property. The optical apparatus 1350 can be further configured such that only each interior area of the flow region and/or each of the plurality of sequestration pens 1226 within the field of view is imaged onto the image sensor 1348 in order to reduce overall noise to increase the contrast and resolution of the image.

For example, the structured light modulator 1330 can be disposed at a conjugate plane of the image sensor 1348. The structured light modulator 1330 can receive unstructured light beams from the first light source 1332 and modulate the light beams to generate a plurality of illumination beams, which are structured light beams. The active area of the structured light modulator can be at least 10 mm×10 mm (e.g., at least 10.5 mm×10.5 mm, 11 mm×11 mm, 11.5 mm×11.5 mm, 12 mm×12 mm, 12.5 mm×12.5 mm, 13 mm×13 mm, 13.5 mm×13.5 mm, 14 mm×14 mm, 14.5 mm×14.5 mm, 15 mm×15 mm, or greater). The first tube lens 1381 can have a large clear aperture, for example, a diameter larger than 40 mm, 41 mm, 42 mm, 43 mm, 44 mm, 45 mm, 46 mm, 47 mm, 48 mm, 49 mm, 50 mm, etc. Thus, the first tube lens 1381 can have an aperture that is large enough to capture all (or substantially all) of the light beams emanating from the structured light modulator.

Figure 4C:
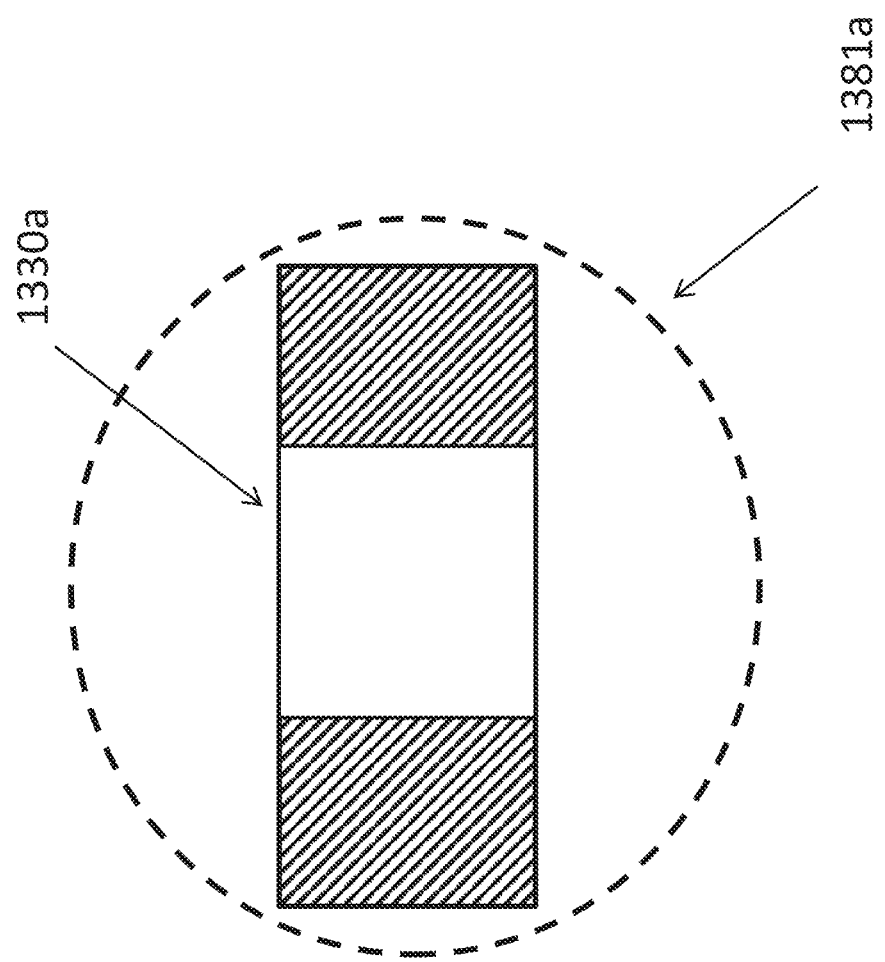
FIG. 4C illustrates a first tube lens of the optical apparatus is configured to capture all light beams from a structured light modulator in FIG. 4A.

FIG. 4C illustrates the first tube lens 1381 of the optical apparatus 1350 in FIG. 4A is configured to capture all light beams from the structured light modulator 1330. The structured light modulator 1330 can have a plurality of mirrors. Each mirror of the plurality of mirrors can have a size of 5 microns×5 microns, 6 microns×6 microns, 7 microns×7 microns, 8 microns×8 microns, 9 microns×9 microns, 10 microns×10 microns, or any values therebetween. The structured light modulator 1330 can include an array of mirrors (or pixels) that is 2000×1000, 2580×1600, 3000×2000, or any values therebetween. For a mirror size of 7.6 microns× 7.6 microns, the structured light modulator 1330 can have the dimensions of 15.2 mm×7.6 mm, 19.6 mm×12.2 mm, 22.8 mm×15.2 mm, or any values therebetween. As shown in FIG. 4C, in some embodiments, only a portion of an illumination area 1330a of the structured light modulator 1330 is used. For example, 50%, 60%, 80% or any values therebetween of the illumination area 1330a of the structured light modulator 1330 is used. The first tube lens 1381 can be configured to have a large field of view 1381a that is larger than the illumination area 1330a of the structured light modulator 1330. The first tube lens 1381 can be configured to capture all light beams from the structured light modulator 1330.

Referring to FIG. 4A, in some embodiments, the first tube lens 1381 can be configured to generate collimated light beams and transmit the collimated light beams to the objective lens 1340. The objective 1340 can receive the collimated light beams from the first tube lens 1381 and focus the collimated light beams into each interior area of the flow region and each of the plurality of sequestration pens 1226 within the field of view of the image sensor 1348 or the optical apparatus 1350. In some embodiments, the first tube lens 1381 can be configured to generate a plurality of collimated light beams and transmit the plurality of collimated light beams to the objective lens 1340. The objective 1340 can receive the plurality of collimated light beams from the first tube lens 1381 and converge the plurality of collimated light beams into each of the plurality of sequestration pens 1226 within the field of view of the image sensor 1348 or the optical apparatus 1350.

In some embodiments, the optical apparatus 1350 can be configured to illuminate the at least a portion of sequestration pens with a plurality of illumination spots. The objective 1340 can receive the plurality of collimated light beams from the first tube lens 1381 and project the plurality of illumination spots into each of the plurality of sequestration pens 1226 within the field of view. For example, each of the plurality of illumination spots can have a size of about 10 microns×30 microns, 30 microns×60 microns, 60 microns× 120 microns, 80 microns×100 microns, 100 microns×140 microns and any values there between. For example, each of the plurality of illumination spots can an area of about 4000 to about 10000, 5000 to about 15000, 7000 to about 20000, 8000 to about 22000, 10000 to about 25000 square microns and any values there between.

In some embodiments, the optical apparatus 1350 can be configured to perform confocal imaging. For example, the structured light modulator 1330 can be configured to generate a thin strip that can scan through the plurality of sequestration pens 1226 within the field of view to reduce out-of-focus light to reduce overall noise. For another example, the structured light modulator 1330 can be configured to generate a plurality of illuminations spots within diffraction limits. For another example, the structured light modulator 1330 can be configured to move along an optical axis pf the optical apparatus 1350 to obtain a plurality of images along the optical axis, the plurality of images along the optical axis can be combined to reconstruct 3 dimensional images of the micro-objects in the plurality of sequestration pens 1226 in the microfluidic apparatus 1320.

The second tube lens 1382 is located between the objective lens 1340 and the image sensor 1348 in an imaging path of the apparatus 1350. The objective lens 1340 is configured so that light emerging from a rear aperture of the objective lens 1340 is focused to infinity, and the second tube lens 1382 is configured to form an image of the micro-objects in the plurality of sequestration pens 1226 at a focal plane of the tube lens 1382. Light beams exiting the infinity-focused objective lens 1340 can be configured to be collimated, such that the beam-splitter 1338 and other components can be easily introduced into the imaging path of the optical apparatus 1350 without the introduction of spherical aberration or modification of a working distance of the objective lens 1340.

In some embodiments, the optical apparatus 1350 can further comprise a nest 1300. The nest 1300 can be configured to hold the microfluidic device 1320 and provide electrical connection to the enclosure. The nest 1300 can be integrated with the optical apparatus 1350 and be a part of the apparatus 1350. The nest 1300 can be further configured to provide fluidic connections to the enclosure. Users can just load the microfluidic apparatus 1320 into the nest 1300. In some other embodiments, the nest 1300 can be a separate component independent of the optical apparatus 1350.

FIG. 5A illustrates a plurality of light sources can be used in an optical apparatus 5350 and a light-actuated microfluidic apparatus in some other embodiments. As discussed above, a variety of light sources may be used as the first light source 5332, providing structured light to the DMD tube lens 5460. In some embodiments, the first light source 5332 may be a light emitting diode (LED). The light source 5332 may emit light 505 having a broad spectrum of light wavelengths, which upon impinging a DMD 5440, provides structured light 515 to a DMD folding mirror 5336, which may be a dichroic folding mirror. DMD folding mirror 5336 redirects structured light 515 to the DMD tube lens 5460. In some embodiments, the optical apparatus can further comprise a second light source 5334 configured to provide unstructured bright field illumination 525 through DMD folding mirror 5336 to arrive at DMD tube lens 5460. In some other embodiments, the optical apparatus can further comprise a third light source 5335, for example, a laser light source, providing light illumination 535, which may be configured to heat up the plurality of sequestration pens in the microfluidic apparatus. FIG. 5B illustrates an example of light transmission through the dichroic folding mirror 5336, as configured for the plurality of light sources in FIG. 5A.

Structured light 515, arriving from the DMD 5440, may have a wavelength from about 400 nm to about 710 nm, and may be used, after passing through the DMD tube lens 5460 to any microfluidic device as described herein for photoactivation of a DEP or OEW configuration within the microfluidic device. The structured light 515, having a wavelength of about 400 nm to about 710 nm, may alternatively or in addition, provide fluorescent excitation illumination to the microfluidic device. In some embodiments, the structured light 515 may have a wavelength of about 400 nm to about 650 nm, about 400 nm to about 600 nm, about 400 nm to about 550 nm, about 400 nm to about 500 nm, about 450 nm to about 710 nm, about 450 to about 600 nm, or about 450 nm to about 550 nm.

Unstructured brightfield illumination 525 arrives from the second light source 5334 to the DMD folding mirror 5336 and may pass through mirror 5336 substantially (e.g., within about 10%) at the same wavelength and/or substantially (e.g., within about 10%) at the same intensity before impinging on the mirror. Alternatively, the mirror 5336 may fold to permit brightfield illumination 525 to pass, enter tube lens 5460 and travel further to enter the microfluidic device, which may be any microfluidic device as described herein. The brightfield illumination light 525 may have any suitable wavelength, and in some embodiments, may have a wavelength of about 400 nm to about 760 nm. In some embodiments, the brightfield illumination light 525 may have a wavelength of more than about 5336 nm and less than about 760 nm, more than about 600 nm and less than about 750 nm, or about 650 nm and less than about 750 nm. In some embodiments, the brightfield illumination light may have a wavelength of about 700 nm, about 710 nm, about 720 nm, about 730 nm, about 740 nm, or about 750 nm.

The third illumination light 535 may pass through DMD mirror 5336 or DMD mirror 5336 may fold to permit illumination light 535 to pass and enter tube lens 5460 and travel further to the microfluidic device, which may be any microfluidic device as described herein. The third illumination light 535, which may be a laser, may be configured to heat portions of one or more sequestration pens within the microfluidic device. The laser illumination 535 may be configured to heat fluidic medium, a micro-object, a wall or a portion of a wall of a sequestration pen, a metal target disposed within a microfluidic channel or sequestration pen of the microfluidic channel, or a photoreversible physical barrier within the microfluidic device. In other embodiments, the laser illumination 535 may be configured to initiate photocleavage of surface modifying moieties of a modified surface of the microfluidic device or photocleavage of moieties providing adherent functionalities for microobjects within a sequestration pen within the microfluidic device. The laser illumination 535 may have any suitable wavelength. In some embodiments, the laser illumination 535 may have a wavelength of about 350 nm to about 900 nm, about 370 nm to about 850 nm, about 390 nm to about 825 nm, about 400 nm to about 800 nm, about 450 nm to about 750 nm, or any value therebetween. In some embodiments, the laser illumination 535 may have a wavelength of about 700 nm, about 710 nm, about 720 nm, about 730 nm, about 740 nm, about 750 nm, about 760 nm, about 770 nm, about 780 nm, about 790 nm, about 800 nm, about 810 nm or more.

Figure 5C:
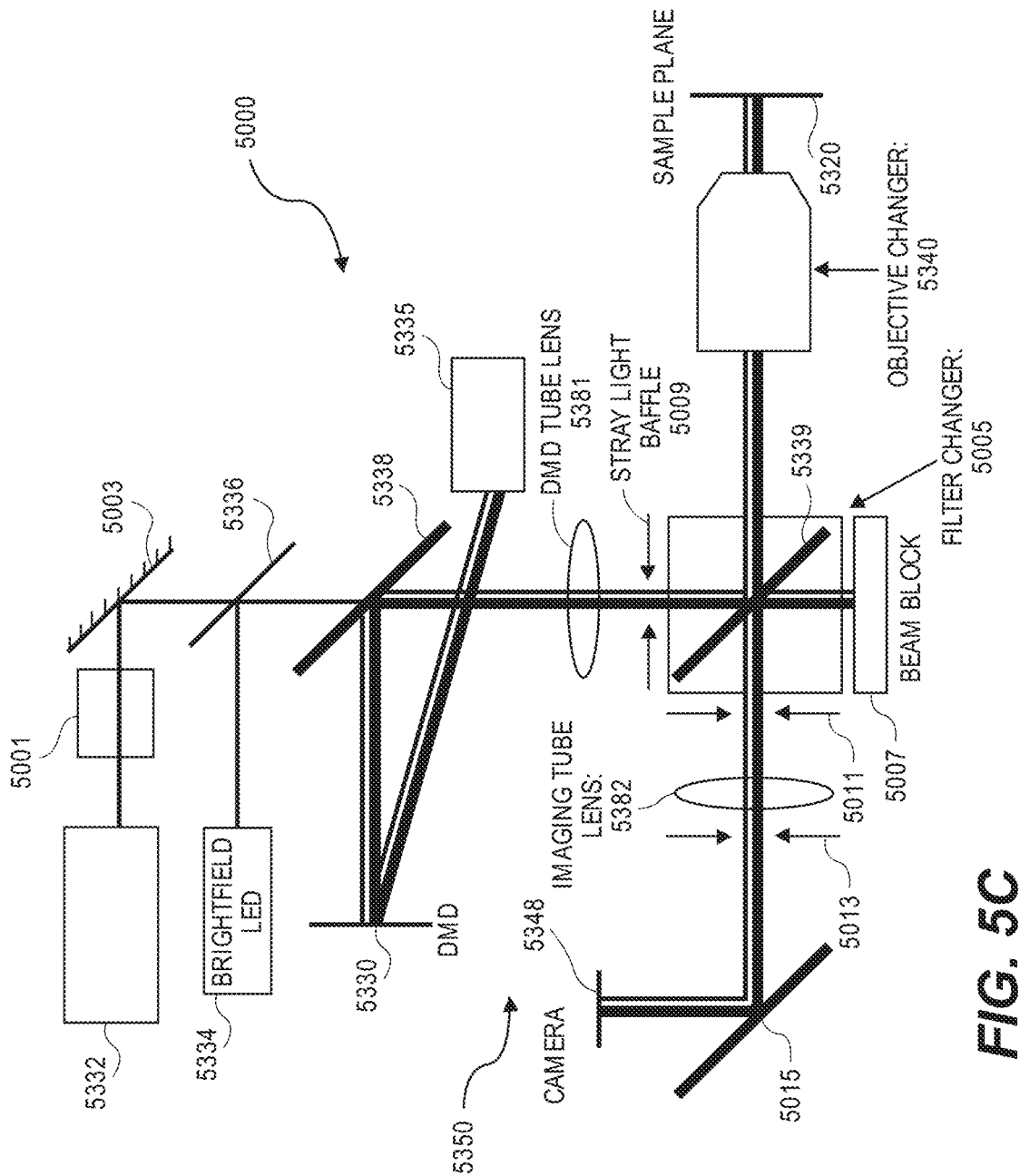
FIG. 5C is a schematic of another embodiment of a system including an optical apparatus and a microfluidic device.

FIG. 5C is a schematic of a system 5000 including an optical apparatus 5350 that includes a first light source 5335, a second light source 5334, and a third light source 5332. The first light source 5335 can transmit light to a structured light modulator 5330, which can include a digital mirror device (DMD) or a microshutter array system (MSA), either of which can be configured to receive light from the first light source 5335 and selectively transmit a subset of the received light into the optical apparatus 5350. Alternatively, the structured light modulator 5330 can include a device that produces its own light (and thus dispenses with the need for a light source 5335), such as an organic light emitting diode display (OLED), a liquid crystal on silicon (LCOS) device, a ferroelectric liquid crystal on silicon device (FLCOS), or a transmissive liquid crystal display (LCD). The structured light modulator 5330 can be, for example, a projector. Thus, the structured light modulator 5330 can be capable of emitting both structured and unstructured light. In certain embodiments, an imaging module and/or motive module of the system can control the structured light modulator 5330. The structured light modulator 5330 can transmit a subset of light to a first dichroic beam splitter 5338, which can reflect this light to a first tube lens 5381.

The second light source 5334 can transmit light to a second dichroic beam splitter 5336, which also receives light from the third light source 5332. The third light source 5332 can transmit light through a matched pair relay lens 5001 to a mirror 5003. In addition, the beam splitter 5338 can receive and transmit light from the third light source 5332 and second light source 5334 to the first tube lens 5381. The light from the first, second, and third light sources passes through the first tube lens 5381 and is transmitted to a third dichroic beam splitter 5339 and filter changer 5005. The third dichroic beam splitter can reflect a portion of the light and transmit the light through one or more filters in the filter changer 5005 and to the objective 5340, which may be an objective changer with a plurality of different objectives that can be switched on demand. Some of the light may pass through the third dichroic beam splitter 5339 and be terminated or absorbed by a beam block 5007. The light reflected from the third dichroic beam splitter 5339 passes through the objective 5340 to illuminate the sample plane 5320, which can be a portion of a microfluidic device such as the sequestration pens described herein. The combined light can function to illuminate, heat, and/or excite the samples in the sample plane 5320. Light can be reflected off and/or emitted from the sample plane 5320 to pass back through the objective changer 5340, through the filter changer 5005, and through the third dichroic beam splitter 5339 to a second tube lens 5382. The light can pass through the second tube lens 5382 (or imaging tube lens 5382) and be reflected from a mirror 5015 to an imaging sensor 5348. Stray light baffles 5009, 5011, and 5013 can be placed between the first tube lens 5381 and the third dichroic beam splitter 5339, between the third dichroic beam splitter 5339 and the second tube lens 5382, and between the second tube lens 5382 and the imaging sensor 5348.

Figure 6A:
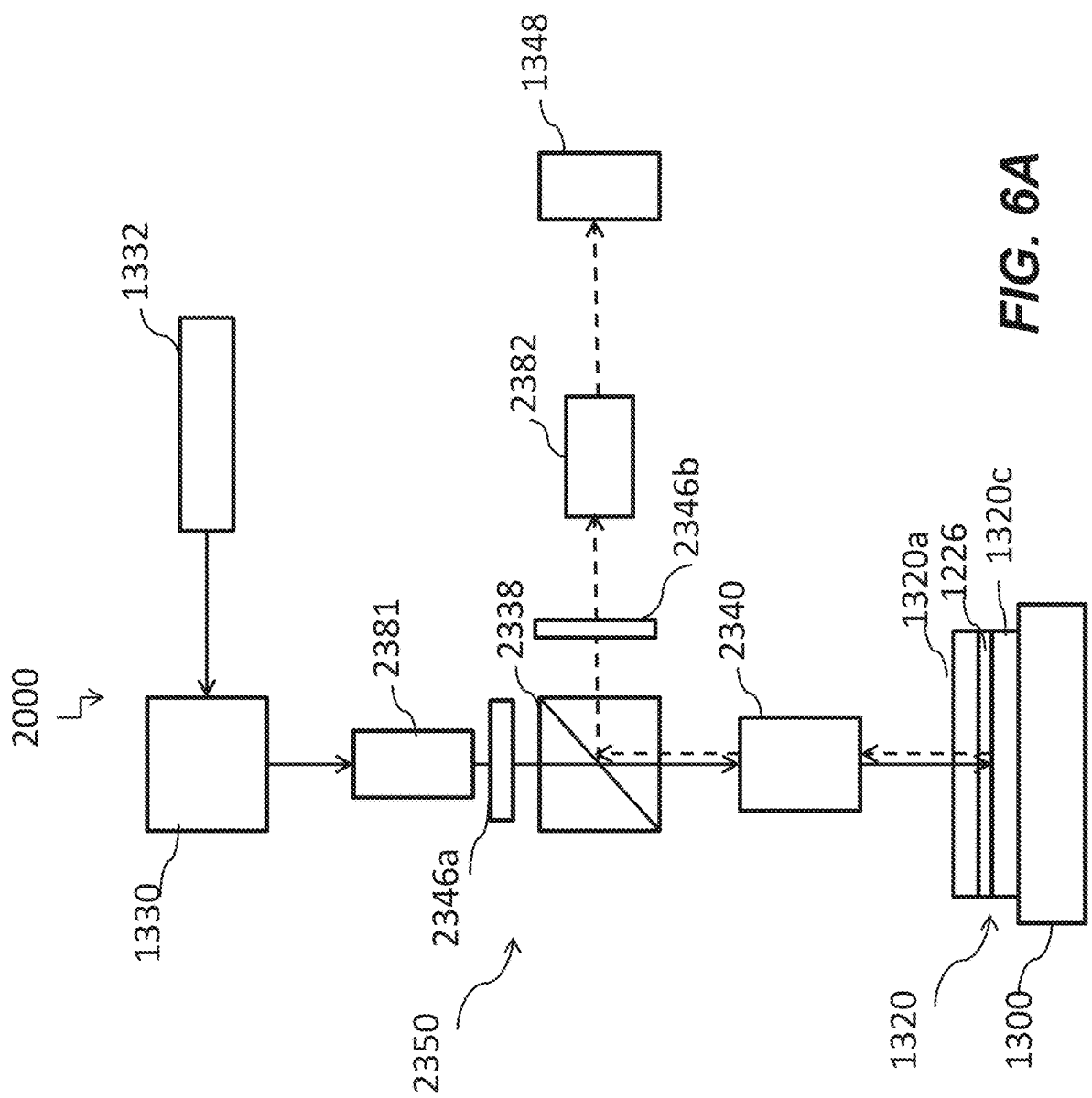
FIG. 6A is a schematic of a system including an optical apparatus with an excitation filter and an emission filter according to some other embodiments of the disclosure.

FIG. 6A is a schematic of a system 2000 including an optical apparatus 2350 with an excitation filter 2346a and an emission filter 2346b according to some other embodiments of the disclosure. Excitation filters and emission filters can be inserted into the optical paths of the optical apparatus 2350. The first tube lens 2381, the second tube lens 2382 and the objective lens 2340 form infinity-corrected optical configuration such that the beam-splitter 2338, the excitation filter 2346*a* and the emission filter 2346*b* can be easily introduced into the optical path of the optical apparatus 2350 without the introduction of spherical aberration.

FIG. 6B is a schematic of a system 3000 including an optical apparatus 3350 where a beam splitter 3338 is configured to reflect light beams from a first light source 3332 according to some other embodiments of the disclosure. The beam splitter can be configured to transmit or reflect light beams from the first light source, and reflect or transmit light beams from the objective lens, as shown in FIG. 4A and FIG. 6B respectively.

Referring back to FIG. 4A, the optical apparatus can comprise the objective lens 1340 that is specifically designed and configured for viewing and manipulating of micro-objects in the microfluidic device 1320. For example, conventional microscope objective lenses are designed to view micro-objects on a slide or through 5 mm of aqueous fluid, while micro-objects in the microfluidic device 1320 are inside the plurality of sequestration pens 1226 which have a depth of 20, 30, 40, 50, 60 70, 80 microns or any values therebetween. In some embodiments, a transparent cover 1320*a*, for example, glass or ITO cover with a thickness of about 750 microns, can be placed on top of the plurality of sequestration pens 1226. Thus, the images of the micro-objects obtained by using the conventional microscope objective lenses may have large aberrations such as spherical and chromatic aberrations, which can degrade the quality of the images. The objective lens 1340 of the optical apparatus 1350 can be configured to correct the spherical and chromatic aberrations in the optical apparatus 1350.

Figure 6C:
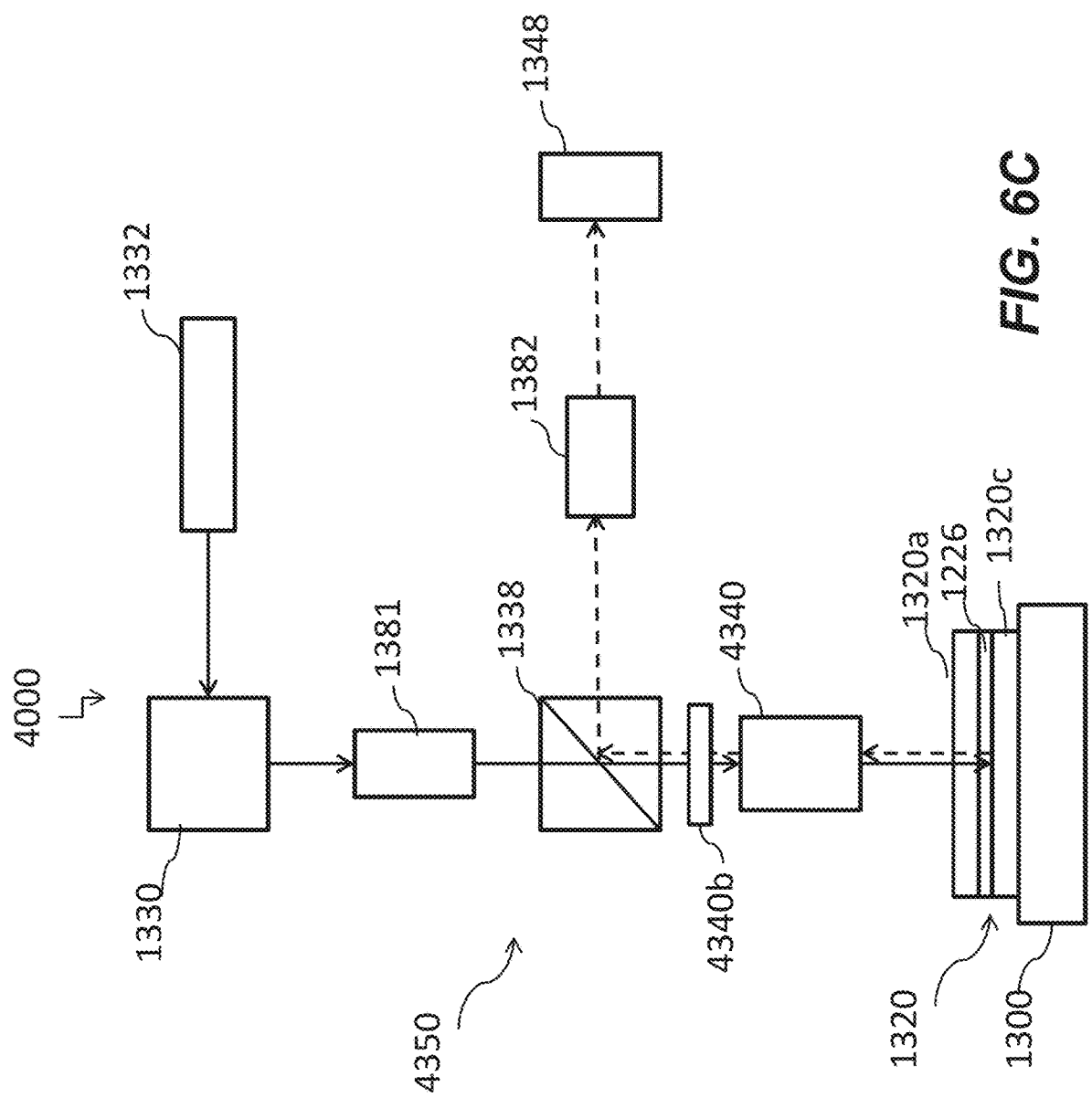
FIG. 6C is a schematic of a system including an optical apparatus with a correction lens to compensate aberration according to yet some other embodiments of the disclosure.

FIG. 6C is a schematic of a system 4000 including an optical apparatus 4350 with a correction lens 4340*b* to compensate aberration from an objective lens 4340 according to yet some other embodiments of the disclosure. The objective lens 4340 can be a conventional microscope objective lens, for example, an objective lens with a magnification, 4×, 10×, 20×, etc. from Olympus or Nikon. It can be very challenging and costly to redesign the microscope objective lens because of the complexity of the optical design. In some embodiments, the correction lens 4340*b* can be used to compensate, correct and minimize the residual aberrations resulted from using a conventional microscope objective lens 4340. For example, the correction lens 4340*b* can be inserted between the objective lens 4340 and the beam splitter 1338. For another example, the correction lens can be inserted between the objective lens and the microfluidic device. In some other embodiments, the first tube lens and the second tube lens can be configured to minimize the residual aberrations of the conventional microscope objective lens.

Again, referring back to FIG. 4A, the optical apparatus 1350 of the system 1000 for imaging and manipulating micro-objects often have mechanical constraint because of the limited available space. The tube lenses 1381, 1382 for the optical apparatus 1350 have to be specifically designed and configured to meet the mechanical and optical requirements. In some embodiments, the first tube lens can have a focal length of about 155 mm or about 162 mm and the second tube lens can have a focal length of about 180 mm. In some other embodiments, the first tube lens can have a focal length of about 180 mm and the second tube lens can have a focal length of about 200 mm.

The conjugates of a front focal point and a back focal point of the tube lenses 1381, 1382 of the optical apparatus 1350 are located differently than those of a conventional tube lens. In general, for a conventional tube lens, a "Back Focal Length (BFL)" and "Front Focal Length (FFL)" are about equal. The conjugates of a front focal point and a back focal point of the conventional tube lens are normally equally spaced from a midpoint of the tube lens and are symmetric. However, for the optical apparatus 1350, the "infinity space" between the objective lens 1340 and the first tube lens 1381 has to be configured to meet the mechanical constraint. In some embodiments, the "infinity space" has to be maximized. In some embodiments, the "infinity space" has to be minimized. In some embodiments, a conjugate point, which corresponds to the front focal point of the first tube lens 1381, has to be located as far away from the edge of the tube lens 1381 as possible, in order to have mechanical space available. In some embodiments, another conjugate point, which corresponds to the back focal point of the first tube lens 1381, has to be located as close to the edge of the tube lens 1381 as possible, in order to minimize the distance from the tube lens to the Structured light modulator. Thus, the BFL of the tube lens 1381 has to be designed or configured to be minimized. In some other embodiments, the BFL of the tube lens 1381 has to be designed or configured to be maximized.

Similarly, in some embodiments, the "infinity space" between the objective lens 1340 and the second tube lens 1382 has to be maximized. In some other embodiments, the "infinity space" between the objective lens 1340 and the second tube lens 1382 has to be minimized. For example, if the second tube lens 1382 has an effective focal length (EFL) of 180 mm, in a conventional tube lens design, the conjugates, which are the front focal point and the back focal point, would be 180 mm from the midpoint of the tube lens 1382, on both sides. In the optical apparatus 1350, in order to maximize the "infinity space" between the objective lens 1340 and the second tube lens 1382, the BFL of the tube lens 1382 can be configured or designed to be minimized, as short as possible. In some other embodiments, the BFL of the tube lens 1382 can be configured or designed maximized, as long as possible. Therefore, the conjugates of a front focal point and a back focal point of the tube lenses 381, 1382 of the optical apparatus 1350 are not equally spaced from the midpoint and not symmetric.

Figure 7A:
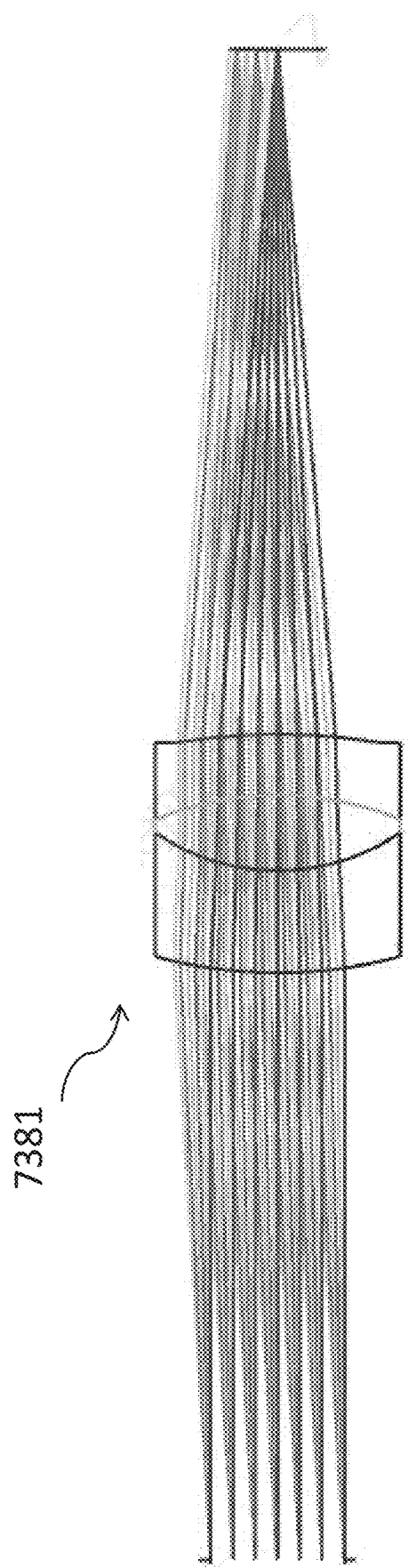
FIG. 7A is an optical schematic of an example tube lens of an optical apparatus for a microfluidic device.

FIG. 7A is an optical schematic for a tube lens 7381 of the optical apparatus with an EFL of 155 mm. There is no commercially available tube lens with an EFL shorter than 162 mm currently. It is difficult to design the tube lens with a short EFL of 155 mm because the light beams passing the tube lens are being bended at a large angle, thus creating large aberrations. Special considerations have to be taken in order to minimize the "infinity" space between the tube lens and the objective. A front focal point and a back focal point of the tube lens are not equally spaced from a midpoint of the tube lens and are not located symmetric. The BFL of the tube length is minimized. For example, the BFL of the tube length is about 133 mm, 134 mm, 135 mm, or 136 mm in some embodiments.

For example, the tube lens with EFL 155 mm can comprise a first surface having a convex shape and a positive radius of curvature of about 91 mm, a second surface having a convex shape and a positive radius of curvature of about 42 mm, a third surface having a concave shape and a negative radius of curvature of about −62 mm, and a fourth surface having a concave shape and a negative radius of curvature of about −116 mm. The tube lens can have a clear aperture with a diameter lager than 44, 45, 46, 47, 48, 49, 50 mm. For example, the tube lens can have a clear aperture with a diameter of about 48 mm.

Figure 7B:
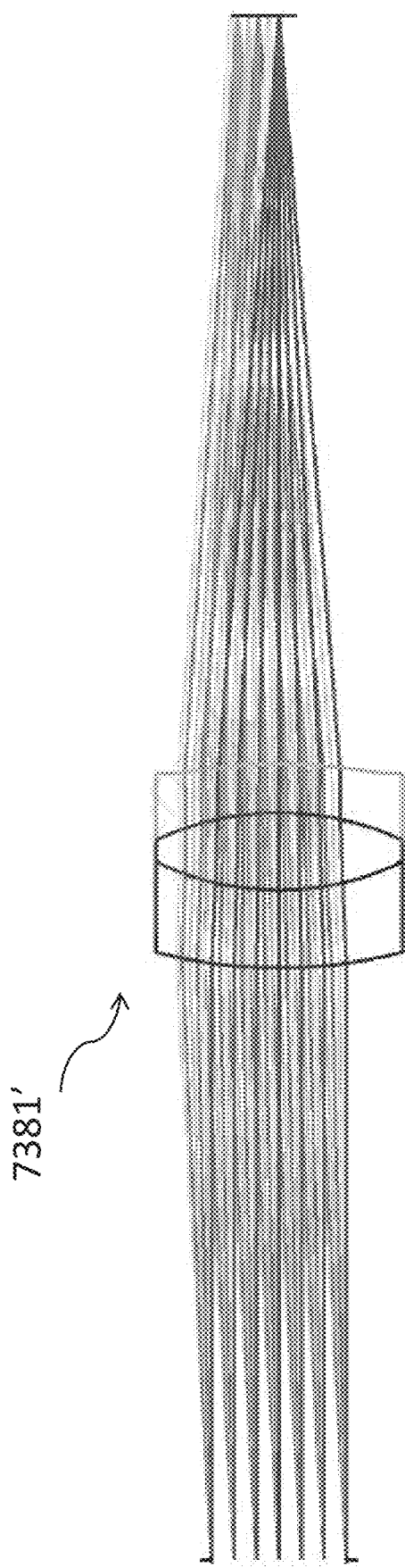
FIG. 7B is an optical schematic of another example tube lens of an optical apparatus for a microfluidic device.

FIG. 7B is an optical schematic for a tube lens 7831' of the optical apparatus with an EFL of 162 mm. The tube lens can comprise a first surface having a convex shape and a positive radius of curvature of about 95 mm, a second surface having a convex shape and a positive radius of curvature of about 54 mm, a third surface having a concave shape and a negative radius of curvature of about −56 mm, and a fourth surface having a concave shape and a negative radius of curvature of about −105 mm. The tube lens has a clear aperture with a diameter lager than 44, 45, 46, 47, 48, 49, 50 mm. For example, the tube lens can have a clear aperture with a diameter of about 48 mm. A front focal point and a back focal point of the tube lens are not equally spaced from a midpoint and are not located symmetric. The BFL of the tube length is minimized. For example, the BFL of the tube length is about 144 mm, 145 mm, 146 mm, or 147 mm in some embodiments.

Figure 7C:
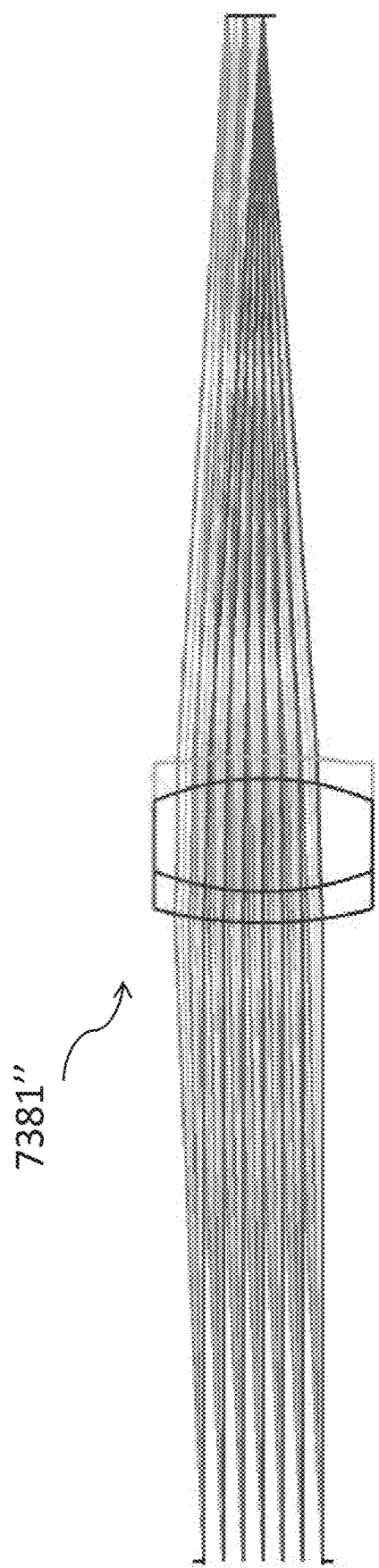
FIG. 7C is an optical schematic of yet another example tube lens of an optical apparatus for a microfluidic device.

FIG. 7C is an optical schematic for a tube lens 7831" of the optical apparatus with an EFL of 180 mm. The tube lens can comprise a first surface having a convex shape and a positive radius of curvature of about 95 mm, a second surface having a convex shape and a positive radius of curvature of about 64 mm, a third surface having a concave shape and a negative radius of curvature of about −60 mm, and a fourth surface having a concave shape and a negative radius of curvature of about −126 mm. The tube lens has a clear aperture with a diameter lager than 44, 45, 46, 47, 48, 49, 50 mm. For example, the tube lens can have a clear aperture with a diameter of about 48 mm. A front focal point and a back focal point of the tube lens are not equally spaced from a midpoint and are not located symmetric. The BFL of the tube length is minimized. For example, the BFL of the tube length is 161 mm, 162 mm, 163 mm, 164 mm, or 165 mm in some embodiments.

Figure 7D:
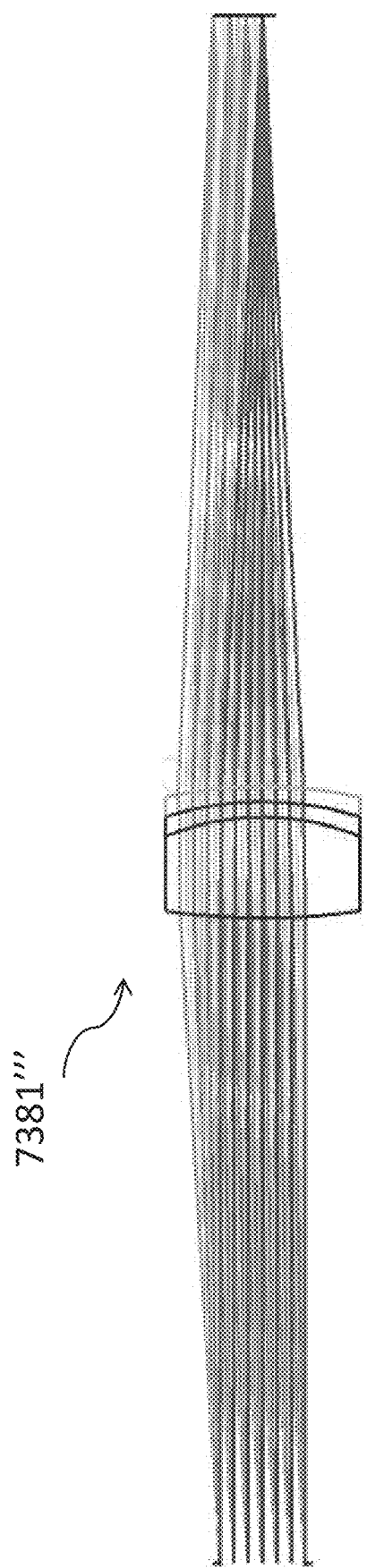
FIG. 7D is an optical schematic of another example tube lens of an optical apparatus for a microfluidic device.

FIG. 7D is an optical schematic for a tube lens 7381''' of the optical apparatus with an EFL of 200 mm. The tube lens can comprise a first surface having a convex shape and a positive radius of curvature of about 160 mm, a second surface having a concave shape and a negative radius of curvature of about −62 mm, a third surface having a concave shape and a negative radius of curvature of about −80 mm, and a fourth surface having a concave shape and a negative radius of curvature of about −109 mm. The tube lens has a clear aperture with a diameter lager than 44, 45, 46, 47, 48, 49, 50 mm. For example, the tube lens can have a clear aperture with a diameter of about 48 mm. A front focal point and a back focal point of the tube lens are not equally spaced from a midpoint and are not located symmetric. The BFL of the tube length is minimized. For example, the BFL of the tube length is 189 mm, 190 mm, 191 mm, or 192 mm in some embodiments. For example, the BFL of the tube length can be 191.08 mm.

Table 1 summarizes examples of BFL of the tube lenses of the optical apparatus. Table 2 shows an example of lens data of a tube lens with an EFL of 155 mm of the optical apparatus. Table 3 shows an example of lens data of a tube lens with an EFL of 162 mm of the optical apparatus. Table 4 shows an example of lens data of a tube lens with an EFL of 180 mm of the optical apparatus. Table 5 shows an example of lens data of a tube lens with an EFL of 200 mm of the optical apparatus.

TABLE 1

Examples of BFL of the tube lenses of the optical apparatus

| EFL (mm) | Imaging Wavelength Range | Lens Diameter (mm) | Materials | BFL (mm) |
|---|---|---|---|---|
| 180.0 | 420-740 nm | 47.7 | S-LAL59, CaF2, S-NSL5 | 163.50 |
| 162.0 | 400-650 nm | 47.7 | S-BAL35, CaF2, S-BAL2 | 145.49 |
| 155.0 | 360-650 nm | 47.7 | S-BSL7, CaF2, PBL6Y | 134.51 |

TABLE 2

An example of a tube lens with an EFL of 155 mm of the optical apparatus

| Surface | | Radius (mm) | Thickness (mm) | Glass | Clear Diameter (mm) |
|---|---|---|---|---|---|
| OBJ | STANDARD | Infinity | Infinity | | 0 |
| STO | STANDARD | Infinity | 115.1011 | | 26 |
| 2 | STANDARD | 90.76744 | 20.0761 | SBSL7 | 47.7 |
| 3 | STANDARD | 41.86237 | 14.85168 | CAF2 | 47.7 |
| 4 | STANDARD | −61.45853 | 11.84032 | PBL6Y | 47.7 |
| 5 | STANDARD | −116.2671 | 134.4121 | | 38.68294 |
| IMA | STANDARD | Infinity | | | 18.89307 |

TABLE 3

An example of a tube lens with an EFL of 162 mm of the optical apparatus

| Surf | Radius (mm) | Thickness (mm) | Glass | Clear Diameter (mm) |
|---|---|---|---|---|
| OBJ | Infinity | Infinity | | 0 |
| STO | Infinity | 115.1011 | | 26 |
| 2 | 95.34819 | 15.08445 | S-BAL35 | 47.7 |
| 3 | 53.71813 | 15.01997 | CAF2 | 47.7 |
| 4 | −56.38092 | 9.528684 | S-BAL2 | 47.7 |
| 5 | −104.6289 | 145.3663 | | 38.663 |
| IMA | Infinity | | | 18.84638 |

TABLE 4

An example of a tube lens with an EFL of 180 mm of the optical apparatus

| Surf | Radius (mm) | Thickness (mm) | Glass | Clear Diameter (mm) |
|---|---|---|---|---|
| OBJ | Infinity | Infinity | | 0 |
| STO | Infinity | 141.0062 | | 26 |
| 2 | 95.28401 | 6.844706 | S-LAL59 | 47.7 |
| 3 | 63.96965 | 25.00471 | CAF2 | 47.7 |
| 4 | −59.26094 | 4.952314 | S-NSL5 | 47.7 |
| 5 | −126.1989 | 163.4191 | | 37.46184 |
| IMA | Infinity | | | 16.04591 |

TABLE 5

An example of a tube lens with an EFL of 200 mm of the optical apparatus

| Surf | Radius (mm) | Thickness (mm) | Glass | Clear Diameter (mm) |
|---|---|---|---|---|
| OBJ | Infinity | Infinity | | 0 |
| STO | Infinity | 159.9649 | | 21 |

TABLE 5-continued

An example of a tube lens with an EFL of 200 mm of the optical apparatus

| Surf | Radius (mm) | Thickness (mm) | Glass | Clear Diameter (mm) |
|---|---|---|---|---|
| 2 | 159.7133 | 25.02974 | S-FPL53 | 47.7 |
| 3 | −62.2007 | 3.80616 | S-TIM8 | 47.7 |
| 4 | −78.99881 | 3.793759 | S-LAH66 | 47.7 |
| 5 | −108.8432 | 191.0868 | | 47.8 |
| IMA | Infinity | | | 24.38727 |

Figure 8A:
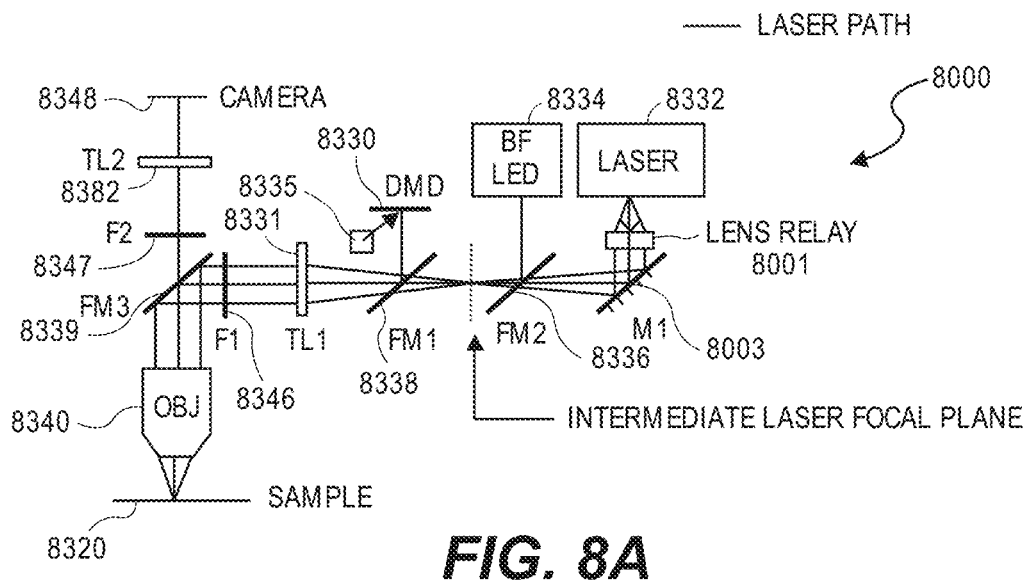

FIG. 8A illustrates another embodiment of an optical configuration that can be used by the optical system 8000. A first light source 8332 (i.e. a laser) can emit light to a lens relay 8001. The light can pass through the lens relay to a first mirror 8003, which can reflect the light to pass through a first dichroic beam splitter 8336. The first dichroic beam splitter 8336 also receives light from a second light source 8334 (i.e, a brightfield LED) and reflects that light along with the light from the first light source to pass through a second dichroic beam splitter 8338. The second dichroic beam splitter 8338 can also receive light from a third light source 8335, which can first emit light to a structured light modulator 8330, which can reflect all or a portion of the light to the second dichroic beam splitter 8338. An intermediate laser focal plane 8017 for the lens relay 8001 can be located between the first dichroic beam splitter 8336 and the second dichroic beam splitter 8338. The second dichroic beam splitter reflects light from the third light source 8335 and passes through light from the first light source 8332 and the second light source 8334 to a first tube lens 8381. The combined light passes through the first tube lens 8381 to a first filter 8346 and then to a third dichroic beam splitter 8339, which can reflect the light to an objective lens 8340 that focuses the light onto a sample plane 8320. The sample plane 8320 is illuminated, heated, and/or excited by the combined light, and can emit light in response to excitation that can pass back through the objective lens 8340 and then pass through the third dichroic beam splitter 8339, through a second filter 8347, through a second tube lens 8382, and to an imaging sensor (i.e., a camera).

Figure 8B:
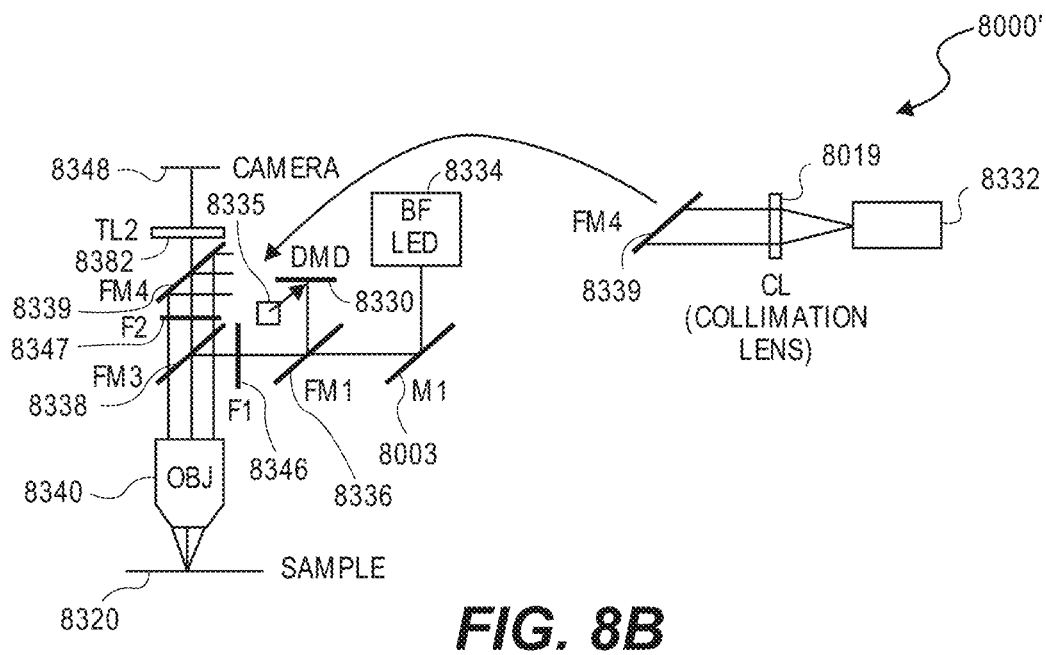

FIG. 8B illustrates another embodiment of an optical configuration that can be used by the optical system 8000' with a first light source 8332 (i.e., a laser), a second light source 8334 (i.e., a brightfield LED), and a third light source 8335. The second light source 8334 can emit light to a first mirror 8003 that can reflect the light to and through a first dichroic beam splitter 8336. The first dichroic beam splitter 8336 can also receive light from a third light source 8335, which can first emit light to a structured light modulator 8330, which can reflect all or a portion of the light to the first dichroic beam splitter 8336. The light is reflected or transmitted through the first dichroic beam splitter 8336 to a first filter 8346, and then to a second dichroic beam splitter 8338 that reflects the light to an objective lens 8340. A first light source 8332 can emit light to and through a collimation lens 8019 and to a third dichroic beam splitter 8339 that reflects the light through a second filter, through the second dichroic beam splitter 8338, and to the objective lens 8340. The combined light from all the light sources are focused by the objective lens 8340 onto the sample plane, which can emit light after excitation back through the objective lens 8340, through the second dichroic beam splitter 8338, through the second filter 8347, through the third dichroic beam splitter 8339, through a second tube lens 8382, and to an imaging sensor 8348 (i.e., a camera).

FIG. 8C illustrates another embodiment of an optical configuration that can be used by the optical system 8000" with a first light source 8332 (i.e., a laser), a second light source 8334 (i.e., a brightfield LED), and a third light source 8335. The second light source 8334 can emit light to a first mirror 8003 that can reflect the light to and through a first dichroic beam splitter 8336. The first dichroic beam splitter 8336 can also receive light from a third light source 8335, which can first emit light to a structured light modulator 8330, which can reflect all or a portion of the light to the first dichroic beam splitter 8336. The light is reflected or transmitted through the first dichroic beam splitter 8336 through a first tube lines 8381 and through a second dichroic beam splitter 8338. The second dichroic beam splitter 8338 can also receive light from the first light source 8332, which can first emit light through a collimation lens 8019 before being reflected from the second dichroic beam splitter 8338. Light reflected and transmitted through the second dichroic beam splitter 8338 is transmitted through a first filter 8346 to a third dichroic beam splitter 8339 that reflects the light to an objective lens 8340 that focuses the light onto a sample plane 8320. The sample can emit light from the excitation and also reflect light that passes back through the objective lens 8340, through the third dichroic beam splitter 8339, through a second filter 8347, through a second tube lens 8382, and to an imaging sensor 8348 (i.e., a camera).

FIG. 8D illustrates yet another embodiment of an optical configuration that can be used by the optical system 8000''' with a first light source 8332 (i.e., a laser), a second light source 8334 (i.e., a brightfield LED), and a third light source 8335. The second light source 8334 can emit light to a first mirror 8003 that can reflect the light to and through a first dichroic beam splitter 8336. The first dichroic beam splitter 8336 can also receive light from a third light source 8335, which can first emit light to a structured light modulator 8330, which can reflect all or a portion of the light to the first dichroic beam splitter 8336. The light is reflected or transmitted through the first dichroic beam splitter 8336, through a first tube lines 8381, through a first filter 8346, and to a second dichroic beam splitter 8338 that reflects the light through a third dichroic beam splitter 8339 to an objective lens 8340. The first light source 8332 can emit light through a collimation lens 8019 to the third dichroic beam splitter 8339 that can reflect the light to the objective lens 8340. The combined light can be focused by the objective lens onto the sample plane 8320 to illuminate, heat, and/or excite the sample. Light can be reflected and emitted from the sample back through the objective lens 8340, through the third dichroic beam splitter 8339, through the second dichroic beam splitter 8338, through a second tube lens 8382, and to an imaging sensor 8348 (i.e., a camera).

Figure 9A:
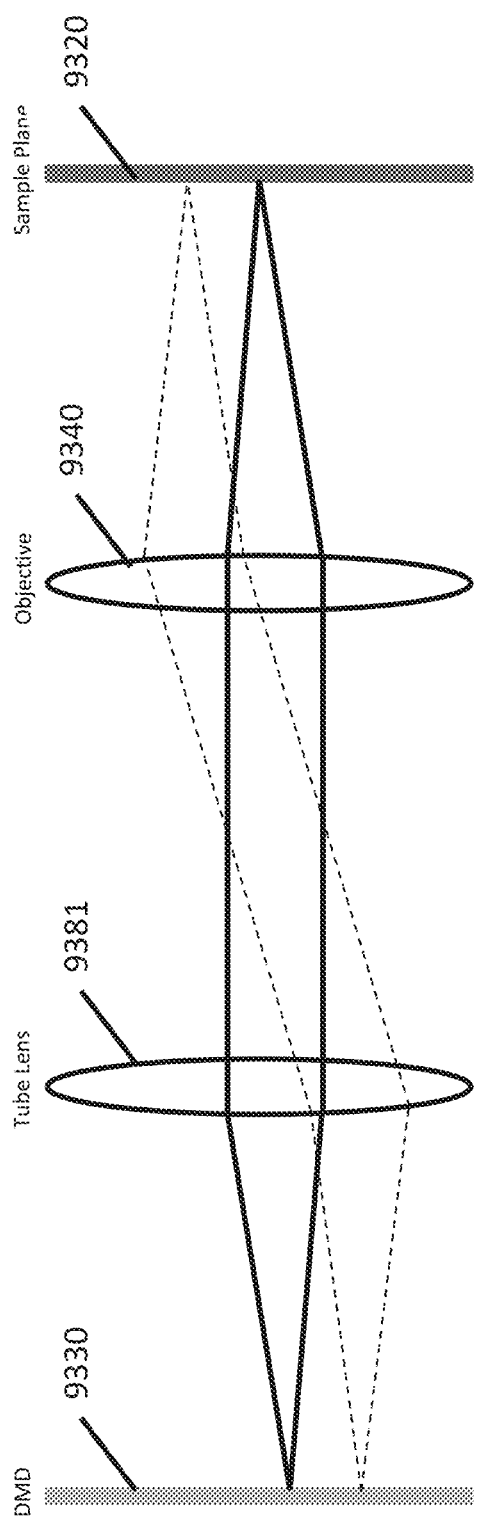
FIG. 9A illustrates a schematic of a simplified portion of the optical train according to some embodiments.
Figure 9B:
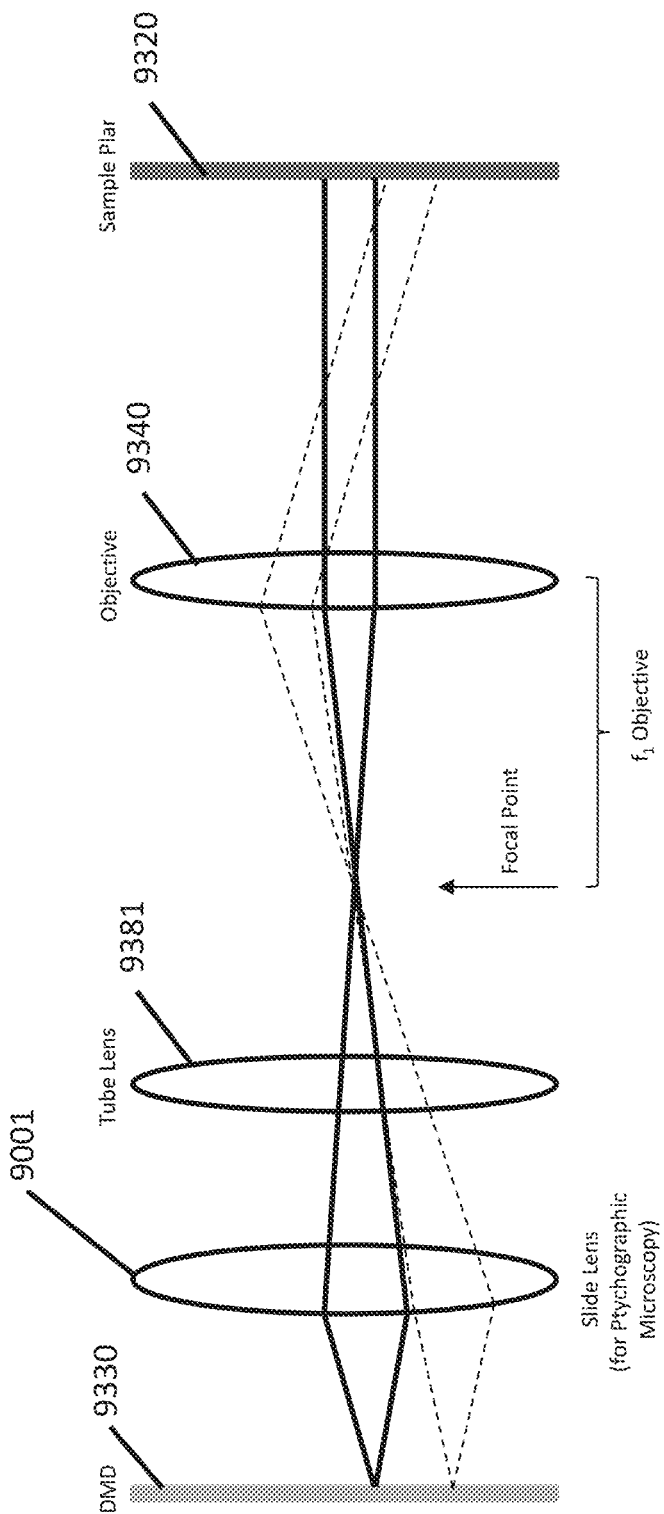
FIG. 9B illustrates a schematic of a simplified portion of the optical train that has been modified to include a slide lens for ptychographic microscopy according to some embodiments.

FIGS. 9A and 9B illustrate the use of an angular imaging technique, also called Fourier ptychographic microscopy (FPM), that can be incorporated into any of the embodiments described herein. The angular imaging technique can be used to increase image resolution without increasing the power of the objective. For example, this allows a 10× objective to achieve 20× resolution. FPM works by taking a plurality of relatively low resolution images from a plurality of different angles. A higher resolution image is generated computationally from the plurality of images using an iterative process that switches between the spatial and Fourier domains.

In step 1, the FPM method starts by taking an initial low resolution image, assigning it as an initial high-resolution image, and applying a Fourier transform to the image to create broad spectrum in the Fourier domain.

In step 2, a small subregion of the spectrum is selected by applying a low pass filter and a Fourier transformation is then applied to generate a new low resolution target image in the spatial domain. The low pass filter shape is a circular pupil that corresponds to the coherent transfer function of the objective lens. The position of the low pass filter is selected to correspond to the angle of illumination of the image that is being processed.

In step 3, the target image's amplitude component is replaced with the square root of the low-resolution measurement obtained under the current illumination angle, to form an updated low-resolution target image. A Fourier transform is applied to the updated low-resolution target image, which is used to replace the corresponding subregion of the initial high-resolution Fourier space.

In step 4, steps 2 and 3 are repeated for other subregions, making sure that the subregions overlap with neighboring subregions to ensure convergence, and the process is repeated for all images.

In step 5, steps 2-4 are repeated until a self-consistent solution is achieved in Fourier space. A Fourier transform is then applied to bring the converged solution back to the spatial domain, which is the final high-resolution image.

FIG. 9A illustrates a simplified portion of the optical train that includes the structured light modulator 9330, a tube lens 9381, an objective lens 9340, and the sample plane 9320. In FIG. 9A, the light between the tube lens 9381 and the objective lens 9340 is collimated, and objective lens 9340 then focuses the collimated light onto the sample plane 9320. FIG. 9B illustrates the addition of a slide lens 9001 between the structured light modulator 9330 and the tube lens 9381 that can be used for FPM. The slide lens 9001 can be slidably inserted and removed from the optical train. In some embodiments, the system can have one or more different slide lenses 9001 that can be each slidably inserted and removed. In some embodiments, the position of the slide lens can be adjusted to generate a different image from a different angle. The insertion of the slide lens causes (i) the light traveling from the tube lens 9381 to the objective lens 9340 to come to a focal point between the tube lens 9381 and the objective lens 9340 (instead of being collimated), and (ii) the light traveling from the objective lens 9340 to the sample plane 9320 to be collimated rather than coming to a focal point. By selectively lighting up different sections of the structured light modulator 9330, the light hitting the sample plane 9320 will arrive at different angles. Images of the sample plane 9320 illuminated with light arriving from several angles are then combined as described above to produce a higher resolution image. The structured light modulator can be divided into at least 8 different sections (so that at least 8 images with the light arriving at the sample plane at different angles are generated) in order for higher resolution to be achieved. Dividing the structured light modulator into even more sections, such as 12, 16, 20, 24, etc. different sections to generate different angles/images will produce still better resolutions.

The system can include a computing device with a processor and memory that is programmed to perform the FPM computations described above.

Various embodiments of a method of manipulating one or more micro-objects of a sample are disclosed herein. The method can comprise a step of loading the sample containing the one or more micro-objects into a microfluidic device having an enclosure. For example, the microfluidic device can comprise a substrate having a surface and a plurality of dielectrophoresis (DEP) electrodes on the surface and a flow region and a plurality of sequestration pens, each sequestration pen of the plurality fluidically connected to the flow region.

The method can comprise a step of applying a voltage potential across the microfluidic device. The method can comprise a step of selectively activating a DEP force adjacent to at least one micro-object located within the microfluidic device by using an optical apparatus.

The optical apparatus can be used to project structured light onto a first position on the surface of the substrate of the microfluidic device, wherein the first position is located adjacent to a second position on the surface of the substrate, the second position located beneath the at least one micro-object.

The optical apparatus can comprise a first light source, a structured light modulator, a first and a second tube lens, an objective lens, a dichroic beam splitter and an image sensor. The structured light modulator is configured to receive unstructured light from the first light source and transmit structured light suitable for selectively activating one or more of the plurality of DEP electrodes on the surface of the substrate of the microfluidic device. The first tube lens is configured to capture the structured light from the structured light modulator and transmit the structured light to an objective lens. The objective lens is configured to receive the structured light transmitted from the first tube lens and project the structured light within the enclosure of the microfluidic device, and wherein the objective lens is further configured to receive light reflected or emitted from within at least a portion of the enclosure within a field of view of the objective lens. The dichroic beam splitter can be located between the first tube lens and the objective lens, where the dichroic beam splitter is configured to transmit to the objective lens the structured light received from the first tube lens and to reflect light received from the objective lens to a second tube lens. The second tube lens is configured to receive the reflected light from the dichromic beam splitter and to transmit the reflected light upon an image sensor. The image sensor is configured to receive the reflected light from the second tube lens and record an image of the at least a portion of the enclosure within the field of view of the objective lens.

The method can comprise a step of shifting the location of the DEP force generated adjacent to at least one micro-object by using the optical apparatus to move the structured light from the first position on the surface of the substrate of the light-actuated microfluidic device to a third position on the surface of the substrate.

In some embodiments, the method can further comprise a step of capturing the image of the at least a portion of the enclosure of the microfluidic device with the image sensor. In some embodiments, the imaged portion of the enclosure of the microfluidic device comprises at least one sequestration pen and at least one micro-object.

In some embodiments, the optical apparatus comprises a second light source that produces unstructured light, and wherein the method further comprises using the optical apparatus to project the unstructured light from the second light source into the enclosure of the microfluidic device, thereby providing bright field illumination within the enclosure.

In some embodiments, the optical apparatus comprises a laser light source, and wherein the method further comprises using the optical apparatus to project laser light from the laser light source onto the surface of the substrate of the enclosure of the microfluidic device.

In some embodiments, the optical apparatus further comprises a second dichroic beam splitter positioned between the structured light modulator and the first tube lens, and wherein structured light transmitted by the structured light modulator is reflected into the first tube lens by the second dichroic beam splitter.

In some embodiments, the unstructured light produced by the second light source is transmitted through the second dichroic beam splitter to the first tube lens. In some embodiments, the laser light produced by the laser light source is transmitter through the second dichroic beam splitter to the first tube lens.

In some embodiments, the structured light projected onto the first position on the substrate surface comprises a plurality of illumination spots. In some embodiments, the first position on the substrate surface is located in the flow region of the microfluidic device, and wherein the third position on the substrate surface is located within one of the sequestration pens of the plurality of sequestration pens.

In some embodiments, the structured light projected onto the first position on the substrate surface comprises a shape like a line segment or a caret symbol. In some embodiments, the structured light projected onto the first position on the substrate surface has a shape like the outline of a polygon.

In some embodiments, the method can further comprise a step of selectively activating DEP forces adjacent to a plurality of micro-objects located within the microfluidic device by using the optical apparatus to project structured light onto a plurality of first positions on the surface of the substrate of the microfluidic device, wherein each of the plurality of first positions is located adjacent to a corresponding second position on the surface of the substrate, the corresponding second position located beneath a corresponding micro-object of the plurality.

In some embodiments, the method can further comprise a step of shifting the location of the DEP forces generated adjacent to the plurality of micro-objects by using the optical apparatus to move the imaged structured light from the plurality of first positions on the substrate surface to a plurality of corresponding third positions on the substrate surface.

In some embodiments, the method can further comprise a step of capturing an image of at least a portion of the enclosure comprises imaging only an interior area of the flow region and each sequestration pen located in the portion of the enclosure being imaged, thereby reducing overall noise to achieve high image quality. In some embodiments, the method can further comprise a step of analyzing the image to provide feedback and adjustment of the first position.

Disclosed herein is a method of imaging one or more micro-objects of a sample. The method can comprise loading the sample containing the one or more micro-objects into a microfluidic apparatus having an enclosure comprising a flow region.

The method can comprise capturing a plurality of images of at least a portion of the enclosure containing the one or more micro-objects using a plurality of corresponding illumination patterns projected into the at least a portion of the enclosure, wherein each illumination pattern of the plurality is produced using structured light and is different from the other illumination patterns of the plurality, and wherein the plurality of images is captured using an optical apparatus.

The optical apparatus can comprise a first light source, a structured light modulator, a first and a second tube lens, an objective lens, a dichroic beam splitter, and an image sensor. The structured light modulator is configured to receive unstructured light from the first light source and transmit structured light corresponding to any of the plurality of illumination patterns. The first tube lens is configured to capture the structured light from the structured light modulator and transmit the structured light to an objective lens. The objective lens is configured to receive the structured light transmitted from the first tube lens and project, and wherein the objective lens is further configured to receive light reflected or emitted from within the at least a portion of the enclosure. The dichroic beam splitter is located between the first tube lens and the objective lens, the dichroic beam splitter is configured to transmit to the objective lens the structured light received from the first tube lens and to reflect light received from the objective lens to a second tube lens. The second tube lens is configured to receive the reflected light from the dichromic beam splitter and to transmit the reflected light upon the image sensor. The image sensor is configured to receive the reflected light from the second tube lens and record an image therefrom. The method can further comprise combining the plurality of images to generate a single image of the one or more micro-objects located in the portion of the enclosure, wherein the combining step comprises processing each of the plurality of images to remove out-of-focus background light.

In some embodiments, the microfluidic apparatus comprises a flow region, and wherein the one or more micro-objects are located in the flow region. In some embodiments, the microfluidic apparatus comprises a flow region and a plurality of sequestration pens, each sequestration pen of the plurality fluidically connected to the flow region, and wherein the one or more micro-objects are located in one or more of the plurality of sequestration pens and/or the flow region.

In some embodiments, the plurality of corresponding illumination patterns projected into the at least a portion of the enclosure and the corresponding image captured at the image sensor are simultaneously in focus. In some embodiments, the plurality of corresponding illumination patterns is configured to scan through the field of view within the enclosure.

Although particular embodiments of the disclosed invention have been shown and described herein, it will be understood by those skilled in the art that they are not intended to limit the present invention, and it will be obvious to those skilled in the art that various changes and modifications may be made (e.g., the dimensions of various parts) without departing from the scope of the disclosed invention, which is to be defined only by the following claims and their equivalents. The specification and drawings are, accordingly, to be regarded in an illustrative rather than restrictive sense.

Recitation of Embodiments of the Disclosure.

1. An optical apparatus for imaging micro-objects in an enclosure of a microfluidic device, the optical apparatus including: a structured light modulator configured to receive unstructured light beams from a first light source and reflect or transmit structured light beams suitable for illuminating micro-objects located in enclosure of the microfluidic device;

first tube lens configured to capture and transmit the structured light beams from the structured light modulator;

an objective lens configured to capture and transmit image light beams from a field of view including at least a portion of the enclosure of the microfluidic device;

a first dichroic beam splitter configured to receive and reflect or transmit the structured light beams from the first tube lens, and further configured to receive and transmit or reflect the image light beams from the objective lens;

a second tube lens configured to receive and transmit the image light beams from the first dichroic beam splitter; and an image sensor configured to receive the image light beams from the second tube lens, wherein the image sensor forms an image of the field of view based upon the image light beams received from the second tube lens.

2. The optical apparatus of embodiment 1, wherein the structured light modulator comprises an active area of at least 15 mm. In some embodiments, the structured light modulator may comprise an active area of at least 15.5 mm, 16.0 mm, 16.5 mm, 17.0 mm, or greater.

3. The optical apparatus of embodiment 1 or 2, wherein the first tube lens has a clear aperture of at least 45 mm.

4. The optical apparatus of embodiment 3, wherein the first tube lens has a clear aperture configured to capture substantially all light beams from the structured light modulator (e.g., all or substantially all structured light beams from the structured light modulator).

5. The optical apparatus of any one of embodiments 1 to 4, wherein the first tube lens has an effective focal length of about 162 mm (e.g., 162 mm+/−0.8 mm) or shorter.

6. The optical apparatus of any one of embodiments 1 to 4, wherein the first tube lens has an effective focal length of about 155 mm (e.g., 155+/−0.8 mm).

7. The optical apparatus of any one of embodiments 1 to 5, wherein the first tube lens has a numerical aperture of about 0.071 to about 0.085. In some embodiments, the first tube lens may have a numerical aperture of about 0.074 to about 0.082, or about 0.076 to about 0.080.

8. The optical apparatus of any one of embodiments 1 to 7, wherein the second tube lens has an effective focal length of 180 mm+/−0.9 mm (or greater).

9. The optical apparatus of any one of embodiments 1 to 7, wherein the second tube lens has an effective focal length of 200 mm+/−1 mm.

10. The optical apparatus of any one of embodiments 1 to 9, wherein the second tube lens has a numerical aperture of about 0.063 to about 0.077. In some embodiments, the second tube lens may have a numerical aperture of about 0.066 to about 0.074, or about 0.068 to about 0.072.

11. The optical apparatus of any one of embodiments 1 to 10, wherein the image sensor comprises an active area of at least 16.5 mm. In some embodiments, the image sensor may comprise an active area of at least 17.0 mm, 17.5 mm, 18.0 mm, 18.5 mm, 19.0 mm, or greater.

12. The optical apparatus of any one of embodiments 1 to 11, wherein the apparatus is characterized by an aperture stop at the back of the objective lens, wherein the aperture stop is at least 25 mm. In some embodiments, the aperture stop is at least 26 mm, 27 mm, 28 mm, 29 mm, or greater, or 24 mm to 26 mm.

13. The optical apparatus of any one of embodiments 1 to 12, wherein the first dichroic beam splitter is configured to (i) reflect light beams from the first tube lens to the objective lens, and (ii) transmit light beams from the objective lens to the second tube lens.

14. The optical apparatus of any one of embodiments 1 to 12, wherein the first dichroic beam splitter is configured to (i) transmit light beams from the first tube lens to the objective lens, and (ii) reflect light beams from the objective lens to the second tube lens.

15. The optical apparatus of any one of embodiments 1 to 14, wherein the objective lens is configured to minimize aberration in the image of the field of view formed by the image sensor.

16. The optical apparatus of embodiment 16, wherein the second tube lens is configured to correct a residual aberration of the objective lens.

17. The optical apparatus of embodiment 15 or 16, further including a correction lens configured to correct a residual aberration of the objective lens.

18. The optical apparatus of any one of embodiments 1 to 17, wherein the structured light modulator is disposed at a conjugate plane of the image sensor.

19. The optical apparatus of any one of embodiments 1 to 18, wherein the apparatus is configured to perform confocal imaging.

20. The optical apparatus of any one of embodiments 1 to 17 further including a slide lens which is slideably positioned between the structured light modulator and the first tube lens, wherein the slide lens is configured to support ptychographic microscopy.

21. The optical apparatus of any one of embodiments 1 to 20 further including a first light source.

22. The optical apparatus of embodiment 21, wherein the first light source has a power of at least 10 Watts.

23. The optical apparatus of embodiment 21 or 22, wherein the structured light beams reflected or transmitted by the structured light modulator are suitable for selectively activating one or more of a plurality of dielectrophoresis (DEP) electrodes on or comprised by a surface of a substrate of the microfluidic device.

24. The optical apparatus of embodiment 21 or 22 further including a second light source (e.g., an LED or laser).

25. The optical apparatus of embodiment 24, wherein the second light source is configured to provide unstructured bright field illumination.

26. The optical apparatus of embodiment 24 or 25, wherein the second light source comprises a laser.

27. The optical apparatus of any one of embodiments 1 to 26 further including a second dichroic beam splitter. (e.g., the second dichroic beam splitter may be configured to reflect structured light beams from the structured light modulator to the first tube lens; optionally, the second dichroic beam splitter can also transmit unstructured light beams from the second light source to the first tube lens)

28. The optical apparatus of any one of embodiments 24 to 27 further comprising a third light source.

29. The optical apparatus of embodiment 28, wherein the third light source comprises a laser, and optionally, wherein the laser of the third light source is configured to heat an internal surface of the microfluidic device and/or a liquid medium located within the enclosure of the microfluidic device (e.g., the laser may be configured to heat by an amount sufficient to generate a gas bubble within the enclosure of the microfluidic device).

30. The optical apparatus of any one of embodiments 1 to 29 further including a nest, wherein the nest is configured to hold the microfluidic device.

31. The optical apparatus of embodiment 30, wherein the nest is further configured to provide at least one electrical connection to the microfluidic device.

32. The optical apparatus of embodiment 30 or 31, wherein the nest is further configured to provide fluidic connections to the microfluidic device.

33. The optical apparatus of any one of embodiments 1 to 32, wherein the microfluidic device includes a cover including glass, and wherein the cover has a thickness of about 600 microns or greater (e.g., the cover may have a thickness of about 600 microns to about 1000 microns, about 625 microns to about 850 microns, or about 640 microns to about 700 microns).

34. The optical apparatus of any one of embodiments 1 to 33 further including a control unit for providing instructions to the structured light modulator, wherein the instructions cause the structured light modulator to produce one or more illumination patterns.

35. The optical apparatus of embodiment 34, wherein the illumination patterns vary over time (e.g., a first pattern is replaced by a second pattern, which is replaced by a third pattern, and so on, such that the pattern appears to move as a function of time).

36. A system for imaging micro-objects, the system including:
a microfluidic device including an enclosure, wherein the enclosure comprises a substrate having a plurality of dielectrophoresis (DEP) electrodes disposed on or comprised by a surface of the substrate;
an optical apparatus configured for imaging of micro-objects in the enclosure of the microfluidic device, the optical apparatus including:
a structured light modulator configured to receive unstructured light from a first light source and reflect or transmit structured light beams suitable for illuminating micro-objects located in the enclosure of the microfluidic device;
a first tube lens configured to capture and transmit the structured light beams from the structured light modulator;
an objective lens configured to capture and transmit image light beams from a field of view including at least a portion of the enclosure of the microfluidic device;
a first dichroic beam splitter configured to receive and reflect or transmit the structured light beams from the first tube lens, and further configured to receive and transmit or reflect the image light beams from the objective lens;
a second tube lens configured to receive and transmit the image light beams from the first dichroic beam splitter;
an image sensor configured to receive the image light beams from the second tube lens, wherein the image sensor forms an image of the field of view based upon the image light beams received from the second tube lens; and
a nest for holding the microfluidic device in a position allowing the microfluidic device to be imaged by the optical apparatus.

37. The system of embodiment 36, wherein the optical apparatus is configured according to any one of embodiments 2 to 29.

38. The system of embodiment 36 or 37, wherein the nest provides at least one electrical connection to the microfluidic device.

39. The system of any one of embodiments 36 to 38, wherein the next provides fluidic connections to the microfluidic device.

40. The system of any one of embodiments 36 to 39 further including a control unit for providing instructions to the structured light modulator, wherein the instructions cause the structured light modulator to produce one or more illumination patterns.

41. The system of embodiment 40, wherein the illumination patterns vary over time (e.g., a first pattern is replaced by a second pattern, which is replaced by a third pattern, and so on, such that the pattern appears to move as a function of time).

42. A method of manipulating one or more micro-objects of a sample, the method including:
loading the sample containing the one or more micro-objects into a microfluidic device having an enclosure including a substrate, wherein the substrate comprises a plurality of light-actuated dielectrophoresis (DEP) electrodes disposed on or comprised by a surface of the substrate;
applying a voltage potential across the microfluidic device;
selectively activating a DEP force adjacent to at least one micro-object located within the microfluidic device by using an optical apparatus to project structured light onto a first position on the surface of the substrate of the microfluidic device, wherein the first position comprises one or more of the plurality of light-actuated DEP electrodes and is located adjacent to a second position on the surface of the substrate, the second position located beneath the at least one micro-object, and wherein the optical apparatus comprises: a first light source; a structured light modulator configured to receive unstructured light beams from the first light source and transmit structured light beams suitable for selectively activating the one or more DEP electrodes at the first position on the surface of the substrate of the microfluidic device; a first tube lens configured to capture and transmit the structured light beams from the structured light modulator; an objective lens configured to capture the structured light beams transmitted from the first tube lens and project the structured light beams onto the first position on the surface of the substrate of the microfluidic device, and wherein the objective lens is further configured to capture and transmit image light beams reflected or emitted from a field of view including at least a portion of the enclosure of the microfluidic device, the field of view encompassing the first and second positions on the surface of the substrate; a first dichroic beam splitter configured to reflect or transmit to the objective lens the structured light beams received from the first tube lens, and further configured to transmit or reflect image light beams received from the objective lens; a second tube lens configured to receive and transmit the image light beams from the first dichromic beam splitter; and an image sensor configured to receive the image light beams from the second tube lens, wherein the image sensor records an image of the field of view based upon the image light beams received from the second tube lens; and
shifting the location of the DEP force generated adjacent to at least one micro-object by using the optical apparatus to move the projected structured light from the first position on the surface of the substrate of the microfluidic device to a third position on the surface of the substrate, wherein the third position also comprises one or more of the plurality of light-actuated DEP electrodes.

43. The method of embodiment 42, wherein the third position is encompassed by the field of view.

44. The method of embodiment 42 or 43, wherein the third position overlaps with or encompasses the second position.

45. The method of any one of embodiments 42 to 44 further including recording an image of the field of view with the image sensor.

46. The method of any one of embodiments 42 to 45, wherein the enclosure of the microfluidic device comprises a flow region, at least one sequestration pen fluidically connected thereto.

47. The method of embodiment 46, wherein the field of view encompasses a sequestration pen of the at least one sequestration pen and at least a portion of the flow region.

48. The method of any one of embodiments 42 to 47, wherein the optical apparatus comprises a second light source that produces unstructured light, and wherein the method further comprises: using the optical apparatus to project the unstructured light from the second light source into the enclosure of the microfluidic device, thereby providing bright field illumination within the enclosure.

49. The method of any one of embodiments 42 or 48, wherein the optical apparatus comprises a laser light source, and wherein the method further comprises: using the optical apparatus to project laser light from the laser light source onto a surface within the enclosure of the microfluidic device (e.g., a fourth position on the surface of the substrate).

50. The method of any one of embodiments 42 to 49, wherein the optical apparatus further comprises a second dichroic beam splitter positioned between the structured light modulator and the first tube lens, and wherein the structured light beams transmitted by the structured light modulator are reflected into the first tube lens by the second dichroic beam splitter.

51. The method of embodiment 50, wherein the unstructured light produced by the second light source is transmitted through the second dichroic beam splitter to the first tube lens.

52. The method of embodiment 50 or 51, wherein the laser light produced by the laser light source is transmitted through the second dichroic beam splitter to the first tube lens.

53. The method of any one of embodiments 42 to 52, wherein the structured light projected onto the first position on the substrate surface comprises a plurality of illumination spots.

54. The method of embodiment 46, wherein the first position on the substrate surface is located in the flow region of the microfluidic device, and wherein the third position on the substrate surface is located within one of the sequestration pens of the plurality of sequestration pens.

55. The method of any one of embodiments 42 to 54, wherein the structured light projected onto the first position on the substrate surface comprises a shape like a line segment or a caret symbol.

56. The method of embodiment 55, wherein the structured light projected onto the first position on the substrate surface has a shape like the outline of a polygon. In some embodiments the shape may have an outline of a quadrilateral polygon, such as a square, rectangle, rhombus, etc., or a pentagon, or the like.

57. The method of any one of embodiments 42 to 56 further including:
selectively activating DEP forces adjacent to a plurality of micro-objects located within the microfluidic device by using the optical apparatus to project structured light onto a plurality of first positions on the surface of the substrate of the microfluidic device, wherein each of the plurality of first positions comprises one or more of the plurality of light-actuated DEP electrodes and is located adjacent to a corresponding second position on the surface of the substrate, the corresponding second position located beneath a corresponding micro-object of the plurality; and
shifting the location of the DEP forces generated adjacent to the plurality of micro-objects by using the optical apparatus to move the projected structured light from the plurality of first positions on the substrate surface to a plurality of corresponding third positions on the substrate surface.

58. The method of embodiment 47, wherein recording an image of the field of view comprises imaging only an interior area of the flow region and each sequestration pen located in the field of view (e.g., thereby reducing overall noise to achieve high image quality).

59. The method of embodiment 45 further including analyzing the recorded image to provide feedback and adjustment of the first position.

60. A method of imaging one or more micro-objects of a sample, the method including: loading the sample containing the one or more micro-objects into an enclosure of a microfluidic device;
capturing a plurality of images of a field of view encompassing at least a portion of the enclosure containing the one or more micro-objects using a plurality of corresponding illumination patterns projected into the field of view, wherein each illumination pattern of the plurality is produced using structured light and is different from the other illumination patterns of the plurality, and wherein the plurality of images is captured using an optical apparatus including: a first light source; a structured light modulator configured to receive unstructured light beams from the first light source and transmit structured light beams corresponding to any of the plurality of illumination patterns; a first tube lens configured to capture and transmit the structured light beams from the structured light modulator; an objective lens configured to capture the structured light beams transmitted from the first tube lens and project the structured light beams into the at least a portion of the enclosure of the microfluidic device encompassed by the field of view, wherein the objective lens is further configured to receive image light beams reflected or emitted from within the field of view; a first dichroic beam splitter configured to reflect or transmit to the objective lens the structured light beams received from the first tube lens, and further configured to transmit or reflect image light beams received from the objective lens; a second tube lens configured to receive and transmit the image light beams from the first dichromic beam splitter; and an image sensor configured to receive the image light beams from the second tube lens, wherein the image sensor records an image of the field of view based upon the image light beams received from the second tube lens; and
combining the plurality of digital images to generate a confocal image of the one or more micro-objects located in the field of view, wherein the combining step comprises processing each of the plurality of images to remove out-of-focus background light.

61. The method of embodiment 60, wherein the microfluidic apparatus comprises a flow region, and wherein the one or more micro-objects are located in the flow region.

62. The method of embodiment 60, wherein the microfluidic apparatus comprises a flow region and a plurality of sequestration pens, each sequestration pen of the plurality fluidically connected to the flow region, and wherein the one or more micro-objects are located in one or more of the plurality of sequestration pens and/or the flow region.

63. The method of any one of embodiments 60 to 62, wherein the plurality of corresponding illumination patterns projected into the field of view and the corresponding images captured at the image sensor are simultaneously in focus.

64. The method of any one of embodiments 60 to 63, wherein the plurality of corresponding illumination patterns is configured to scan through the field of view.

65. A tube lens of an optical apparatus for imaging micro-objects in microfluidic device, the tube lens including:

a first surface having a convex shape and a first radius of curvature;
a second surface having a second radius of curvature;
a third surface having a concave shape and a third radius of curvature;
a fourth surface having a concave shape and a fourth radius of curvature; and
a clear aperture with a diameter of at least 45 mm; wherein the first radius of curvature is positive, the third radius of curvature is negative, and the fourth radius of curvature is negative, and wherein a front focal point and a back focal point of the tube lens are not equally spaced from a midpoint of the tube lens and/or are not located symmetric.

66. The tube lens of embodiment 65, wherein a Back Focal Length (BFL) of the tube lens is minimized.

67. The tube lens of embodiment 65, wherein the tube lens has an Effective Focal Length (EFL) of about 155 mm (e.g., 155 mm+/−1 mm) and a Back Focal Length (BFL) of about 135 mm (e.g., 135 mm+/−1 mm).

68. The tube lens of embodiment 65, wherein the tube lens has an Effective Focal Length (EFL) of about 162 mm (e.g., 162 mm+/−1 mm) and a Back Focal Length (BFL) of about 146 mm (e.g., 146 mm+/−1 mm).

69. The tube lens of embodiment 65, wherein the tube lens has an Effective Focal Length (EFL) of about 180 mm (e.g., 180 mm+/−1 mm) and a Back Focal Length (BFL) of about 164 mm (e.g., 164 mm+/−1 mm).

70. The tube lens of embodiment 65, wherein the tube lens has an Effective Focal Length (EFL) of about 200 mm (e.g., 200 mm+/−1 mm) and a Back Focal Length (BFL) of about 191 mm (e.g., 191 mm+/−1 mm).

71. The tube lens of embodiment 65, wherein the tube lens has an Effective Focal Length (EFL) of about 155 mm (e.g., 155 mm+/−0.78 mm), wherein the first radius of curvature is about 91 mm (e.g., 91 mm+/−0.45 mm), the second radius of curvature is about 42 mm (e.g., 42 mm+/−0.21 mm), the third radius of curvature is about −62 mm (e.g., −62 mm+/−0.31 mm), and the fourth radius of curvature is about −116 mm (e.g., −116 mm+/−0.58 mm).

72. The tube lens of embodiment 65, wherein the tube lens has an Effective Focal Length (EFL) of about 162 mm (e.g., 162 mm+/−0.81 mm), wherein the first radius of curvature is about 95 mm (e.g., 95 mm+/−0.48 mm), the second radius of curvature is about 54 mm (e.g., 54 mm+/−0.27 mm), the third radius of curvature is about −56 mm (e.g., −56 mm+/−0.28 mm), and the fourth radius of curvature is about −105 mm (e.g., −105 mm+/−0.53 mm).

73. The tube lens of embodiment 65, wherein the tube lens has an Effective Focal Length (EFL) of about 180 mm (e.g., 180 mm+/−0.90 mm), wherein the first radius of curvature is about 95 mm (e.g., 95 mm+/−0.48 mm), the second radius of curvature is about 64 mm (e.g., 64 mm+/−32 mm), the third radius of curvature is about −60 mm (e.g., −60 mm+/−0.30 mm), and the fourth radius of curvature is about −126 mm (e.g., −126 mm+/−0.63 mm).

74. The tube lens of embodiment 65, wherein the tube lens has an Effective Focal Length (EFL) of about 200 mm (e.g., 200 mm+/−1.0 mm), wherein the first radius of curvature is about 160 mm (e.g., 160 mm+/−0.80 mm), the second radius of curvature is about −62 mm (e.g., −62 mm+/−0.31 mm), the third radius of curvature is about −80 mm (e.g., −80 mm+/−0.40 mm), and the fourth radius of curvature is about −109 mm (e.g., −109 mm+/−0.55 mm).

75. A method of imaging one or more micro-objects of a sample, the method including:

loading the sample containing the one or more micro-objects into an enclosure of a microfluidic device;
capturing a plurality of images of a field of view encompassing at least a portion of the enclosure containing the one or more micro-objects using a corresponding plurality of light illumination angles projected into the field of view, wherein the plurality of images is captured using an optical apparatus including: a first light source; a structured light modulator configured to receive unstructured light beams from the first light source and transmit structured light beams corresponding to any of the plurality of illumination patterns; a first tube lens configured to capture and transmit the structured light beams from the structured light modulator; an objective lens configured to capture the structured light beams transmitted from the first tube lens and project the structured light beams into the at least a portion of the enclosure of the microfluidic device encompassed by the field of view, wherein the objective lens is further configured to receive image light beams reflected or emitted from within the field of view; a first dichroic beam splitter configured to reflect or transmit to the objective lens the structured light beams received from the first tube lens, and further configured to transmit or reflect image light beams received from the objective lens; a second tube lens configured to receive and transmit the image light beams from the first dichromic beam splitter; an image sensor configured to receive the image light beams from the second tube lens; and a slide lens positioned between the structured light modulator and the first tube lens, wherein the slide lens is configured to support ptychographic microscopy; and
iteratively combining the plurality of captured images to generate a composite image having higher resolution than any of the captured images.

76. The method of embodiment 75, wherein the microfluidic apparatus comprises a flow region, and wherein the one or more micro-objects are located in the flow region.

77. The method of embodiment 75, wherein the microfluidic apparatus comprises a flow region and a plurality of sequestration pens, each sequestration pen of the plurality fluidically connected to the flow region, and wherein the one or more micro-objects are located in one or more of the plurality of sequestration pens and/or the flow region.

78. The method of any one of embodiments 75 to 77, wherein the plurality of captured images comprises at least eight images. In some embodiments, the plurality of captured images comprises at least 10, 12, 16, 20, 24, or more images.

79. The method of any one of embodiments 75 to 78, wherein the plurality of light illumination angles is generated by structured light originating from a corresponding plurality of different portions of the structured light modulator.

80. The method of embodiment 79, wherein the different portions of the structured light modulator are non-overlapping (or substantially non-overlapping).

What is claimed is:
1. An optical apparatus for imaging micro-objects in an enclosure of a microfluidic device, the optical apparatus comprising:
a structured light modulator configured to receive unstructured light beams from a first light source and reflect or transmit structured light beams suitable for illuminating micro-objects located in the enclosure of the microfluidic device;

a first tube lens configured to capture and transmit the structured light beams from the structured light modulator, comprising:
   a first surface having a convex shape and a first radius of curvature;
   a second surface having a second radius of curvature;
   a third surface having a concave shape and a third radius of curvature;
   a fourth surface having a concave shape and a fourth radius of curvature; and
   a clear aperture with a diameter of at least 45 mm, wherein the first radius of curvature is positive, the third radius of curvature is negative, and the fourth radius of curvature is negative, and
   wherein a front focal point and a back focal point of the tube lens are not equally spaced from a midpoint of the tube lens;
an objective lens configured to capture and transmit image light beams from a field of view comprising at least a portion of the enclosure of the microfluidic device;
a first dichroic beam splitter configured to receive and reflect or transmit the structured light beams from the first tube lens, and further configured to receive and transmit or reflect the image light beams from the objective lens;
a second tube lens configured to receive and transmit the image light beams from the first dichroic beam splitter; and
an image sensor configured to receive the image light beams from the second tube lens, wherein the image sensor forms an image of the field of view based upon the image light beams received from the second tube lens.

2. The optical apparatus of claim 1, wherein the structured light modulator comprises an active area of at least 15 mm.

3. The optical apparatus of claim 1, wherein the first tube lens has an effective focal length of about 162 mm or shorter.

4. The optical apparatus of claim 1, wherein the first tube lens has an effective focal length of about 155 mm.

5. The optical apparatus of claim 4, wherein the first tube lens has a numerical aperture of about 0.071 to about 0.085.

6. The optical apparatus of claim 1, wherein the second tube lens has an effective focal length of about 180 mm or longer.

7. The optical apparatus of claim 6, wherein the second tube lens has an effective focal length of about 200 mm.

8. The optical apparatus of claim 1, wherein the second tube lens has a numerical aperture of about 0.063 to about 0.077.

9. The optical apparatus of claim 1, wherein the image sensor comprises an active area of at least 18.0 mm.

10. The optical apparatus of claim 1, wherein the apparatus is characterized by an aperture stop at the back of the objective lens, wherein the aperture stop is at least 25 mm.

11. The optical apparatus of claim 1, wherein the objective lens is configured to minimize aberration in the image of the field of view formed by the image sensor.

12. The optical apparatus of claim 11, wherein the second tube lens is configured to correct a residual aberration of the objective lens.

13. The optical apparatus of claim 11, further comprising a correction lens configured to correct a residual aberration of the objective lens.

14. The optical apparatus of claim 1, wherein the structured light modulator is disposed at a conjugate plane of the image sensor.

15. The optical apparatus of claim 1 further comprising a first light source.

16. The optical apparatus of claim 15, wherein the first light source has a power of at least 10 Watts.

17. The optical apparatus of claim 15 further comprising a second light source.

18. The optical apparatus of claim 17, wherein the second light source is configured to provide unstructured bright field illumination or wherein the second light source comprises a laser.

19. The optical apparatus of claim 1, further comprising a second dichroic beam splitter.

20. The optical apparatus of claim 17, further comprising a third light source, wherein the third light source comprises a laser, and wherein the laser of the third light source is configured to heat an internal surface of the microfluidic device and/or a liquid medium located within the enclosure of the microfluidic device.

21. The optical apparatus of claim 1, further comprising a nest, wherein the nest is configured to hold the microfluidic device, provide at least one electrical connection to the microfluidic device, or provide fluidic connections to the microfluidic device.

22. The optical apparatus of claim 1, further comprising a control unit for providing instructions to the structured light modulator, wherein the instructions cause the structured light modulator to produce one or more illumination patterns.

23. A method of manipulating one or more micro-objects of a sample, the method comprising:
   loading the sample containing the one or more micro-objects into a microfluidic device having an enclosure comprising a substrate, wherein the substrate comprises a plurality of light-actuated dielectrophoresis (DEP) electrodes disposed on or comprised by a surface of the substrate;
   applying a voltage potential across the microfluidic device;
   selectively activating a DEP force adjacent to at least one micro-object located within the microfluidic device by using an optical apparatus to project structured light onto a first position on the surface of the substrate of the microfluidic device, wherein the first position comprises one or more of the plurality of light-actuated DEP electrodes and is located adjacent to a second position on the surface of the substrate, the second position located beneath the at least one micro-object, and wherein the optical apparatus comprises:
      a first light source;
      a structured light modulator configured to receive unstructured light beams from the first light source and transmit structured light beams suitable for selectively activating the one or more DEP electrodes at the first position on the surface of the substrate of the microfluidic device;
      a first tube lens configured to capture and transmit the structured light beams from the structured light modulator;
      an objective lens configured to capture the structured light beams transmitted from the first tube lens and project the structured light beams onto the first position on the surface of the substrate of the microfluidic device, and wherein the objective lens is further configured to capture and transmit image light beams reflected or emitted from a field of view comprising at least a portion of the enclosure of the microfluidic device, the field of view encompassing the first and second positions on the surface of the substrate;

a first dichroic beam splitter configured to reflect or transmit to the objective lens the structured light beams received from the first tube lens, and further configured to transmit or reflect image light beams received from the objective lens;

a second tube lens configured to receive and transmit the image light beams from the first dichromic beam splitter; and an image sensor configured to receive the image light beams from the second tube lens, wherein the image sensor records an image of the field of view based upon the image light beams received from the second tube lens; and shifting the location of the DEP force generated adjacent to at least one micro-object by using the optical apparatus to move the projected structured light from the first position on the surface of the substrate of the microfluidic device to a third position on the surface of the substrate, wherein the third position also comprises one or more of the plurality of light-actuated DEP electrodes.

24. The optical apparatus of claim 1, wherein a Back Focal Length (BFL) of the first tube lens is minimized.

25. The optical apparatus of claim 1, wherein the first tube lens has an Effective Focal Length (EFL) of about 155 mm (e.g., 155 mm+/−1 mm) and a Back Focal Length (BFL) of about 135 mm (e.g., 135 mm+/−1 mm).

26. The optical apparatus of claim 1, wherein the first tube lens has an Effective Focal Length (EFL) of about 162 mm (e.g., 162 mm+/−1 mm) and a Back Focal Length (BFL) of about 146 mm (e.g., 146 mm+/−1 mm).

27. The optical apparatus of claim 1, wherein the second tube lens has an Effective Focal Length (EFL) of about 180 mm (e.g., 180 mm+/−1 mm) and a Back Focal Length (BFL) of about 164 mm (e.g., 164 mm+/−1 mm).

28. The optical apparatus of claim 1, wherein the second tube lens has an Effective Focal Length (EFL) of about 200 mm (e.g., 200 mm+/−1 mm) and a Back Focal Length (BFL) of about 191 mm (e.g., 191 mm+/−1 mm).

29. An optical apparatus for imaging micro-objects in an enclosure of a microfluidic device, the optical apparatus comprising:

a structured light modulator configured to receive unstructured light beams from a first light source and reflect or transmit structured light beams suitable for illuminating micro-objects located in the enclosure of the microfluidic device;

a first tube lens configured to capture and transmit the structured light beams from the structured light modulator;

an objective lens configured to capture and transmit image light beams from a field of view comprising at least a portion of the enclosure of the microfluidic device;

a first dichroic beam splitter configured to receive and reflect or transmit the structured light beams from the first tube lens, and further configured to receive and transmit or reflect the image light beams from the objective lens;

a second tube lens configured to receive and transmit the image light beams from the first dichroic beam splitter, wherein the second tube lens comprises:

a first surface having a convex shape and a first radius of curvature;

a second surface having a second radius of curvature;

a third surface having a concave shape and a third radius of curvature;

a fourth surface having a concave shape and a fourth radius of curvature; and a clear aperture with a diameter of at least 45 mm;

wherein the first radius of curvature is positive, the third radius of curvature is negative, and the fourth radius of curvature is negative, and wherein a front focal point and a back focal point of the tube lens are not equally spaced from a midpoint of the tube lens; and an image sensor configured to receive the image light beams from the second tube lens, wherein the image sensor forms an image of the field of view based upon the image light beams received from the second tube lens.

* * * * *